(12) United States Patent
Cao et al.

(10) Patent No.: US 12,218,348 B2
(45) Date of Patent: Feb. 4, 2025

(54) EXPANDED HYDRATED VANADATE

(71) Applicant: University of Washington, Seattle, WA (US)

(72) Inventors: Guozhong Cao, Seattle, WA (US); Chaofeng Liu, Seattle, WA (US)

(73) Assignee: University of Washington, Seattle, WA (US)

( * ) Notice: Subject to any disclaimer, the term of this patent is extended or adjusted under 35 U.S.C. 154(b) by 611 days.

(21) Appl. No.: 17/606,354

(22) PCT Filed: May 15, 2020

(86) PCT No.: PCT/US2020/033204
§ 371 (c)(1),
(2) Date: Oct. 25, 2021

(87) PCT Pub. No.: WO2020/232380
PCT Pub. Date: Nov. 19, 2020

(65) Prior Publication Data
US 2022/0238868 A1    Jul. 28, 2022

Related U.S. Application Data

(60) Provisional application No. 62/848,458, filed on May 15, 2019.

(51) Int. Cl.
*H01M 4/485*    (2010.01)
*H01M 4/02*    (2006.01)
*H01M 10/36*    (2010.01)

(52) U.S. Cl.
CPC ........... *H01M 4/485* (2013.01); *H01M 10/36* (2013.01); *H01M 2004/028* (2013.01)

(58) Field of Classification Search
CPC ................. H01M 4/485; H01M 10/36; H01M 2004/028; Y02E 60/10
See application file for complete search history.

(56) References Cited

U.S. PATENT DOCUMENTS

| | | | |
|---|---|---|---|
| 5,225,297 | A | 7/1993 | Garcia-Alvarado |
| 5,336,572 | A | 8/1994 | Koksbang |
| 6,322,927 | B1 | 11/2001 | Pistoia |
| 9,077,032 | B2 | 7/2015 | Doe |
| 9,997,778 | B2 | 6/2018 | Cao |

(Continued)

FOREIGN PATENT DOCUMENTS

| | | |
|---|---|---|
| CN | 103730630 A | 4/2014 |
| CN | 107221716 A | 9/2017 |

(Continued)

OTHER PUBLICATIONS

Liu et al. "Expanded hydrated vanadate for high-performance aqueous zinc-ion batteries" Energy Environ. Sci., 2019, 12, 2273 (Year: 2019).*

(Continued)

*Primary Examiner* — Lisa S Park
(74) *Attorney, Agent, or Firm* — Christensen O'Connor Johnson Kindness PLLC

(57) ABSTRACT

The present disclosure generally relates to cation-stabilized expanded hydrated vanadates, electrodes made therefrom, and batteries incorporating cathodes made from the cation-stabilized expanded hydrated vanadate.

18 Claims, 34 Drawing Sheets

(56) References Cited

U.S. PATENT DOCUMENTS

| | | | |
|---|---|---|---|
| 2015/0280232 A1 | 10/2015 | Cao | |
| 2017/0207492 A1* | 7/2017 | Adams | H01M 4/622 |
| 2018/0131012 A1* | 5/2018 | Mackenzie | H01M 10/0565 |
| 2019/0135652 A1* | 5/2019 | Huang | C01G 31/02 |
| 2020/0395606 A1* | 12/2020 | Adams | H01M 4/366 |

FOREIGN PATENT DOCUMENTS

| | | |
|---|---|---|
| WO | 2002030824 A1 | 4/2002 |
| WO | 2012051280 A2 | 4/2012 |
| WO | 2016197236 A1 | 12/2016 |

OTHER PUBLICATIONS

Maitra et al. "A Mesoporous High-Performance Supercapacitor Electrode . . . " Ind. Eng. Chem. Res. 2017, 56, 2444-2457. (Year: 2017).*

Deng et al. "Manganese ion pre-intercalated hydrated vanadium oxide as high-performance cathode for magnesium ion batteries" J. Mater. Chem. A, 2019,7, 10644-10650. . (Year: 2019).*

Abundance of Elements in Earth's Crust. Wikipedia. <https://en.wikipedia.org/wiki/Abundance_of_elements_in_Earth%27s_crust.> [Retrieved Nov. 2, 2021], 4 pages.

Al Salem, Hesham, et al. "Electrocatalytic polysulfide traps for controlling redox shuttle process of Li—S batteries." Journal of the American Chemical Society 137.36 (2015): 11542-11545.

Alfaruqi, Muhammad H., et al. "Electrochemical zinc intercalation in lithium vanadium oxide: a high-capacity zinc-ion battery cathode." Chemistry of Materials 29.4 (2017): 1684-1694.

Aminzadeh, A., and H. Sarikhani-Fard. "Raman spectroscopic study of Ni/Al2O3 catalyst." Spectrochimica Acta Part A: Molecular and Biomolecular Spectroscopy 55.7-8 (1999): 1421-1425.

An, Q. et al., Graphene decorated vanadium oxide nanowire aerogel for long-cycle-life magnesium battery cathodes, Nano Energy 18 (2015) 265-272.

Armand, Michel, and J-M. Tarascon. "Building better batteries." nature 451.7179 (2008): 652-657.

Augustyn, Veronica, et al. "High-rate electrochemical energy storage through Li+ intercalation pseudocapacitance." Nature materials 12.6 (2013): 518-522.

Augustyn, Veronica, Patrice Simon, and Bruce Dunn. "Pseudocapacitive oxide materials for high-rate electrochemical energy storage." Energy & Environmental Science 7.5 (2014): 1597-1614.

Avansi, W. et al., Local structure study of vanadium pentoxide, J Nanopart Res 13 (2011) 4937-4946.

Bacewicz, R. et al., A XANES study of the valence state of vanadium in lithium vanadate phosphate glasses, J. Mater. Sci. 40 (2005) 4267-4270.

Baddour-Hadjean, Rita, et al. "The Raman spectrum of the γ'-V2O5 polymorph: a combined experimental and DFT study." Journal of Raman Spectroscopy 46.4 (2015): 406-412.

Bai, M.-H. et al., Electrochemical codeposition of vanadium oxide and polypyrrole for high-performance supercapacitor with high working voltage, ACS Appl. Mater. Interfaces, 6(15) (2014) 12656-12664.

Barreca, Davide, Alberto Gasparotto, and Eugenio Tondello. "CVD Cu2O and CuO nanosystems characterized by XPS." Surface Science Spectra 14.1 (2007): 41-51.

Bi, Wenchao, et al. "Gradient oxygen vacancies in V2O5/PEDOT nanocables for high-performance supercapacitors." ACS Applied Energy Materials 2.1 (2019): 668-677.

Bi, Wenchao, et al. "Tailoring energy and power density through controlling the concentration of oxygen vacancies in V2O5/PEDOT nanocable-based supercapacitors." ACS applied materials & interfaces 11.18 (2019): 16647-16655.

Bose, S. et al., Carbon-based nanostructured materials and their composites as supercapacitor electrodes, Journal of Materials Chemistry, (2012) 767-784. doi:10.1039/c1jm14468e.

Boukhalfa, Sofiane, Kara Evanoff, and Gleb Yushin. "Atomic layer deposition of vanadium oxide on carbon nanotubes for high-power supercapacitor electrodes." Energy & Environmental Science 5.5 (2012): 6872-6879.

Burdyukh, S. V., et al. "Effect of hydrogenation on the optical properties and internal electrochromism in vanadium bentoxide xerogel films." Thin Solid Films 656 (2018): 22-29.

Cai, Yangsheng, et al. "Pilotaxitic Na1.1V3O7. 9 nanoribbons/graphene as high-performance sodium ion battery and aqueous zinc ion battery cathode." Energy Storage Materials 13 (2018): 168-174.

Callister, W. D., Fundamentals of Materials Science and Engineering, John Wiley & Sons, Inc, 2001.

Canepa, Pieremanuele, et al. "Odyssey of multivalent cathode materials: open questions and future challenges." Chemical reviews 117.5 (2017): 4287-4341.

Cano, Zachary P., et al. "Batteries and fuel cells for emerging electric vehicle markets." Nature Energy 3.4 (2018): 279-289.

Chae, Munseok S., et al. "Electrochemical zinc-ion intercalation properties and crystal structures of ZnMo6S8 and Zn2Mo6S8 chevrel phases in aqueous electrolytes." Inorganic chemistry 55.7 (2016): 3294-3301.

Chakraborty, Tanushree, et al. "Microscopic distribution of metal dopants and anion vacancies in Fe-doped BaTiO3-δ single crystals." Journal of Physics: Condensed Matter 25.23 (2013): 236002.

Chamoun, Mylad, et al. "Rechargeability of aqueous sulfate Zn/MnO2 batteries enhanced by accessible Mn2+ ions." Energy Storage Materials 15 (2018): 351-360.

Chao, Dongliang, et al. "A high-rate and stable quasi-solid-state zinc-ion battery with novel 2D layered zinc orthovanadate array." Advanced Materials 30.32 (2018): 1803181.

Chao, D. et al., An electrolytic Zn—MnO2 battery demonstrated for high-voltage and scalable energy storage, Angew. Chem. Int. Ed. 2019, 58, pp. 7823-7828.

Chen, Dong, et al. "Persistent zinc-ion storage in mass-produced V2O5 architectures." Nano Energy 60 (2019): 171-178.

Chen, Lineng, et al. "Ultrastable and high-performance Zn/VO2 battery based on a reversible single-phase reaction." Chemistry of Materials 31.3 (2019): 699-706.

Cheng, Yingwen, et al. "Highly reversible zinc-ion intercalation into chevrel phase Mo6S8 nanocubes and applications for advanced zinc-ion batteries." ACS applied materials & interfaces 8.22 (2016): 13673-13677.

Chu, Steven, Yi Cui, and Nian Liu. "The path towards sustainable energy." Nature materials 16.1 (2017): 16-22.

Chung, Sheng-Heng, and Arumugam Manthiram. "Lithium-sulfur batteries with the lowest self-discharge and the longest shelf life." ACS Energy Letters 2.5 (2017): 1056-1061.

Copper. X-ray Photoelectron Spectroscopy (XPS) Reference Pages,<http://www.xpsfitting.com/2012/01/copper.html> [retrieved Nov. 2, 2021], 3 pages.

Crabtree, George. "Perspective: The energy-storage revolution." Nature 526.7575 (2015): S92-S92.

Dai, Xi, et al. "Freestanding graphene/VO2 composite films for highly stable aqueous Zn-ion batteries with superior rate performance." Energy Storage Materials 17 (2019): 143-150.

Dees, Dennis W., et al. "Analysis of the Galvanostatic Intermittent Titration Technique (GITT) as applied to a lithium-ion porous electrode." Journal of Power Sources 189.1 (2009): 263-268.

Demeter, M., M. Neumann, and W. J. S. S. Reichelt. "Mixed-valence vanadium oxides studied by XPS." Surface Science 454 (2000): 41-44.

Deng, X. et al. Manganese ion pre-intercalated hydrated vanadium oxide as a high-performance cathode for magnesium ion batteries. Journal of Materials Chemistry A. 7, 2019, 10644-10650.

Deng, Yilin, et al. "In situ Raman spectroscopy of copper and copper oxide surfaces during electrochemical oxygen evolution reaction: identification of CuIII oxides as catalytically active species." ACS Catalysis 6.4 (2016): 2473-2481.

Ding, Junwei, et al. "Ultrafast Zn2+ intercalation and deintercalation in vanadium dioxide." Advanced Materials 30.26 (2018): 1800762.

(56) References Cited

OTHER PUBLICATIONS

Dong, Liubing, et al. "Extremely safe, high-rate and ultralong-life zinc-ion hybrid supercapacitors." Energy Storage Materials 13 (2018): 96-102.
Dunn, Bruce, Haresh Kamath, and Jean-Marie Tarascon. "Electrical energy storage for the grid: a battery of choices." Science 334.6058 (2011): 928-935.
Fang, Guozhao, et al. "Recent advances in aqueous zinc-ion batteries." ACS Energy Letters 3.10 (2018): 2480-2501.
Fang, Guozhao, et al. "Suppressing manganese dissolution in potassium manganate with rich oxygen defects engaged high-energy-density and durable aqueous zinc-ion battery." Advanced Functional Materials 29.15 (2019): 1808375.
Fang, Guozhao, et al. "Facile synthesis of potassium vanadate cathode material with superior cycling stability for lithium ion batteries." Journal of Power Sources 275 (2015): 694-701.
Foo, Ce Yao, et al. "Flexible and Highly Scalable V2O5-rGO Electrodes in an Organic Electrolyte for Supercapacitor Devices." Advanced Energy Materials 4.12 (2014): 1400236.
Fu, Yanqing, et al. "High-Performance Reversible Aqueous Zn-Ion Battery Based on Porous MnOx Nanorods Coated by MOF-Derived N-Doped Carbon." Advanced Energy Materials 8.26 (2018): 1801445.
Gaur, A., and B. D. Shrivastava. "Speciation using X-ray absorption fine structure (XAFS)." Review Journal of Chemistry 5.4 (2015): 361-398.
Godshall, N. A., I. D. Raistrick, and R. A. Huggins. "Thermodynamic investigations of ternary lithium-transition metal-oxygen cathode materials." Materials Research Bulletin 15.5 (1980): 561-570.
Goodenough, J. B. et al., Challenges for rechargeable Li batteries, Chem. Mater. 22 (2010) 587-603.
Liu, Chaofeng, et al. "Expanded hydrated vanadate for high-performance aqueous zinc-ion batteries." Energy & Environmental Science 12.7 (2019): 2273-2285.
Liu, Chaofeng, et al. "Exploiting high-performance anode through tuning the character of chemical bonds for Li-ion batteries and capacitors." Advanced Energy Materials 7.1 (2017): 1601127.
Liu, Chang, et al. "Advanced materials for energy storage." Advanced materials 22.8 (2010): E28-E62.
Liu, Chaofeng, et al. "High power high safety battery with electrospun Li3V2 (PO4) 3 cathode and Li4Ti5O12 anode with 95% energy efficiency." Energy Storage Materials 5 (2016): 93-102.
Liu, Chaofeng, et al. "Interphases, interfaces, and surfaces of active materials in rechargeable batteries and perovskite solar cells." Advanced Materials 33.22 (2021): 1905245.
Liu, Chaofeng, Zachary G. Neale, and Guozhong Cao. "Understanding electrochemical potentials of cathode materials in rechargeable batteries." Materials Today 19.2 (2016): 109-123.
Liu, Fei, et al. "V2O5 nanospheres with mixed vanadium valences as high electrochemically active aqueous zinc-ion battery cathode." Nano-Micro Letters 11.1 (2019): 1-11.
Liu, Guoxue, et al. "K+ pre-intercalated manganese dioxide with enhanced Zn 2+ diffusion for high rate and durable aqueous zinc-ion batteries." Journal of Materials Chemistry A 7.36 (2019): 20806-20812.
Liu, Kai, et al. "Materials for lithium-ion battery safety." Science advances 4.6 (2018): eaas9820.
Liu, P. et al. Vanadium-oxide-based electrode materials for Li-ion batteries. The University of Queensland, School of Chemical Engineering Doctor of Philosophy Thesis, 2016.
Liu, Pengcheng, et al. "Recent progress in the applications of vanadium-based oxides on energy storage: from low-dimensional nanomaterials synthesis to 3D micro/nano-structures and free-standing electrodes fabrication." Advanced Energy Materials 7.23 (2017): 1700547.
Liu, Wenbao, et al. "Investigation of zinc ion storage of transition metal oxides, sulfides, and borides in zinc ion battery systems." Chemical Communications 53.51 (2017): 6872-6874.
Liu, X. et al., Calcium vanadate sub-microfibers as highly reversible host cathode material for aqueous zinc-ion batteries, Chem. Commun. 55 (2019) 2265-2268.
Liu, Xiang, et al. "Thermal runaway of lithium-ion batteries without internal short circuit." Joule 2.10 (2018): 2047-2064.
Liu, Yanyi, et al. "V2O5 nano-electrodes with high power and energy densities for thin film li-ion batteries." Advanced Energy Materials 1.2 (2011): 194-202.
Liu, Yi, et al. "Electroactivation-induced spinel ZnV2O4 as a high-performance cathode material for aqueous zinc-ion battery." Nano Energy 67 (2020): 104211.
Liu, Zhen, Giridhar Pulletikurthi, and Frank Endres. "A prussian blue/zinc secondary battery with a bio-ionic liquid-water mixture as electrolyte." ACS applied materials & interfaces 8.19 (2016): 12158-12164.
Livage, J. "Vanadium pentoxide gels." Chemistry of Materials 3.4 (1991): 578-593.
Londoño-Calderón, C. L., C. Vargas-Hernández, and J. F. Jurado. "Desorption influence of water on structural, electrical properties and molecular order of vanadium pentoxide xerogel films." Revista mexicana de física 56.5 (2010): 411-415.
Lu, Xihong, et al. "Flexible solid-state supercapacitors: design, fabrication and applications." Energy & Environmental Science 7.7 (2014): 2160-2181.
Luo, Yu-Ran. Comprehensive handbook of chemical bond energies. CRC press, 2007.
Manthiram, Arumugam, et al. "Nickel-rich and lithium-rich layered oxide cathodes: progress and perspectives." Advanced Energy Materials 6.1 (2016): 1501010.
Marcus, Yizhak. "Ionic radii in aqueous solutions." Chemical Reviews 88.8 (1988): 1475-1498.
Massé, Robert C., et al. "Energy storage through intercalation reactions: electrodes for rechargeable batteries." National Science Review 4.1 (2017): 26-53.
McNulty, David, D. Noel Buckley, and Colm O'Dwyer. "Optimizing the structure and yield of vanadium oxide nanotubes by periodic 2D layer scrolling." RSC advances 6.47 (2016): 40932-40944.
Melot, Brent C., and J-M. Tarascon. "Design and preparation of materials for advanced electrochemical storage." Accounts of chemical research 46.5 (2013): 1226-1238.
Meng, Jiashen, et al. "A synergistic effect between layer surface configurations and K ions of potassium vanadate nanowires for enhanced energy storage performance." Journal of Materials Chemistry A 4.13 (2016): 4893-4899.
Ming, Fangwang, et al. "Layered Mg x V2O5• n H2O as cathode material for high-performance aqueous zinc ion batteries." ACS Energy Letters 3.10 (2018): 2602-2609.
Ming, Jun, et al. "Zinc-ion batteries: materials, mechanisms, and applications." Materials Science and Engineering: R: Reports 135 (2019): 58-84.
Mizushima, K. J. P. C., et al. "LixCoO2 (0<x<−1): A new cathode material for batteries of high energy density." Materials Research Bulletin 15.6 (1980): 783-789.
Muldoon, John, Claudiu B. Bucur, and Thomas Gregory. "Quest for nonaqueous multivalent secondary batteries: magnesium and beyond." Chemical reviews 114.23 (2014): 11683-11720.
O'Dwyer, Colm, et al. "Vanadate conformation variations in vanadium pentoxide nanostructures." Journal of the Electrochemical Society 154.8 (2007): K29-K35.
Pan, An Qiang, et al. "Uniform V2O5 nanosheet-assembled hollow microflowers with excellent lithium storage properties." Energy & Environmental Science 6.5 (2013): 1476-1479.
Pan, Huilin, et al. "Reversible aqueous zinc/manganese oxide energy storage from conversion reactions." Nature Energy 1.5 (2016): 1-7.
Pang, Qiang, et al. "H2V3O8 nanowire/graphene electrodes for aqueous rechargeable zinc ion batteries with high rate capability and large capacity." Advanced Energy Materials 8.19 (2018): 1800144.
Park, Heai-Ku. "Manganese vanadium oxides as cathodes for lithium batteries." Solid State Ionics 176.3-4 (2005): 307-312.
Parker, Joseph F., et al. "Translating materials-level performance into device-relevant metrics for zinc-based batteries." Joule 2.12 (2018): 2519-2527.

(56) References Cited

OTHER PUBLICATIONS

Peng, Xiang, et al. "Hydrogenated V2O5 nanosheets for superior lithium storage properties." Advanced Functional Materials 26.5 (2016): 784-791.
Perera, Sanjaya D., et al. "Vanadium oxide nanowire-carbon nanotube binder-free flexible electrodes for supercapacitors." Advanced Energy Materials 1.5 (2011): 936-945.
Petkov, Valeri, et al. "Structure of V2O5-nH2O Xerogel Solved by the Atomic Pair Distribution Function Technique." Journal of the American Chemical Society 124.34 (2002): 10157-10162.
Potiron, E., et al. "Electrochemically synthesized vanadium oxides as lithium insertion hosts." Electrochimica Acta 45.1-2 (1999): 197-214.
Potiron, E., et al. "Electrochemical synthesis, characterization and lithium intercalation properties of e-MxV2O5+ y. nH2O (M=NiII, CuII or MnIV)." Journal of Physics and Chemistry of Solids 62.8 (2001): 1447-1455.
Qian Ii, et al. "Boosting the cyclic stability of aqueous zinc-ion battery based on Al-doped V10O24•12H2O cathode materials." ACS applied materials & interfaces 11.23 (2019): 20888-20894.
Qin, Haigang, et al. "V2O5 hollow spheres as high rate and long life cathode for aqueous rechargeable zinc ion batteries." Electrochimica Acta 306 (2019): 307-316.
Remith, P., and N. Kalaiselvi. "Li1.2Mn0.6Ni0.1Co0.1O2 microspheres constructed by hierarchically arranged nanoparticles as lithium battery cathode with enhanced electrochemical performance." Nanoscale 6.24 (2014): 14724-14732.
Saha, Partha, et al. "Rechargeable magnesium battery: Current status and key challenges for the future." Progress in Materials Science 66 (2014): 1-86.
Sambandam, Balaji, et al. "Aqueous rechargeable Zn-ion batteries: an imperishable and high-energy Zn2V2O7 nanowire cathode through intercalation regulation." Journal of Materials Chemistry A 6.9 (2018): 3850-3856.
Sambandam, Balaji, et al. "K2V6O16•2.7H2O nanorod cathode: an advanced intercalation system for high energy aqueous rechargeable Zn-ion batteries." Journal of Materials Chemistry A 6.32 (2018): 15530-15539.
Sanchez, C., J. Livage, and G. Lucazeau. "Infrared and Raman study of amorphous V2O5." Journal of Raman Spectroscopy 12.1 (1982): 68-72.
Saravanakumar, Balakrishnan, Kamatchi Kamaraj Purushothaman, and Gopalan Muralidharan. "V2O5/nitrogen enriched mesoporous carbon spheres nanocomposite as supercapacitor electrode." Microporous and Mesoporous Materials 258 (2018): 83-94.
Yoshino, Akira. "The birth of the lithium-ion battery." Angewandte Chemie International Edition 51.24 (2012): 5798-5800.
Yu, Minghao, et al. "Valence-optimized vanadium oxide supercapacitor electrodes exhibit ultrahigh capacitance and super-long cyclic durability of 100 000 cycles." Advanced Functional Materials 25.23 (2015): 3534-3540.
Yu, Peng, et al. "Flexible Zn-ion batteries: recent progresses and challenges." Small 15.7 (2019): 1804760.
Zeng, Xiaohui, et al. "Recent progress and perspectives on aqueous Zn-based rechargeable batteries with mild aqueous electrolytes." Energy Storage Materials 20 (2019): 410-437.
Zhai, Yunpu, et al. "Carbon materials for chemical capacitive energy storage." Advanced materials 23.42 (2011): 4828-4850.
Zhan, Shiying, et al. "Structural and electrochemical properties of Al3+ doped V2O5 nanoparticles prepared by an oxalic acid assisted soft-chemical method." Journal of alloys and compounds 502.1 (2010): 92-96.
Zhang, Fan, Peter Y. Zavalij, and M. Stanley Whittingham. "Hydrothermal synthesis and characterization of a series of novel zinc vanadium oxides as cathode materials." Mat. res. Soc. Symp. Proc., vol. 496 (1997).
Zhang, Leyuan, et al. "Towards high-voltage aqueous metal-ion batteries beyond 1.5 V: the zinc/zinc hexacyanoferrate system." Advanced Energy Materials 5.2 (2015): 1400930.
Zhang, Li Li, and X. S. Zhao. "Carbon-based materials as supercapacitor electrodes." Chemical Society Reviews 38.9 (2009): 2520-2531.
Zhang, Leyuan, et al. "Morphology-dependent electrochemical performance of zinc hexacyanoferrate cathode for zinc-ion battery." Scientific reports 5.1 (2015): 18263. pp. 1-11.
Zhang, Ning, et al. "Hydrated layered vanadium oxide as a highly reversible cathode for rechargeable aqueous zinc batteries." Advanced Functional Materials 29.10 (2019): 1807331.
Zhang, Ning, et al. "Cation-deficient spinel ZnMn2O4 cathode in Zn (CF3SO3) 2 electrolyte for rechargeable aqueous Zn-ion battery." Journal of the American Chemical Society 138.39 (2016): 12894-12901.
Zhang, Ning, et al. "Rechargeable aqueous zinc-manganese dioxide batteries with high energy and power densities." Nature communications 8.1 (2017): 405. pp. 1-9.
Zhang, Ning, et al. "Rechargeable aqueous Zn—V2O5 battery with high energy density and long cycle life." ACS Energy Letters 3.6 (2018): 1366-1372.
Zhang, Jingyan, et al. "Bimetallic nickel cobalt sulfide as efficient electrocatalyst for Zn—air battery and water splitting." Nano-micro letters 11.1 (2019): 2.
Zhang, Yifu, et al. "Ammonium vanadium oxide [(NH4) 2V4O9] sheets for high capacity electrodes in aqueous zinc ion batteries." ACS Applied Energy Materials 2.11 (2019): 7861-7869.
Zhao, Qing, et al. "High-capacity aqueous zinc batteries using sustainable quinone electrodes." Science advances 4.3 (2018): eaao1761.
Zhao, Shuai, et al. "Unravelling the reaction chemistry and degradation mechanism in aqueous Zn/MnO 2 rechargeable batteries." Journal of Materials Chemistry A 6.14 (2018): 5733-5739.
Zhao, Xin, et al. "The role of nanomaterials in redox-based supercapacitors for next generation energy storage devices." Nanoscale 3.3 (2011): 839-855.
Zhao, Yunlong, et al. "Stable alkali metal ion intercalation compounds as optimized metal oxide nanowire cathodes for lithium batteries." Nano letters 15.3 (2015): 2180-2185.
Zheng, Jiqi, et al. "New strategy for the morphology-controlled synthesis of V2O5 microcrystals with enhanced capacitance as battery-type supercapacitor electrodes." Crystal Growth & Design 18.9 (2018): 5365-5376.
Zheng, Jiqi, et al. "Hydrothermal encapsulation of VO 2 (A) nanorods in amorphous carbon by carbonization of glucose for energy storage devices." Dalton Transactions 47.2 (2018): 452-464.
Zheng, Jiqi, et al. "Fast and reversible zinc ion intercalation in Al-ion modified hydrated vanadate." Nano Energy 70 (2020): 104519.
Zhou, Jiang, et al. "Investigation of V 2 O 5 as a low-cost rechargeable aqueous zinc ion battery cathode." Chemical communications 54.35 (2018): 4457-4460.
Zhou, Ye, et al. "Significance of engineering the octahedral units to promote the oxygen evolution reaction of spinel oxides." Advanced Materials 31.41 (2019): 1902509.
Zhu, Chuyu, et al. "Binder-free stainless steel@ Mn 3 O 4 nanoflower composite: a high-activity aqueous zinc-ion battery cathode with high-capacity and long-cycle-life." Journal of Materials Chemistry A 6.20 (2018): 9677-9683.
Zhu, Kai, et al. "Synergetic effects of Al3+ doping and graphene modification on the electrochemical performance of V2O5 cathode materials." ChemSusChem 8.6 (2015): 1017-1025.
Zhu, Yujie, and Chunsheng Wang. "Galvanostatic intermittent titration technique for phase-transformation electrodes." The Journal of Physical Chemistry C 114.6 (2010): 2830-2841.
International Search Report and Written Opinion mailed Aug. 17, 2020, issued in corresponding International Application No. PCT/US2020/033204, filed May 15, 2020, 9 pages.
International Preliminary Report on Patentability mailed Nov. 16, 2021, issued in corresponding International Application No. PCT/US2020/033204, filed May 15, 2020, 7 pages.
Seidler, G. T., et al. "A laboratory-based hard x-ray monochromator for high-resolution x-ray emission spectroscopy and x-ray absorption near edge structure measurements." Review of scientific instruments 85.11 (2014): 113906.

(56) References Cited

OTHER PUBLICATIONS

Selvakumaran, Dinesh, et al. "A review on recent developments and challenges of cathode materials for rechargeable aqueous Zn-ion batteries." Journal of Materials Chemistry A 7.31 (2019): 18209-18236.

Senguttuvan, Premkumar, et al. "A high power rechargeable nonaqueous multivalent Zn/V2O5 battery." Advanced Energy Materials 6.24 (2016): 1600826.

Shan, Lutong, et al. "Observation of combination displacement/intercalation reaction in aqueous zinc-ion battery." Energy Storage Materials 18 (2019): 10-14.

Shin, Jaeho, et al. "Hydrated intercalation for high-performance aqueous zinc ion batteries." Advanced Energy Materials 9.14 (2019): 1900083.

Simon, Patrice, Yury Gogotsi, and Bruce Dunn. "Where do batteries end and supercapacitors begin?" Science 343.6176 (2014): 1210-1211.

Snook, Graeme A., Pon Kao, and Adam S. Best. "Conducting-polymer-based supercapacitor devices and electrodes." Journal of power sources 196.1 (2011): 1-12.

Song, Huanqiao, et al. "Self-doped V4+—V2O5 nanoflake for 2 Li-ion intercalation with enhanced rate and cycling performance." Nano Energy 22 (2016): 1-10.

Song, Ming, et al. "Recent advances in Zn-ion batteries." Advanced Functional Materials 28.41 (2018): 1802564.

Soundharrajan, Vaiyapuri, et al. "Na2V6O16• 3H2O barnesite nanorod: an open door to display a stable and high energy for aqueous rechargeable Zn-ion batteries as cathodes." Nano letters 18.4 (2018): 2402-2410.

Sun, Wei, et al. "Zn/MnO2 battery chemistry with H+ and Zn2+ coinsertion." Journal of the American Chemical Society 139.29 (2017): 9775-9778.

Suo, Liumin, et al. ""Water-in-salt" electrolyte enables high-voltage aqueous lithium-ion chemistries." Science 350.6263 (2015): 938-943.

Tang, Boya, et al. "Issues and opportunities facing aqueous zinc-ion batteries." Energy & Environmental Science 12.11 (2019): 3288-3304.

Tang, Boya, et al. "Potassium vanadates with stable structure and fast ion diffusion channel as cathode for rechargeable aqueous zinc-ion batteries." Nano Energy 51 (2018): 579-587.

Tang, Boya, et al. "Engineering the interplanar spacing of ammonium vanadates as a high-performance aqueous zinc-ion battery cathode." Journal of Materials Chemistry A 7.3 (2019): 940-945.

Tian, Meng, et al. "Structural engineering of hydrated vanadium oxide cathode by K+ incorporation for high-capacity and long-cycling aqueous zinc ion batteries." Energy Storage Materials 29 (2020): 9-16.

Torardi, C. C., et al. "High lithium capacity MxV2O5Ay• nH2O for rechargeable batteries." Journal of Solid State Chemistry 163.1 (2002): 93-99.

Trócoli, Rafael, and Fabio La Mantia. "An aqueous zinc-ion battery based on copper hexacyanoferrate." ChemSusChem 8.3 (2015): 481-485.

Van der Heide, Paul. X-ray photoelectron spectroscopy: an introduction to principles and practices. John Wiley & Sons. 2011.

Verma, Vivek, et al. "Progress in rechargeable aqueous zinc-and aluminum-ion battery electrodes: challenges and outlook." Advanced Sustainable Systems 3.1 (2019): 1800111.

Wan, Fang, et al. "Aqueous rechargeable zinc/sodium vanadate batteries with enhanced performance from simultaneous insertion of dual carriers." Nature communications (2018)9: 1656, pp. 1-11.

Wang, Fei, et al. "A rechargeable aqueous Zn 2+-battery with high power density and a long cycle-life." Energy & Environmental Science 11.11 (2018): 3168-3175.

Wang, Guoping, Lei Zhang, and Jiujun Zhang. "A review of electrode materials for electrochemical supercapacitors." Chemical Society Reviews 41.2 (2012): 797-828.

Wang, Huali, et al. "Binder-free V2O5 cathode for greener rechargeable aluminum battery." ACS applied materials & interfaces 7.1 (2015): 80-84.

Wang, Huali, et al. "Open-structured V2O5• nH2O nanoflakes as highly reversible cathode material for monovalent and multivalent intercalation batteries." Advanced Energy Materials 7.14 (2017): 1602720.

Wang, John, et al. "Pseudocapacitive contributions to electrochemical energy storage in TiO2 (anatase) nanoparticles." The Journal of Physical Chemistry C 111.40 (2007): 14925-14931.

Wang, Lulu, et al. "Transformed akhtenskite MnO2 from Mn3O4 as cathode for a rechargeable aqueous zinc ion battery." ACS Sustainable Chemistry & Engineering 6.12 (2018): 16055-16063.

Wang, Qiushi, et al. "In-situ grown manganese silicate from biomass-derived heteroatom-doped porous carbon for supercapacitors with high performance." Journal of colloid and interface science 534 (2019): 142-155.

Wang, Yao, Jing Li, and Zidong Wei. "Transition-metal oxide-based catalysts for the oxygen reduction reaction." Journal of Materials Chemistry A 6.18 (2018): 8194-8209.

Wei, Qiulong, et al. "Hydrated vanadium pentoxide with superior sodium storage capacity." Journal of Materials Chemistry A 3.15 (2015): 8070-8075.

Wei, Tongye, et al. "Highly reversible and long-life cycling aqueous zinc-ion battery based on ultrathin (NH 4) 2 V 10 O 25• 8H 2 O nanobelts." Journal of Materials Chemistry A 6.41 (2018): 20402-20410.

Wei, Tongye, et al. "An electrochemically induced bilayered structure facilitates long-life zinc storage of vanadium dioxide." Journal of Materials Chemistry A 6.17 (2018): 8006-8012.

Whittingham, M. Stanley. "Intercalation chemistry and energy storage." Journal of Solid State Chemistry 29.3 (1979): 303-310.

Whittingham, M. Stanley. "Electrical energy storage and intercalation chemistry." Science 192.4244 (1976): 1126-1127.

Winter, Martin, and Ralph J. Brodd. "What are batteries, fuel cells, and supercapacitors?." Chemical reviews 104.10 (2004): 4245-4269.

Wu, Tao, et al. "Unraveling the role of structural water in bilayer V 2 O 5 during Zn 2+-intercalation: insights from DFT calculations." Journal of Materials Chemistry A 7.10 (2019): 5612-5620.

Wu, Zili, et al. "Raman spectroscopic study of V/θ-Al2O3 catalysts: quantification of surface vanadia species and their structure reduced by hydrogen." The Journal of Physical Chemistry C 111.44 (2007): 16460-16469.

Xia, Chuan, et al. "Highly stable aqueous zinc-ion storage using a layered calcium vanadium oxide bronze cathode." Angewandte Chemie International Edition 57.15 (2018): 3943-3948.

Xiong, Ting, et al. "Defect engineering of oxygen-deficient manganese oxide to achieve high-performing aqueous zinc ion battery." Advanced Energy Materials 9.14 (2019): 1803815.

Xu, J. F., et al. "Raman spectra of CuO nanocrystals." Journal of Raman spectroscopy 30.5 (1999): 413-415.

Xu, Wangwang, et al. "Defect engineering activating (Boosting) zinc storage capacity of MoS2." Energy Storage Materials 16 (2019): 527-534.

Xu, Yin, and Dezhi Sun. "Structure and catalytic activity of MoZnAlO catalyst for degradation of cationic red GTL under room conditions." Chemical Engineering Journal 183 (2012): 332-338.

Yadav, Gautam G., et al. "Regenerable Cu-intercalated MnO 2 layered cathode for highly cyclable energy dense batteries." Nature communications 8.1 (2017): 1-9.

Yamada, Yuki, et al. "Hydrate-melt electrolytes for high-energy-density aqueous batteries." Nature Energy 1.10 (2016): 1-9.

Yan, Jun, et al. "Recent advances in design and fabrication of electrochemical supercapacitors with high energy densities." Advanced Energy Materials 4.4 (2014): 1300816.

Yan, Mengyu, et al. "Water-lubricated intercalation in V2O5• nH2O for high-capacity and high-rate aqueous rechargeable zinc batteries." Advanced materials 30.1 (2018): 1703725.

Yang, Yongqiang, et al. "Li+ intercalated V 2 O 5• n H 2 O with enlarged layer spacing and fast ion diffusion as an aqueous zinc-ion battery cathode." Energy & Environmental Science 11.11 (2018): 3157-3162.

(56) References Cited

OTHER PUBLICATIONS

Yang, Yongqiang, et al. "Transition metal ion-preintercalated V2O5 as high-performance aqueous zinc-ion battery cathode with broad temperature adaptability." Nano Energy 61 (2019): 617-625.

Yao, Jinhuan, et al. "Revitalized interest in vanadium pentoxide as cathode material for lithium-ion batteries and beyond." Energy Storage Materials 11 (2018): 205-259.

Yoo, Hyun Deog, et al. "Mg rechargeable batteries: an on-going challenge." Energy & Environmental Science 6.8 (2013): 2265-2279.

Gummow, Rosalind J., et al. "Calcium-ion batteries: current state-of-the-art and future perspectives." Advanced Materials 30.39 (2018): 1801702.

Guo, Daoyou, et al. "Room temperature ferromagnetism in (Ga 1-x Mn x) 2 O 3 epitaxial thin films." Journal of Materials Chemistry C 3.8 (2015): 1830-1834.

Guo, Shan, et al. "Structural perspective on revealing energy storage behaviors of silver vanadate cathodes in aqueous zinc-ion batteries." Acta Materialia 180 (2019): 51-59.

Guo, Xun, et al. "Mechanistic insights of Zn2+ storage in sodium vanadates." Advanced Energy Materials 8.27 (2018): 1801819.

Gupta, Tanya, et al. "Improving the cycle life of a high-rate, high-potential aqueous dual-ion battery using hyper-dendritic zinc and copper hexacyanoferrate." Journal of Power Sources 305 (2016): 22-29.

Hagemann, H., et al. "Raman spectra of single crystal CuO." Solid state communications 73.6 (1990): 447-451.

Han, Man Huon, et al. "A comprehensive review of sodium layered oxides: powerful cathodes for Na-ion batteries." Energy & Environmental Science 8.1 (2015): 81-102.

Hardcastle, Franklin D., and Israel E. Wachs. "Determination of vanadium-oxygen bond distances and bond orders by Raman spectroscopy." The Journal of Physical Chemistry 95.13 (1991): 5031-5041.

Hayner, Cary M., Xin Zhao, and Harold H. Kung. "Materials for rechargeable lithium-ion batteries." Annual review of chemical and biomolecular engineering 3 (2012): 445-471.

He, A. J. et al., Enhancing Zn-ion storage capability of hydrated vanadium pentoxide by the strategic introduction of La3þ, ChemSusChem 13 (6) (2019) 1568-1574.

He, Jiarui, et al. "Freestanding 1T MoS 2/graphene heterostructures as a highly efficient electrocatalyst for lithium polysulfides in Li—S batteries." Energy & Environmental Science 12.1 (2019): 344-350.

He, Pan, et al. "Sodium ion stabilized vanadium oxide nanowire cathode for high-performance zinc-ion batteries." Advanced Energy Materials 8.10 (2018): 1702463.

Holland, Gregory P., et al. "Comparison of V 2 O 5 xerogels prepared by the vanadate and alkoxide routes using X-Ray absorption and other methods." Journal of the Electrochemical Society 150.6 (2003): A721-A725.

Horrocks, Gregory A., et al. "Vanadium K-edge X-ray absorption spectroscopy as a probe of the heterogeneous lithiation of V2O5: first-principles modeling and principal component analysis." The Journal of Physical Chemistry C 120.42 (2016): 23922-23932.

Hryha, Eduard, Elin Rutqvist, and Lars Nyborg. "Stoichiometric vanadium oxides studied by XPS." Surface and interface analysis 44.8 (2012): 1022-1025.

Hu, Ping, et al. "Zn/V2O5 aqueous hybrid-ion battery with high voltage platform and long cycle life." ACS applied materials & interfaces 9.49 (2017): 42717-42722.

Hu, Ping, et al. "Highly durable Na2V6O16• 1.63 H2O nanowire cathode for aqueous zinc-ion battery." Nano letters 18.3 (2018): 1758-1763.

Hua, Li, et al. "Ultrathin and large-sized vanadium oxide nanosheets mildly prepared at room temperature for high performance fiber-based supercapacitors." Journal of Materials Chemistry A 5.6 (2017): 2483-2487.

Huang, Haijian, et al. "Fast Na-Ion Intercalation in Zinc Vanadate for High-Performance Na-Ion Hybrid Capacitor." Advanced Energy Materials 8.35 (2018): 1802800.

Islam, Saiful, et al. "A new rechargeable battery based on a zinc anode and a NaV 6 O 15 nanorod cathode." Chemical Communications 55.26 (2019): 3793-3796.

Islam, Saiful, et al. "Facile synthesis and the exploration of the zinc storage mechanism of β-MnO 2 nanorods with exposed (101) planes as a novel cathode material for high performance eco-friendly zinc-ion batteries." Journal of Materials Chemistry A 5.44 (2017): 23299-23309.

Jaffari, G. Hassnain, et al. "Study of surface-active modes and defects in single-phase Li-incorporated MgO nanoparticles." The Journal of Physical Chemistry C 119.50 (2015): 28182-28189.

Jahrman, Evan P., et al. "Laboratory-based x-ray absorption spectroscopy on a working pouch cell battery at industrially-relevant charging rates." Journal of The Electrochemical Society (2019).

Jahrman, Evan P., et al. "An improved laboratory-based x-ray absorption fine structure and x-ray emission spectrometer for analytical applications in materials chemistry research." Review of Scientific Instruments 90.2 (2019): 024106.

Janousch, Markus, et al. "Role of oxygen vacancies in Cr-doped SrTiO3 for resistance-change memory." Advanced materials 19.17 (2007): 2232-2235.

Jia, Zhijun, Baoguo Wang, and Yi Wang. "Copper hexacyanoferrate with a well-defined open framework as a positive electrode for aqueous zinc ion batteries." Materials Chemistry and Physics 149 (2015): 601-606.

Jiang, Hanmei, et al. "Fabrication of (NH4) 2V3O8 nanoparticles encapsulated in amorphous carbon for high capacity electrodes in aqueous zinc ion batteries." Chemical Engineering Journal 382 (2020): 122844.

Jiao, Tianpeng, et al. "Binder-free hierarchical VS 2 electrodes for high-performance aqueous Zn ion batteries towards commercial level mass loading." Journal of Materials Chemistry A 7.27 (2019): 16330-16338.

Kasiri, Ghoncheh, et al. "An electrochemical investigation of the aging of copper hexacyanoferrate during the operation in zinc-ion batteries." Electrochimica Acta 222 (2016): 74-83.

Kim, Haegyeom, et al. "Aqueous rechargeable Li and Na ion batteries." Chemical reviews 114.23 (2014): 11788-11827.

Konarov, Aishuak, et al. "Present and future perspective on electrode materials for rechargeable zinc-ion batteries." ACS Energy Letters 3.10 (2018): 2620-2640.

Kong, Lingping, et al. "Free-standing T-Nb2O5/graphene composite papers with ultrahigh gravimetric/volumetric capacitance for Li-ion intercalation pseudocapacitor." ACS nano 9.11 (2015): 11200-11208.

Kundu, Dipan, et al. "Organic cathode for aqueous Zn-ion batteries: taming a unique phase evolution toward stable electrochemical cycling." Chemistry of materials 30.11 (2018): 3874-3881.

Kundu, Dipan, et al. "A high-capacity and long-life aqueous rechargeable zinc battery using a metal oxide intercalation cathode." Nature Energy 1.10 (2016): 1-8.

Lang, Xing-You, et al. "Ultrahigh-power pseudocapacitors based on ordered porous heterostructures of electron-correlated oxides." Advanced Science 3.5 (2016): 1500319.

Larcher, Dominique, and Jean-Marie Tarascon. "Towards greener and more sustainable batteries for electrical energy storage." Nature chemistry 7.1 (2015): 19-29.

Lee, Boeun, et al. "Elucidating the intercalation mechanism of zinc ions into α-MnO 2 for rechargeable zinc batteries." Chemical communications 51.45 (2015): 9265-9268.

Lee, J. et al., "Electrodeposition of hydrated vanadium pentoxide on nanoporous carbon cloth for hybrid energy storage," Sustain. Energy & Fuels, 2018, 2, pp. 577-588.

Lee, Jung Woo, et al. "Extremely stable cycling of ultra-thin V 2 O 5 nanowire-graphene electrodes for lithium rechargeable battery cathodes." Energy & Environmental Science 5.12 (2012): 9889-9894.

Lee, S. et al., Raman spectroscopic studies of amorphous vanadium oxide thin films, Solid State Ionics 165 (2003) 111-116.

(56) References Cited

OTHER PUBLICATIONS

Li, Chunbao, et al. "The dual roles of oxodiperoxovanadate both as a nucleophile and an oxidant in the green oxidation of benzyl alcohols or benzyl halides to aldehydes and ketones." Angewandte Chemie International Edition 42.41 (2003): 5063-5066.

Li, Yingbo, et al. "Recent advances in flexible zinc-based rechargeable batteries." Advanced Energy Materials 9.1 (2019): 1802605.

Li, Matthew, et al. "30 years of lithium-ion batteries." Advanced Materials 30.33 (2018): 1800561.

Li, M. et al., Controlling the formation of rodlike V2O5 nanocrystals on reduced graphene oxide for high-performance supercapacitors, ACS Appl. Mater. Interfaces, 5(21) (2013) 11462-11470.

Li, Xinyuan, et al. "Effects of preinserted Na ions on Li-ion electrochemical intercalation properties of V2O5." ACS applied materials & interfaces 8.37 (2016): 24629-24637.

Li, Yanwei, et al. "Leaf-Like V2O5 Nanosheets Fabricated by a Facile Green Approach as High Energy Cathode Material for Lithium-Ion Batteries." Advanced Energy Materials 3.9 (2013): 1171-1175.

Li, Hongfei, et al. "MoS2 nanosheets with expanded interlayer spacing for rechargeable aqueous Zn-ion batteries." Energy Storage Materials 19 (2019): 94-101.

Liang, Yaru, et al. "Nanocomposite materials for the sodium-ion battery: a review." Small 14.5 (2018): 1702514.

Liu, Bo-Tian, et al. "Extraordinary pseudocapacitive energy storage triggered by phase transformation in hierarchical vanadium oxides." Nature communications 9.1 (2018): 1-9.

Liu, Canzheng, et al. "Boosting the cycling stability of hydrated vanadium pentoxide by Y3+ pillaring for sodium-ion batteries." Materials today energy 11 (2019): 218-227.

\* cited by examiner

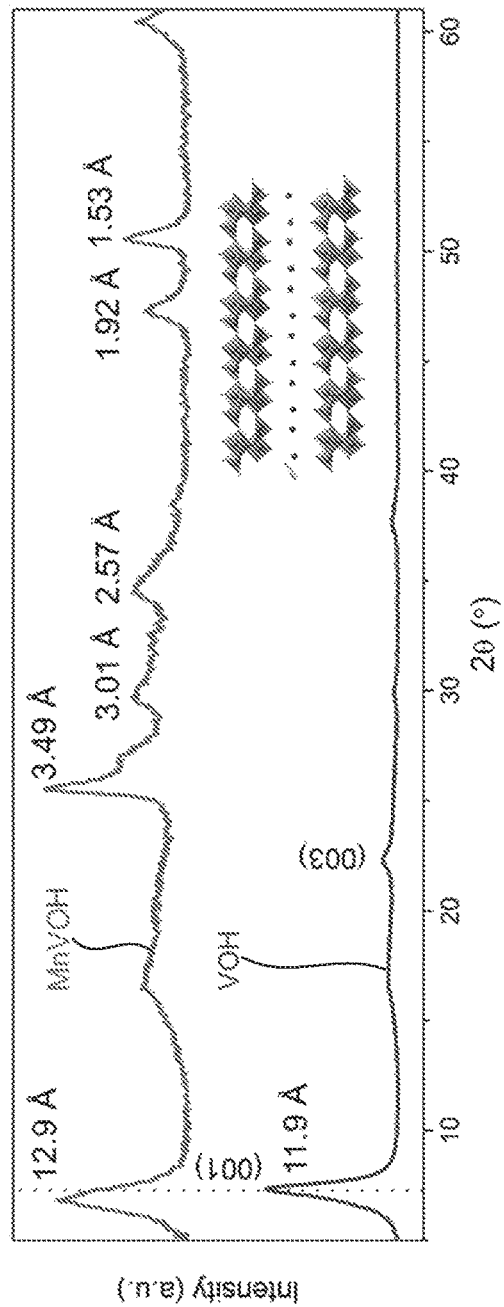
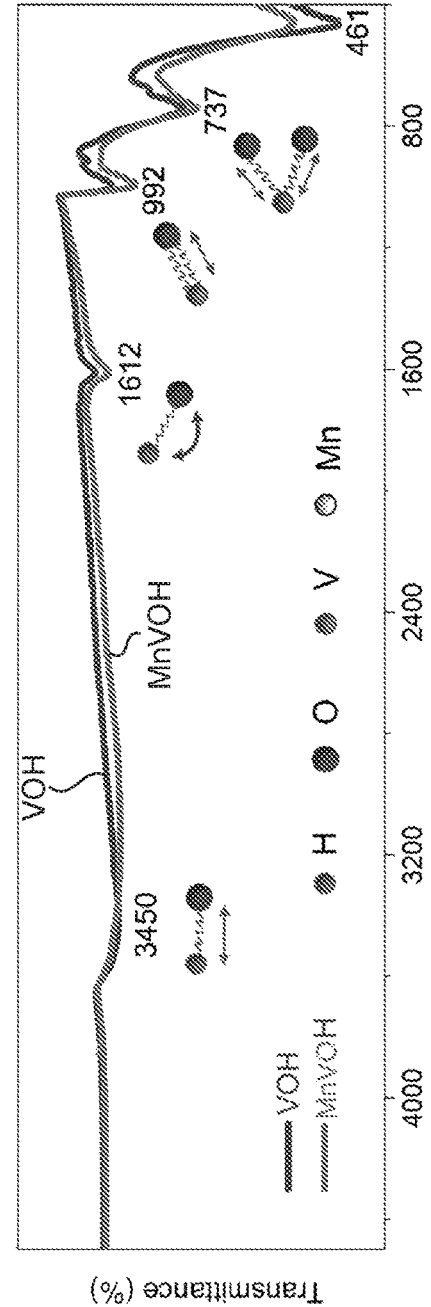
FIG. 1A
FIG. 1B

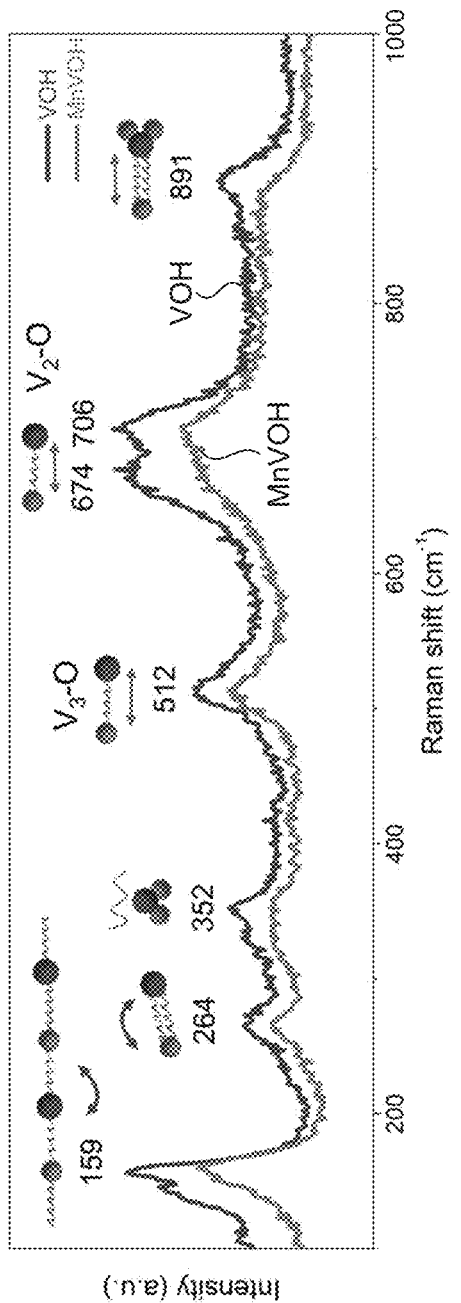
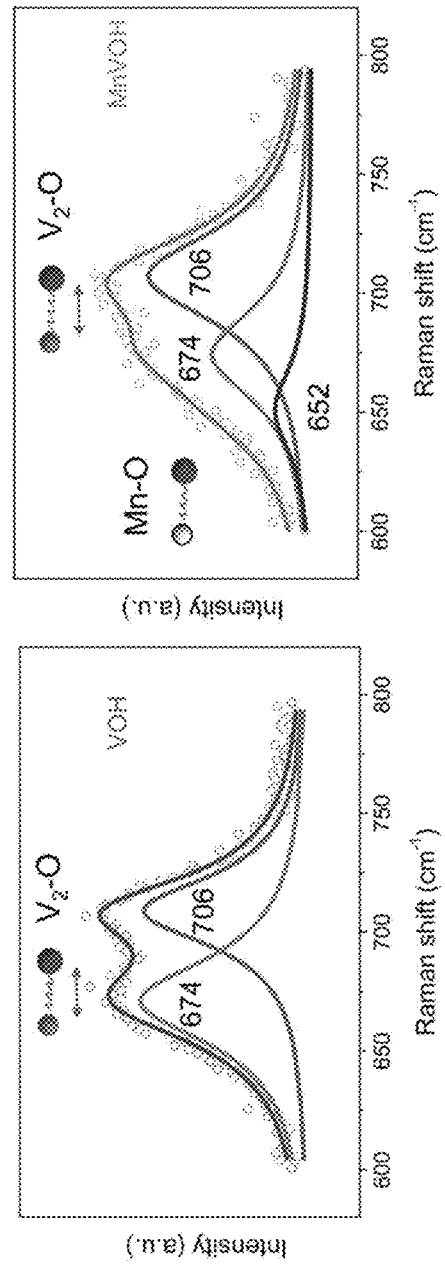
FIG. 1C
FIG. 1D
FIG. 1E

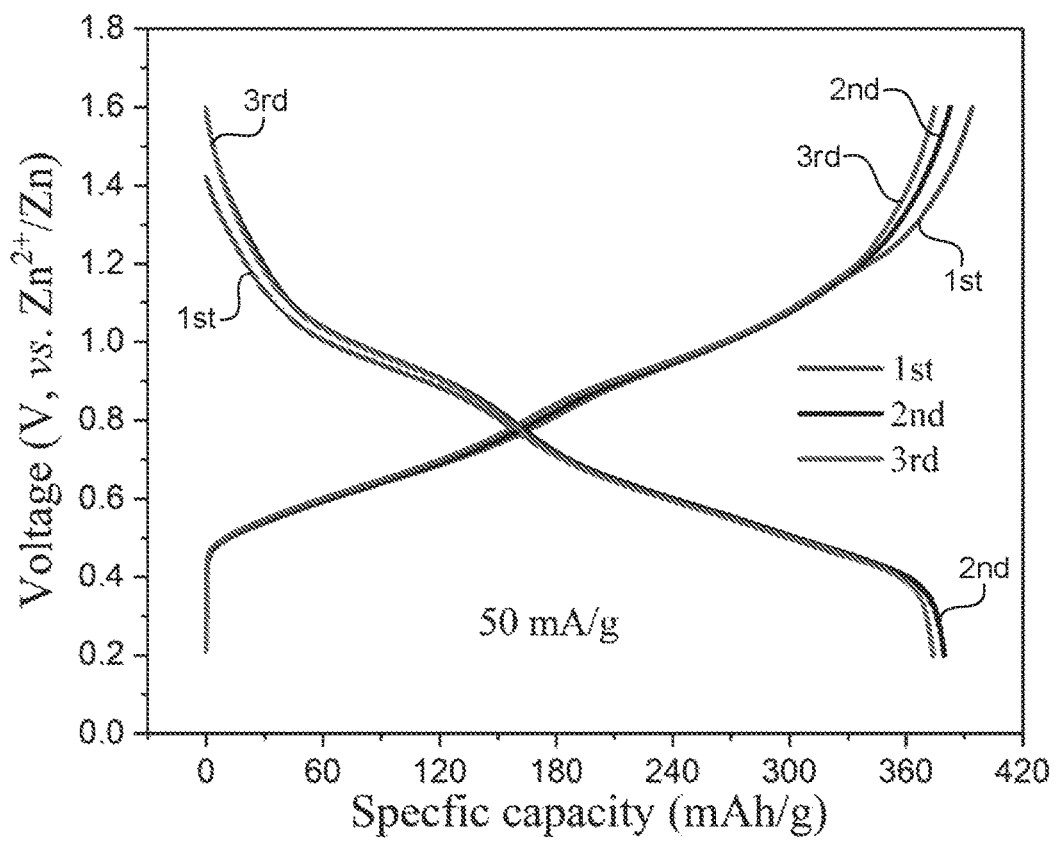
FIG. 25B
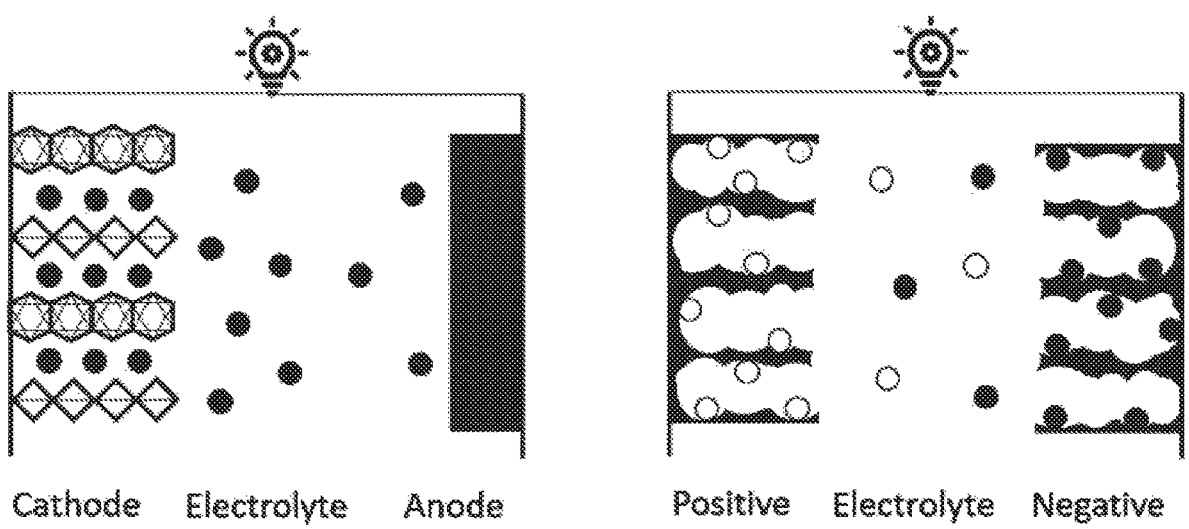
FIG. 26A  FIG. 26B

EXPANDED HYDRATED VANADATE

CROSS-REFERENCE TO RELATED APPLICATION

This application claims the benefit of U.S. Provisional Patent Application No. 62/848,458, filed on May 15, 2019, the disclosure of which is hereby expressly incorporated by reference in its entirety.

STATEMENT OF GOVERNMENT LICENSE RIGHTS

This invention was made with government support under Grant No. 1803256, awarded by the National Science Foundation. The government has certain rights in the invention.

BACKGROUND

Multivalent ions such as $Mg^{2+}$, $Zn^{2+}$, $Ca^{2+}$ and $Al^{3+}$ carry more charges per ion than $Li^+$ or $Na^+$ and are promising working ions in rechargeable batteries. Among all multivalent ions mentioned above, $Zn^{2+}$ has a smaller ionic radius of 0.74 Å in a six-fold coordination and Zn metal anode has a high volumetric capacity around 5850 $mAh/cm^{-3}$, thus aqueous zinc ion batteries (AZIBs) have generated interest. Before any new breakthrough happens in the present voltage-limited aqueous electrolytes, exploiting cathodes with high specific capacity is an effective way to achieve an increase in battery energy density.

Cathode materials for AZIBs mainly include manganese oxides, vanadium oxides, Prussian blue and its analogues, transition metal dichalcogenides and organic compounds. Manganese dioxides can be classified into one-, two- and three-dimensional tunnel structures that influence their electrochemical activities for Zn ion storage. The partially irreversible phase transition and the dissolution of active materials cause an unstable cycling performance. Prussian blue, the mixed-valence hexacyanoferrates with an open framework, has a tunable lattice spacing through introducing different transition metal cations, but the lower specific capacity of <100 mAh/g can make them uncompetitive in comparison with manganese oxides of 300 mAh/g. Dichalcogenides deliver a considerable specific capacity around 200 mAh/g, however, the intrinsically low electrical conductivity and discharge voltage restrain their energy density and efficiency. Although organic compounds present a promising Zn ion storage capability, the dissolvable species formed in the cycling process cause a rapid capacity fading.

Cathode materials with improved specific capacity are essential to enabling more productive batteries, such as AZIBs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a composition is provided comprising a cationically stabilized vanadate hydrate having a structure defined by layers of vanadium oxide separated by a cation and water, which provide spacing and stabilization between the layers.

In another aspect, an electrode is provided that includes a composition of cationically stabilized vanadate hydrates according to the embodiments described herein.

In yet another aspect, an aqueous battery is provided that includes a cathode that is an electrode as disclosed herein that includes a composition of cationically stabilized vanadate hydrates as disclosed herein.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a graph illustrating the X-ray diffractometer (XRD) patterns of VOH and MnVOH in accordance with embodiments of the present technology.

FIG. 1B is a graph of the FT-IR spectra with schematic functional groups of VOH and MnVOH in accordance with embodiments of the present technology.

FIG. 1C is a graph of the Raman spectra with the function group models of VOH and MnVOH in accordance with embodiments of the present technology.

FIG. 1D is a graph of the Raman details of the V—O group of VOH in accordance with embodiments of the present technology.

FIG. 1E is a graph of the Raman details of Mn—O and V—O group from MnVOH in accordance with embodiments of the present technology.

FIG. 25B is a voltage profile of AlVOH at 50 mA/g current density.

FIG. 26A is a diagram of a battery, in accordance with embodiments as disclosed herein.

FIG. 26B is a diagram of a supercapacitor, in accordance with embodiments as disclosed herein.

DETAILED DESCRIPTION

Figure 2A:
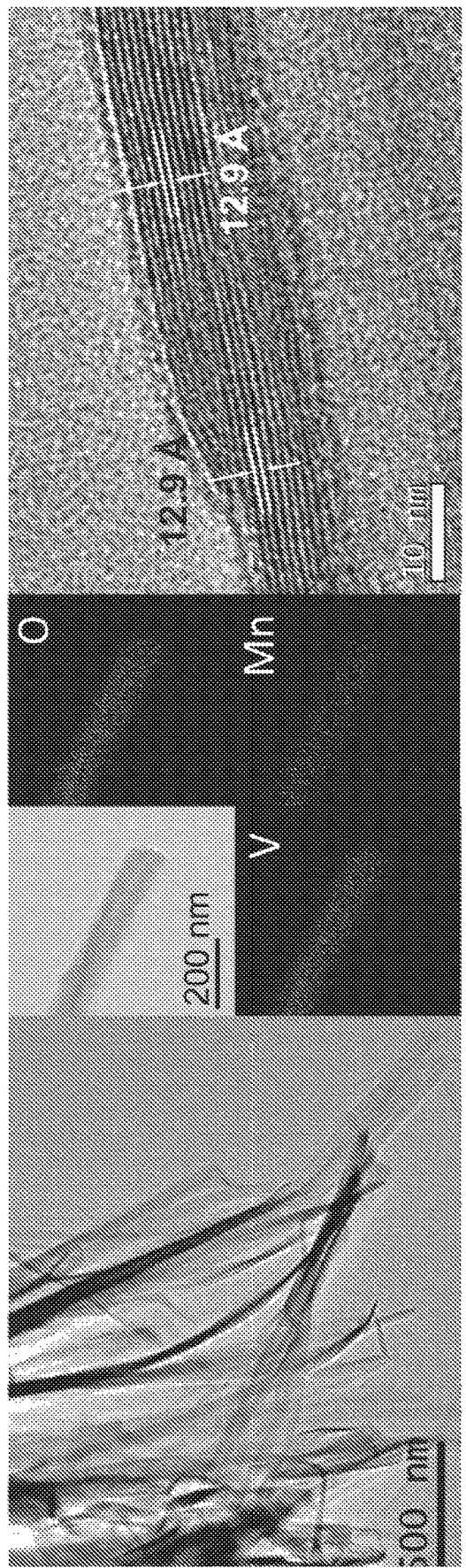
FIG. 2A is a TEM image with EDS mapping of MnVOH in accordance with embodiments of the present technology.

The present disclosure generally relates to cation-stabilized expanded hydrated vanadates, electrodes made therefrom, and batteries incorporating cathodes made from the cation-stabilized expanded hydrated vanadate. Introducing cations, such as transition metal cations (TM), into the crystal lattice of hydrated vanadium pentoxide can stabilize its layered structure through cation-O bonds and provide several advantageous properties.

Aqueous zinc ion batteries have attracted extensive attention owing to their high safety, fast charge/discharge capability, long-term cycling stability, and low cost. The limits of cathodes restrain batteries' energy density and efficiency. Exploring high-performance cathodes becomes an urgent and essential task and the requirements include high specific capacity, high discharge voltage, low self-discharge and highly reversible and stable cyclicity. Hydrated vanadium pentoxide (VOH) is a promising cathode for aqueous zinc ion batteries because of the high specific capacity as high as 400 mAh/g originating from the variable chemical states of vanadium cation. However, it suffers from the structural degradation that causes the cycling instability. The self-diffusion of zinc ions and electrons redistribution lead to a serious self-discharge and voltage degradation when the fully charged batteries are on the shelf. Currently, alkali and alkaline cation, such as $Li^+$, $Na^+$, $K^+$ and $Mg^{2+}$, are introduced into the interplanar of VOH to expand the lattice spacing to enhance the reaction kinetics and improve the rate capability and cycling stability. Conductive component like graphene is also used to obtain the composite for enhancing the electrical conductivity. These strategies, to some extent, alleviate the cycling degradation and provide fast channels for mass diffusion, but do not overcome the voltage degradation and self-discharge.

Layered materials offering sufficient intercalating channels and active sites for working cations transportation and accommodation have become the most competitive electrode materials for supporting commercial applications of the rechargeable batteries, especially the secondary Li ion batteries based on lithium cobalt oxide and graphite which have brought a revolution to portable electronics and communication. However, the layered cathodes in the flammable and highly volatile nonaqueous electrolytes introduce serious safety issues when oxygen released from the layered cathode penetrates to the anode causing thermal runaways. Aqueous electrolytes endow the rechargeable batteries improved safe protection, but the limited voltage window and single-electron carriers seriously restrain the energy density of batteries, even if high concentration salt solutions and "water-in-salt" electrolytes are introduced in Li-ion systems.

Layered vanadate compounds as one of the cathode categories for Zn-ion batteries can deliver a specific capacity as high as 400 mAh/g owing to the variable chemical valence of vanadium ion from 5+ to 3+ and its tunable interlayer distance for Zn-ion access and diffusion. Additionally, vanadium element has a considerable abundance of 190 ppm in the Earth's crust, leading to a lower cost than that of cobalt, which is widely used in commercial Li-ion batteries. Layered vanadium pentoxide, a common cathode for Li- and Na-ion batteries, in aqueous Zn ion batteries can deliver an increasing cycling gravimetric capacity due to the exfoliation of the initial chunks to allow more reactive sites. Hydrated vanadium pentoxide ($V_2O_5 \cdot nH_2O$, VOH) has a bilayer structure and structural water molecules work as the pillar to expand the layer spacing to near 12 Å. Additionally, the shielding effect from water can decrease the interaction between cations and accelerate Zn ion diffusion.

In order to improve the reaction kinetics of VOH, some alien cations can be introduced into the interlayers to enlarge the spacing. It was found that the bigger radius of the alien cations could produce a larger layer distance and obtain a faster ion diffusion. For example, hydrated $Mg^{2+}$ with a radius of 4.3 Å creates an interlayer spacing of 13.4 Å in VOH, which is larger than 11.07 Å in hydrated $Li^+$ expanded VOH because hydrated $Li^+$ has a smaller radius of 3.8 Å. Similar studies have also been done with preinserted calcium and zinc cations. However, while the introduced cations play a role in expanding the lattice spacing to accelerate the ion diffusion, the electrochemical stability of host materials still suffers from structural degradation, especially with the possibility that alien cations deintercalate during the cycling processes because of the weak Van der Waals interaction between hydrated alien cations and oxygens from layered slabs of the host.

Thus, compared with the weak interactions, chemical bonding can lock the layered slabs and endow the host material a stable cycling stability for intercalation/deintercalation reactions without sacrificing the interplanar spacing.

Accordingly, the present technology provides cationically stabilized hydrated vanadate. For example, introducing divalent transition metal cations (TMs) into the crystal lattice of hydrated vanadium pentoxide can stabilize its layered structure through TM-O bonding. Compared with the weak Van der Waals' force among water and alkali(ne) cation and terminal oxygen of $[VO_n]$ polyhedral, the chemical bond of TM-O is stronger and endows a more stable crystal structure that accommodates the induced distortion and strain when zinc ions insert into or extract from the host lattice.

Cationically Stabilized Vanadate Hydrate Compositions

In one aspect, a composition is provided comprising a cationically stabilized vanadate hydrate having a structure defined by layers of vanadium oxide separated by a cation and water, which provide spacing and stabilization between the layers.

Hydrated vanadium pentoxide has a bi-layered structure that is constituted by two single layers of $VO_5$ pyramids. Water molecules reside into the interlayers, and the spacing distance of (001) plane without additional inserted material (molecules, ions, etc.) is 11.5 Å. This distance is adjustable from 8.7 to 13.8 Å through alien ions or organic molecules pre-insertion. In the disclosed embodiments alien cations are introduces of particular size and electronic characteristics are introduced into the interlayer along with water molecules. The cations both expand the interlayer spacing and also provide stabilization between the layers through bonding.

The materials can be made by methods know to those of skill in the art. As disclosed herein in the Examples, hydrothermal synthesis is a particularly effective synthetic approach to making many different species of cationically stabilized vanadate hydrates.

In certain embodiments, the cationically stabilized vanadate hydrate is present predominantly in a single phase. As used herein, the term "predominantly" indicates an amount of 95% or greater, by weight. In a further embodiment, the cationically stabilized vanadate hydrate is only present in a single phase. The purity of the single phase gives rise to the remarkable electronic properties as disclosed herein, particularly the large specific capacity when the materials are used as cathodes in electrochemical devices, such as batteries.

The phase of the resulting samples is always identified by X-ray diffractometer (XRD) and the collected pattern reflects the phase compositions. A single phase is indexed well with a corresponding standard pattern in the database. An amount of any second phase or impurity that exceeds 5 wt % is detectable by XRD and additional peaks will appear in the collected pattern.

In certain embodiments, the cationically stabilized vanadate hydrate has a greater interplanar spacing when compared to a vanadate hydrate formed by the same method but without the cation.

In certain embodiments, the cationically stabilized vanadate hydrate is structurally and thermally more stable when compared to a vanadate hydrate formed by the same method but without the cation.

In certain embodiments, the cationic stabilization results from an inclusion of a cation of optimal ionic radius selected from the group of manganese, chromium, titanium, scandium, iron, copper, nickel, cobalt, zinc, yttrium, zirconium, niobium, cadmium, aluminum, magnesium, potassium, calcium, sodium, and combinations thereof. As used herein, the term "optimal" ionic radius indicates an ionic radius that is large in relation to the interlayer distance. The cations disclosed herein have an ionic radius (in a 6-membered coordination) of 68 pm (for $Al^{3+}$) to 152 pm (for $K^+$). Therefore, in a further embodiment, the ionic radius of the cation is in the range of 68 pm to 152 pm.

In certain embodiments, the cationic stabilization results from an inclusion of a cation selected from the group of calcium, magnesium, potassium, aluminum, manganese, iron, cobalt, nickel, copper, zinc, and combinations thereof. Examples 1 and 2 describe the synthesis and characterization of cationically stabilized vanadate hydrates using these ions.

In certain embodiments, the composition has a chemical formula $M_xV_2O_5 \cdot nH_2O$, wherein M is a cation. In further embodiments, M is selected from the group of manganese, chromium, titanium, scandium, iron, copper, nickel, cobalt, zinc, yttrium, zirconium, niobium, cadmium, aluminum, magnesium, potassium, calcium, sodium, and combinations thereof. In further embodiments, M is selected from calcium, magnesium, potassium, aluminum, manganese, iron, cobalt, nickel, copper, zinc, and combinations thereof.

In further embodiments, the cation is bonded to the vanadium oxide. In yet further embodiments, the bonding is covalent, ionic, or Van der Waals. In a further embodiment the bonding is covalent. In a further embodiment the bonding is ionic. In a further embodiment the bonding is Van der Waals.

In certain embodiments, the composition consists essentially of the cationically stabilized vanadate hydrate. Small amounts of anions (e.g., from hydrothermal synthesis) may be incorporated into the composition. In a further embodiment, the composition consists of the cationically stabilized vanadate hydrate.

Electrodes Including Cationically Stabilized Vanadate Hydrates

In another aspect, an electrode is provided that includes a composition of cationically stabilized vanadate hydrates according to the embodiments described herein.

In certain embodiments, the electrode is configured for use in a battery. FIG. 26A is a diagram of a battery, in accordance with embodiments as disclosed herein. In FIG. 26A, a Zn-ion battery includes a cathode as disclosed herein and the anode, as well as electrolyte. Zn-ions extract from the crystal lattice of the cathode and pass through the electrolyte to insert in or deposit on the anode in the discharging process. Upon charging, Zn-ions move in a reverse path. The insertion or extraction of ions cause a volume expansion or shrinkage of the crystal lattice.

In further embodiments, the battery is multivalent-ion battery.

In yet further embodiments, the battery is an aqueous zinc-ion battery (AZIB). In yet further embodiments, the batter is an Al-ion or Ca-ion battery.

In certain embodiments, the specific capacity is 250 mAh/g at 0.5 A/g or greater. In further embodiments, the specific capacity is 350 mAh/g at 0.5 A/g or greater. In further embodiments, the specific capacity is 400 mAh/g at 0.5 A/g or greater.

The charge transfer resistance and ion diffusion coefficient are also improved after the alien cation introduction, as illustrated in Example 1.

Supercapacitor Electrodes Incorporating Cationically Stabilized Vanadate Hydrates Electrochemical capacitors, also known as supercapacitors, are of great interest for energy storage with numerous applications in back-up power sources, electric vehicles and intermittent wind and solar energy systems due to their high power density, long cycling time and great reversibility. Supercapacitors can be classified into electric double-layered capacitors (EDLCs) and pseudocapacitors (PCs) based on different charge storage mechanisms. The former is based on carbon materials which achieves energy storage by fast ion adsorption on the electrode surface, highly dependent on available surface area of materials, thus demonstrating high power density and long lifespan but low energy density. The latter always shows higher capacitance originating from pseudocapacitive materials (e.g. metal oxides, conductive polymers) triggering fast redox reactions at electrode/electrolyte interface, while exhibits limited cycling performance due to poor structural stability. Accordingly, the composites of carbon and redox-active materials always are fabricated to achieve maximization of electrochemical performance of capacitors combining the advantages of EDLCs and PCs simultaneously.

Vanadium pentoxide ($V_2O_5$) is a promising electrochemically redox-active material with abundant resources, layered structure and high theoretical capacity (440 mAh $g^{-1}$ as battery cathode), but the applications of which are limited by slow ion diffusion ($10^{-13}$-$10^{-12}$ $cm^2$ $s^{-1}$ for $Li^+$) and low electric conductivity ($10^{-3}$-$10^{-2}$ S $cm^{-1}$). Many efforts have been contributed to enhance electron transport in $V_2O_5$-based electrodes with the promise to achieve high-performance capacitors. Carbon materials are impressive supports for $V_2O_5$ to partially relieve the constraint of conductivity and simultaneously to provide a large specific surface area with more active sites. For instance, reduced graphene oxide (rGO) and $V_2O_5$ composites were fabricated to achieve high capacitance of 537 F $g^{-1}$ at 1 A $g^{-1}$ and 84% capacitance retention after 1,000 cycles compared to 30% of pure $V_2O_5$ due to an enhanced conductivity. Carbon nanotubes (CNT) were introduced to $V_2O_5$ nanowires systems to improve the energy density to 46.3 Wh $kg^{-1}$ with the capacitance decay of 25% after 1,000 charge-discharge cycles. Nitrogen enriched mesoporous carbon spheres (n-MPC) were also excellent conductive templates for $V_2O_5$. The composites demonstrate 91 F $g^{-1}$ of cell capacitance and 16% decay up to 2,000 cycles. However, the fast degradation of above carbon-$V_2O_5$ electrodes still cannot satisfy the requirements for the long-life requirement for supercapacitors.

In certain embodiments, the electrode is configured for use in a supercapacitor. FIG. 26B is a diagram of a supercapacitor, in accordance with embodiments as disclosed herein. For supercapacitors, as illustrated in FIG. 26B, cations and anions adsorb on the surface of the electrodes in the charging process and desorb reversibly in the discharging process. The volume change happens on the electrodes.

Expanded vanadate hydrates not only has the larger spacing distance but also the increased surface area. The surface of the resulting samples could adsorb ions as traditional supercapacitors do. In addition, the expanded interlayers allow the fast ion insertion and extraction to increase the pseudocapacitive contribution. The synergistic contribution could surmount the limitation of lower energy density in traditional supercapacitors. More importantly, the expanded interlayers present the probable possibility to the insertion of trivalent cation such as $Al^{3+}$, benefiting to further increase the energy density of supercapacitors.

Batteries Incorporating Cationically Stabilized Vanadate Hydrates as an Electrode In yet another aspect, an aqueous battery is provided that includes a cathode that is an electrode as disclosed herein that includes a composition of cationically stabilized vanadate hydrates as disclosed herein.

In certain embodiments, the aqueous battery is multivalent-ion battery.

In certain embodiments, the battery is an aqueous zinc-ion battery.

In certain embodiments, the cathode in the battery has a specific capacity is 250 mAh/g at 0.5 A/g or greater.

In certain embodiments, the cathode comprises manganese vanadate hydrate or potassium vanadate hydrate and the specific capacity is 400 mAh/g at 0.05 A/g or greater.

In certain embodiments, the battery has a capacity retention of 80% or greater.

In certain embodiments, the battery has a shelf life of 50 days or greater.

In certain embodiments, the battery has an energy efficiency of 70% or greater.

Methods of Synthesizing and Using the Cationically Stabilized Vanadate Hydrates

In additional aspects, methods of making the cationically stabilized vanadate hydrates are provided. In certain embodiments, the methods include hydrothermal synthesis of the cationically stabilized vanadate hydrates disclosed herein. Synthetic methods are described more fully in the Examples below. Each of the disclosed and claimed cationically stabilized vanadate hydrates disclosed herein can be made using the provided methods.

In further aspects, methods of using the cationically stabilized vanadate hydrates as electrodes in electrochemical energy storage devices are provided. In certain embodiments, the electrochemical energy storage devices is a battery or a supercapacitor. Such methods of use are described elsewhere herein and each of the disclosed and claimed cationically stabilized vanadate hydrates disclosed herein can be integrated as an electrode (e.g., a cathode) in an electrochemical energy storage device. Fabrication and performance of such devices are disclosed herein, particularly in the Examples.

The following Examples are included for the purpose of illustrating, not limiting, the disclosed embodiments.

Example 1. Preparation of Mn (II) Cation Expanded Hydrated Vanadium Pentoxide (MnVOH)

Mn (II) cation expanded hydrated vanadium pentoxide (MnVOH) is prepared through a hydrothermal method and shows much larger storage capacity and higher discharge voltage, and enhanced rate capability and cycling stability in comparison with VOH owing at least in part to enlarged interplanar spacing, stabilizing effect from Mn (II) pillars, catalytic effect from tetravalent vanadium cations, and improved charge and ion transport properties. The increased energy efficiency and reduced voltage degradation reveal a great potentiality for commercial applications. As one skilled in the art will appreciate from the disclosure herein, other transition metal cations (TMCs), such as Fe, Co, Ni, Cu, and Zn can also be introduced and present the same structures and functionalities to enhance the Zn-ion storage performance in an aqueous system, implying introducing TMCs is an effective and general strategy for improving the layered VOH cathode. Moreover, the transition metal cation expanded hydrated vanadate described herein can be used to enhance performance of Mg-ion, Na-ion, and Li-ion and Al-ion batteries and capacitors.

The description herein provides several specific embodiments of the present technology to better explain the present technology. However, as one skilled in the art will recognize from the disclosure herein, a variety of embodiments not specifically discussed herein are nevertheless included within the scope of the disclosure. For example, any of the embodiments and/or or methods discussed herein may utilize any suitable transition metal including, for example, manganese, chromium, titanium, scandium, iron, copper, nickel, cobalt, zinc, yttrium, zirconium, niobium and/or cadmium cations. In some embodiments, other ions, including, for example, aluminum, magnesium, potassium, calcium, and/or sodium, may be provided to stabilize VOH. Moreover, the stabilized hydrated vanadate may be applied in a number of contexts, including, for example, to improve zinc, lithium, magnesium, aluminum, and/or sodium ion batteries.

Methods of Preparing Select Embodiments of the Present Technology

All chemicals can be used as received without purification. 2 mmol of $V_2O_5$ (e.g., 99.6+%, Sigma-Aldrich) can be dissolved into 50 mL of DI $H_2O$ with 2 mL of $H_2O_2$ (e.g., 30%, Fisher chemical), and 1 mmol of $MnSO_4 \cdot 10H_2O$ (e.g., 98.3%, Fisher scientific) can be dissolved separately into 30 mL of DI water. Two solutions can be admixed and transferred to a 100 mL (internal diameter of 42 mm with a height of 72 mm) Teflon lined stainless steel autoclave and heated to and held at 120° C. for 6 h. Brick red precipitates can be collected by centrifugation and washed by water and ethanol for three times. The collected precipitates can be dried at 70° C. overnight in an electric oven and turned greenish. The resulting product (MnVOH) can be further dried at 120° C. in a vacuum oven. VOH can be synthesized with the same procedure and processing conditions without Mn (II) sources, 80 mL of DI water can be used in order to attain the same internal reactive pressure in the Teflon bottle and the resulting product can be dried by a freezing dryer at −52° C. For Fe (II), Co (II), Ni (II), Cu (II), Zn (II), Ca (II), Mg (II), Al (III) and K (I) stabilized samples, their sulfate salts can be used to synthesize the desired samples and the processes can be identical to the MnVOH synthesis.

Phase identification can be carried out by a Bruker X-ray diffractometer (e.g., D8 Discover with IμS 2-D detection system) at an accelerating voltage of 50 kV and a working current of 1000 μA. A Fourier Transform Infrared Spectrometer (e.g., FT-IR, Bruker, VERTEX 70) can be used to collect the functional groups' stretching or bending information from 400 to 4500 $cm^{-1}$ and a Renishaw InVia Raman Microscope equipped with the Leica DMIRBE inverted optical microscope, for example, can also be used to obtain the chemical bond information by one of the laser excitation sources at 514 nm. A differential scanning calorimeter (e.g., DSC 3+ $STAR^e$ System, Mettler Toledo) can be adopted to analyze the thermal stability of sample within 40-700° C. in a flowing nitrogen gas (50 sccm). The microstructures of samples can be observed by a scanning electron microscope (e.g., SEM, FEI Sirion) at a working voltage of 5 kV and a scanning transmission electron microscope (S/TEM, Tecnai G2 F20) with an accelerating voltage of 200 kV. The surface chemical states of samples can be determined, for example, using a Kratos Axis Ultra DLD X-ray Photoelectron Spectroscopy system (XPS) with an AlKα radiation source that can be operated at 10 mA and 15 kV, and with a charge neutralizer. The angle between the specimen normal and the spectrometer can be 0°.

For the electrode preparation, the active material can be mixed with conductive carbon and polyvinylidene fluoride (PVDF) binder in a weight ratio of 7:2:1 in N-Methyl-2-Pyrrolidone (NMP) solvent to obtain a slurry that can be pasted on a current collector—titanium foil. The prepared electrodes can be dried in a vacuum oven at 120° C. overnight. The mass loading of active materials is about 3-4 mg/cm$^2$. Zn metal can be used as the anode and 80 μL of 3 M zinc trifluoromethanesulfonate (98%, Zn(CF$_3$SO$_3$)$_2$) aqueous solution can be injected into the batteries as the electrolyte. A glass fiber filter (e.g., Whatman, Grade GF/A) can be used as the separator. The redox characteristics of cathodes can be tested by cyclic voltammogram (CV) on a Solartron electrochemical station (SI 1287) equipped with an electrochemical impedance spectroscopy system (e.g., EIS, SI 1260). Galvanostatic intermittent titration technique (GITT) can be applied to analyze the reaction and diffusion kinetics at a current density of 50 mA/g and the charging/discharging time and interval of 10 min for each step. The Galvanostatic charge and discharge tests can be conducted, for example, by a Neware tester (CT-4008). The working voltage of cells can be set from 0.2 to 1.6 V versus Zn$^{2+}$/Zn, and the EIS measurements have a frequency range between 10$^5$ and 0.01 Hz. As one skilled in the art will appreciate, the values and steps described herein may be altered while remaining within the scope of the present technology.

Select Embodiments of the Present Technology

FIG. 1A compares the XRD patterns of MnVOH and VOH, in which VOH is well indexed with the standard peaks (V$_2$O$_5$·nH$_2$O, PDF 40-1296) and MnVOH shows the same diffraction peaks as reported M$_x$V$_2$O$_5$A$_y$·nH$_2$O (M=cations, A=anions). However, the Miller indices corresponding to crystallographic planes does not exist in the current database. The structure of M$_x$V$_2$O$_5$A$_y$·nH$_2$O may include stacked V—O double layers and the adjacent layers can be separated by water and cations and anions added in the preparation. The strongest peak at 6.8° in MnVOH corresponds to a larger lattice spacing of 12.9 Å and VOH has the strongest peak at 7.4° with a lattice spacing of 11.9 Å that agrees with the reported ~11.5 Å, suggesting the introduction of Mn (II) with water together can expand the interlayer spacing further as found in Mg preinserted VOH. In the FTIR spectra (FIG. 1B), peaks at 461 and 737 cm$^{-1}$ originates from the symmetric stretching vibration of the O—V—O bonds and the peak located at 992 cm$^{-1}$ can be attributed to the stretching vibration of the V=O bonds. The bending and stretching vibration of O—H from structural water appears around 1612 and 3450 cm$^{-1}$, respectively. Upon careful examination, a slight redshift (2-5 cm$^{-1}$) of V—O vibrations appears in MnVOH in comparison with VOH, suggesting the V—O bond becomes weak because a fraction of V$^{5+}$ is reduced to V$^{4+}$ in MnVOH, the details on chemical states will be discussed further with the XPS results. The similarity in FT-IR spectra reveals similar crystal structures in both samples. Raman spectra (FIG. 1C), as the complementary fingerprints of samples to the FT-IR spectra, were collected. The peak located at 159 cm$^{-1}$ comes from the bending vibration of the —O—V—O—V— chains, which implies an a-directional compressive deformation in the lattice. A blue shift of 4 cm$^{-1}$ in MnVOH verifies the stronger compression along the a-direction due to the possible electrostatic interaction between Mn (II) and O. The bending vibration of the V=O bond formed by terminal O and center V cation appears at 264 cm$^{-1}$, and the red shift of 4 cm$^{-1}$ in MnVOH means the elongation of V=O along the c-direction, consistent with the XRD results of the lowest angle. The board peak around 352 cm$^{-1}$ is related to the librational motions of water. The triply coordinated O$_3$ by three V cations forms a V$_3$—O bond that connects three edge sharing VO$_5$ pyramids in the crystal structure and is reflected by a stretching signal at 512 cm$^{-1}$ and a red shift of 5 cm$^{-1}$ in MnVOH suggests a lattice expansion along the b-direction. The bridging O links two corner-sharing VO$_5$ polyhedra and stretching vibration of V$_2$—O appears at 706 cm$^{-1}$, and the peak at 674 cm$^{-1}$ from stretching of V$_2$—O suggests a partially disordered V—O—V connection existed in the host lattice. The weakened peak at 674 cm$^{-1}$ in MnVO reveal a better crystallinity and the possible reason is that the introduced Mn (II) makes the arrangement of V and O to be more orderly because the interaction among the three ionic species. The peak at 891 cm$^{-1}$ is attributed to the stretching of V—OH$_2$. A weakened V—OH$_2$ bond appears in MnVOH because of the red shift, which implies water may have more rotational freedom in the interlayer. The competing interaction from Mn (II) and water could influence the bond strength of V—OH$_2$. Compared the spectra of 600-800 cm' of both samples, a broad peak appears at 674 cm$^{-1}$ in MnVO rather than the sharp peak in VOH. Lorentz functions were used to obtain the details of chemical bonds, two discernable peaks at 674 and 706 cm$^{-1}$ fit well with the stretching of V$_2$—O in VOH (FIG. 1D), and a weak peak at 652 cm$^{-1}$ corresponds to the vibration of Mn—O bond in MnO$_6$ octahedral of MnVOH (FIG. 1E), suggesting Mn (II) ions connect [VO$_n$] layers by chemical bonds. It should be mentioned that the bending or stretching signal of sulfate anion is not detected in Raman or FT-IR spectra, demonstrating no sulfate anion in MnVOH. Based on the structural comparison, MnVOH can have at least two possible structures. One is the bi-layer structure in which Mn (II) cations reside into the interlayers like a slight structure distortion in VOH, it can be called by a pre-inserted cation as sodium in V$_2$O$_5$. The other is to form a new phase as MnV$_{12}$O$_{31}$·10H$_2$O (PDF 47-0146) which has the same XRD pattern as M$_x$V$_2$O$_5$A$_y$·nH$_2$O. For the former, preinserted cations, such as Li$^+$ and Mg$^+$, in VOH seldom cause a big difference in the XRD patterns. The changes in the XRD pattern means the formation of new phases, but the analysis based on the FT-IR and Raman spectra demonstrate both samples have similar chemical bonds. Combining the structural information discussed above, MnVOH is likely to have a similar crystal structure as VOH and the preinserted Mn (II) in the interlayer forms the chemical bonds.

Figure 2B:
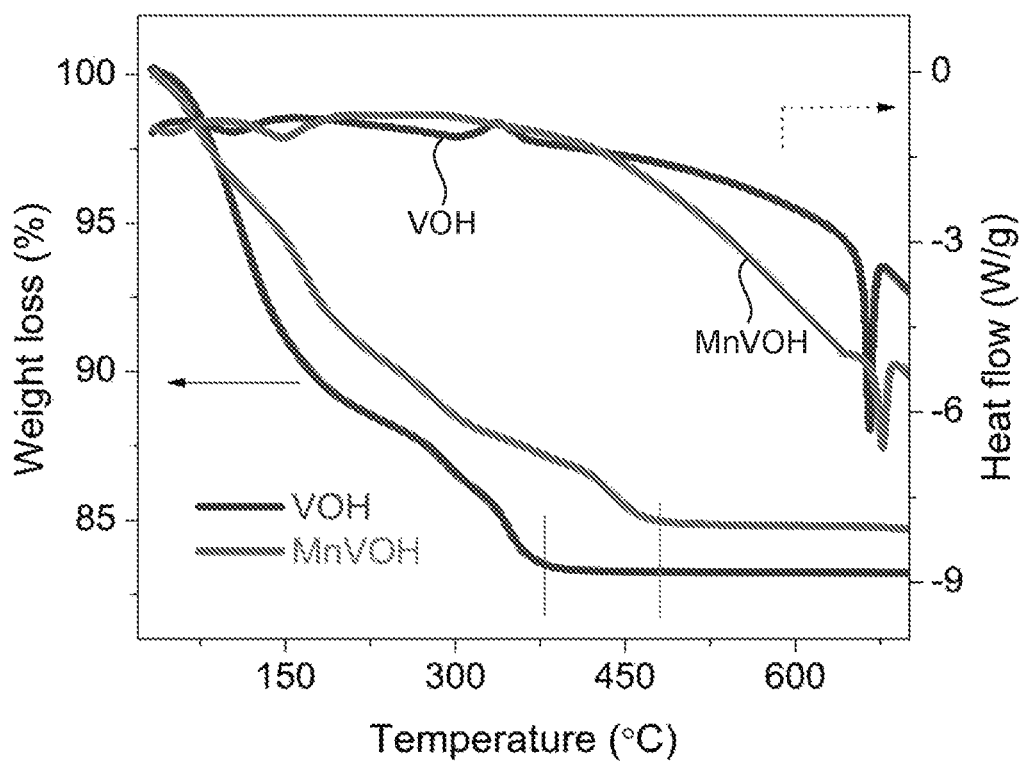
FIG. 2B is a graph illustrating the differential scanning calorimetry curves of VOH and MnVO in accordance with embodiments of the present technology.
Figure 2C:
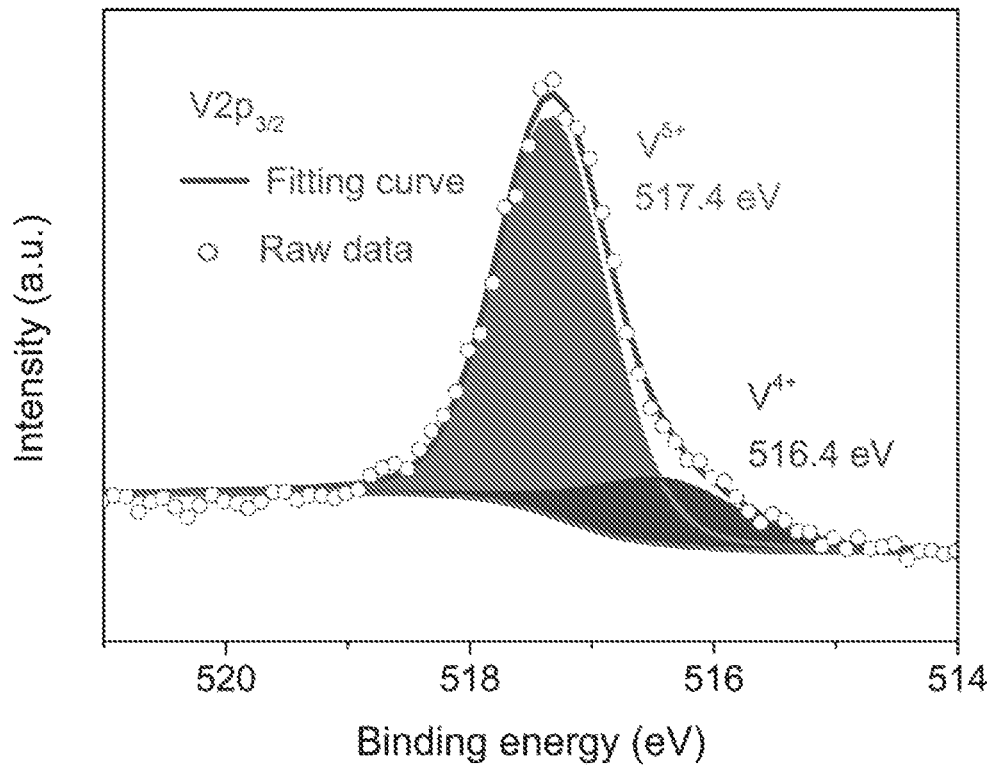
FIG. 2C is a graph of the XPS spectrum of $V2p_{3/2}$ of MnVOH in accordance with embodiments of the present technology.
Figure 2D:
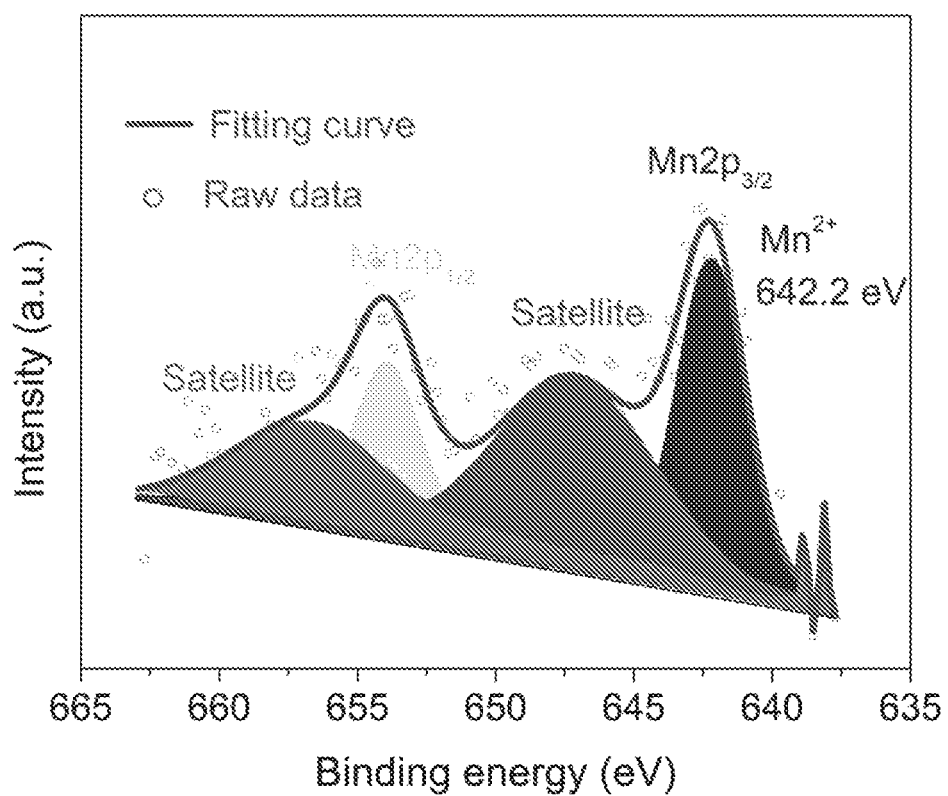
FIG. 2D is a graph of the XPS spectrum of MnVOH collected from divalent Mn in accordance with embodiments of the present technology.
Figure 13:
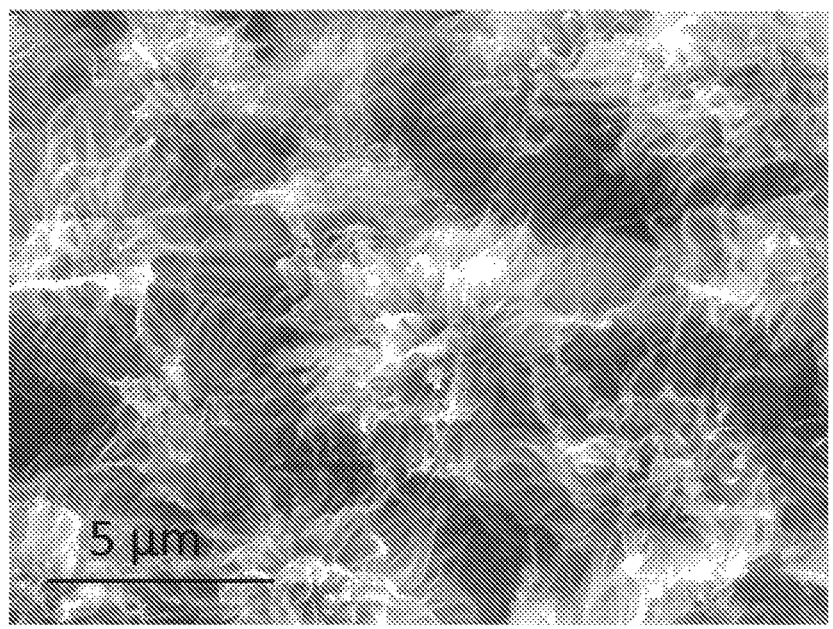
FIG. 13 is an SEM image of MnVOH in accordance with embodiments of the present technology.
Figure 14:
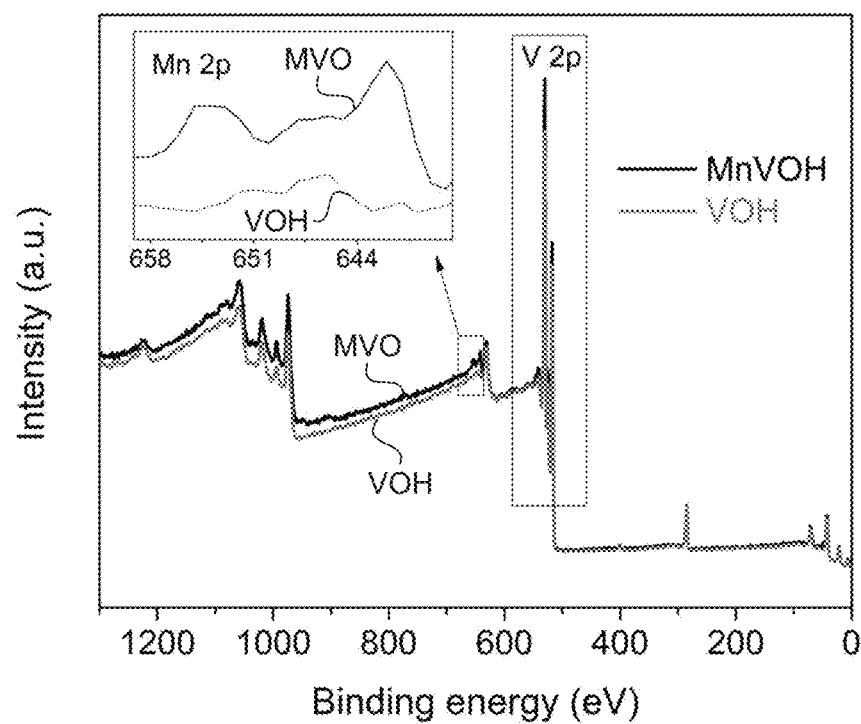
FIG. 14 is a graph of XPS spectra of MnVOH and VOH in accordance with embodiments of the present technology.
Figure 15:
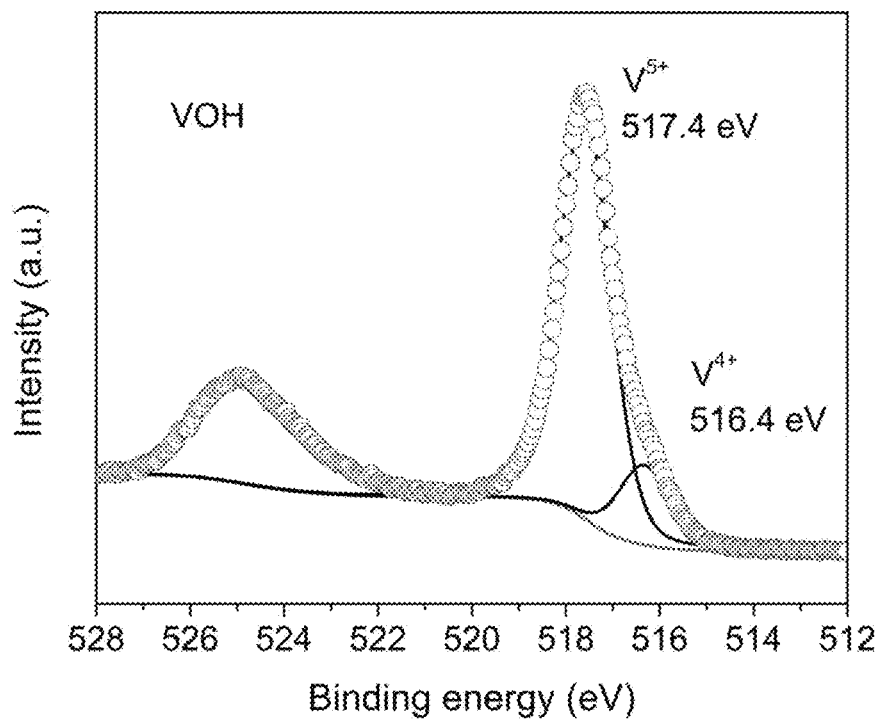
FIG. 15 is a graph of XPS V2p spectrum of VOH in accordance with embodiments of the present technology.
Figure 16:
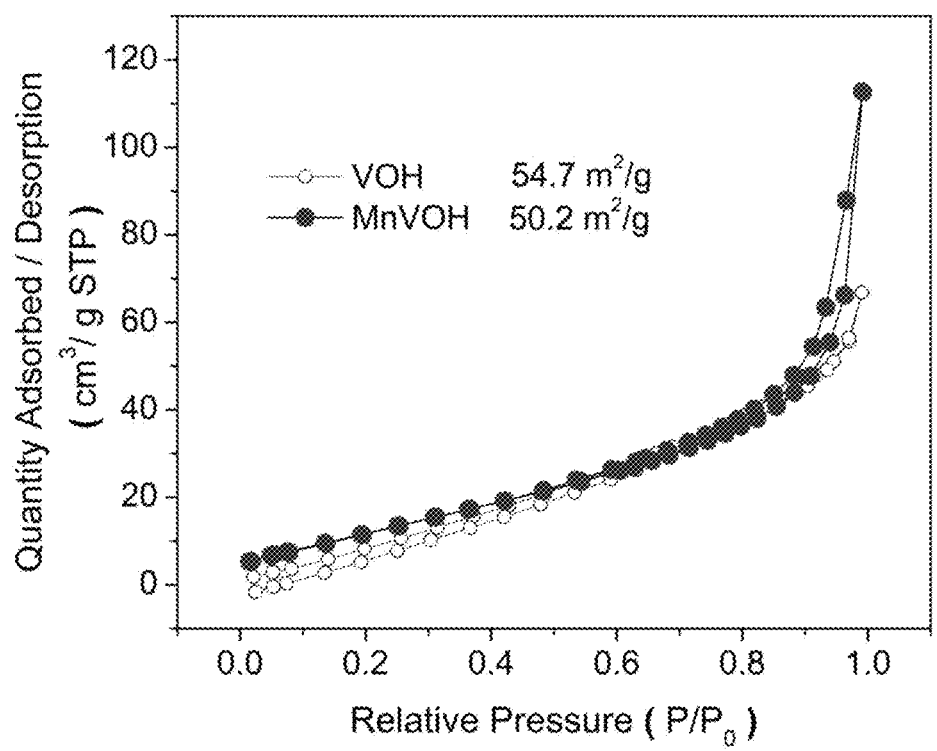
FIG. 16 is a graph of the nitrogen-sorption isotherm of VOH and MnVOH in accordance with embodiments of the present technology.

FIG. 2A shows TEM images in which MnVOH comprises nanosheets. The nanosheets aggregate to form a microflower-like shape as observed by SEM (FIG. 13). EDS mapping collected by TEM exhibits homogeneous element distributions of Mn, V and O in the resulting MnVOH sample, and the lattice spacing of 12.9 Å is in accordance with the XRD results. No sulfur was detected, which supports the argument about no anion (SO$_4^{2-}$) in MnVOH interlayers as mentioned in the structural analysis. To confirm the effects of Mn (II) on the structural stability, DSC/TGA can be used to analyze the water loss and possible phase transition in the heating process. Water loss in both samples (FIG. 2B) accompanied with a continuous endothermal process is reflected by two weak peaks at 150 and 380° C. and the endothermal peak appearing around 685° C. is attributed to the melting of V$_2$O$_5$. It is worth noting that the end temperature for water loss from MnVOH (475° C.)

is higher than that from VOH (380° C.) as marked by the dotted lines, suggesting water has a better structural stability derived from the interaction by Mn in MnVOH. The water content in MnVOH (15 wt %) is less than that in VOH (17 wt %). The introduction of Mn (II) could induce a change in chemical valence of $V^{5+}$ because of the electroneutrality required in the lattice. Survey XPS spectra (FIG. 14) compare the characteristic peaks and Mn2p signal is only detected in MnVOH, which agrees with the elements in the XRD detected phase. No signal relating to S is detected in either samples, demonstrating no sulfate anion in MnVOH and supporting that the above-recited structure is reasonable. Characteristic peaks at 517.4 and 517.0 eV in the XPS spectrum of $V2p_{3/2}$ (FIG. 2C) are originated from $V^{5+}$, the difference of binding energy means the local chemical surroundings are different for some $V^{5+}$, in particular Mn (II) at 642.2 eV (FIG. 2D) and $V^{4+}$ at 516.4 eV. The detected divalent state of Mn cation verifies no oxidizing reaction happens on Mn (II) in the synthesis processes. The ratio of $V^{4+}$ in MnVOH and VOH are 18.9% and 13.2% (FIG. 15 and FIG. 2C), respectively, determined by evaluating the integrated area in the fitting spectra. The appearance of $V^{4+}$ in VOH is possibly from a reduction reaction between $V_2O_5$ and $H_2O_2$ to form $VO(O_2)^+$ in the synthesis process. More $V^{4+}$ detected in MnVOH is attributed to the introduced Mn (II) and the appearance of $V^{4+}$ implies oxygen vacancies in VOH and MnVOH as reported in $V_2O_5$ or VOH. The impacts from oxygen vacancies are close in both samples because the similar amounts of $V^{4+}$, thus the differences on electrochemical performances derives from the introduced Mn (II). $V^{4+}$ has a bigger ionic radius of 72 pm than that of 68 pm for $V^{5+}$ in a six coordination, which further expands the lattice spacing. At the same time, $V^{4+}$ possesses one electron in the 3d orbital beneficial for enhancing the electrical conductivity and catalyzing the electrochemical reaction; when oxygen vacancies are introduced, the number of d orbitals located at the bottom of the conduction band and the upper of the valence band increases. Both samples have a similar surface area of 50 $m^2/g$ (FIG. 16), and it is unlikely that their surface area would make significantly different influences on the electrochemical performances.

Figure 3A:
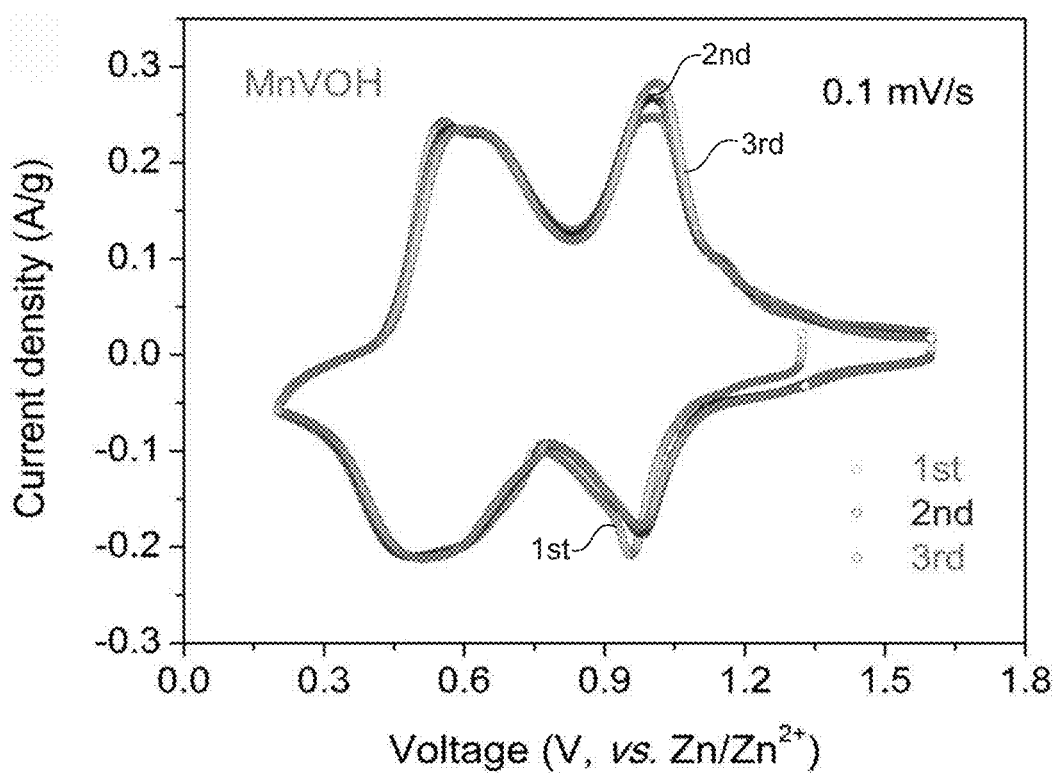
FIG. 3A is a graph of current vs. voltage of MnVOH collected at a sweep rate of 0.1 mV/s in accordance with embodiments of the present technology.
Figure 3B:
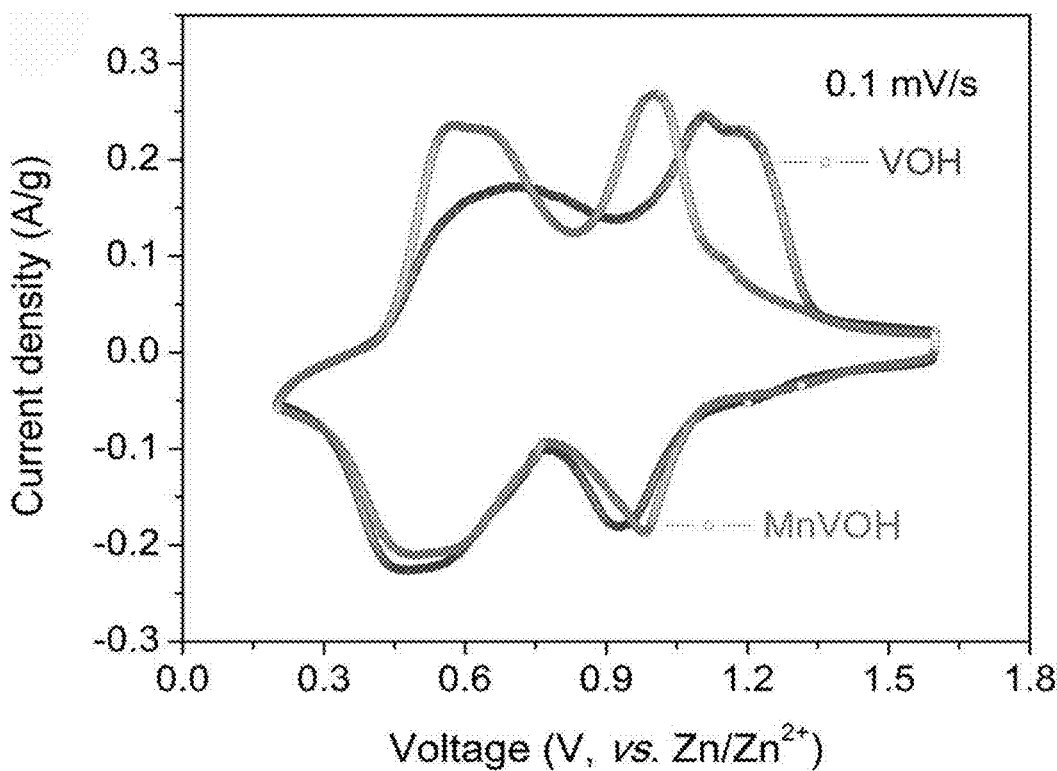
FIG. 3B is a graph comparing current vs. voltage curves of MnVOH and VOH in accordance with embodiments of the present technology.
Figure 3C:
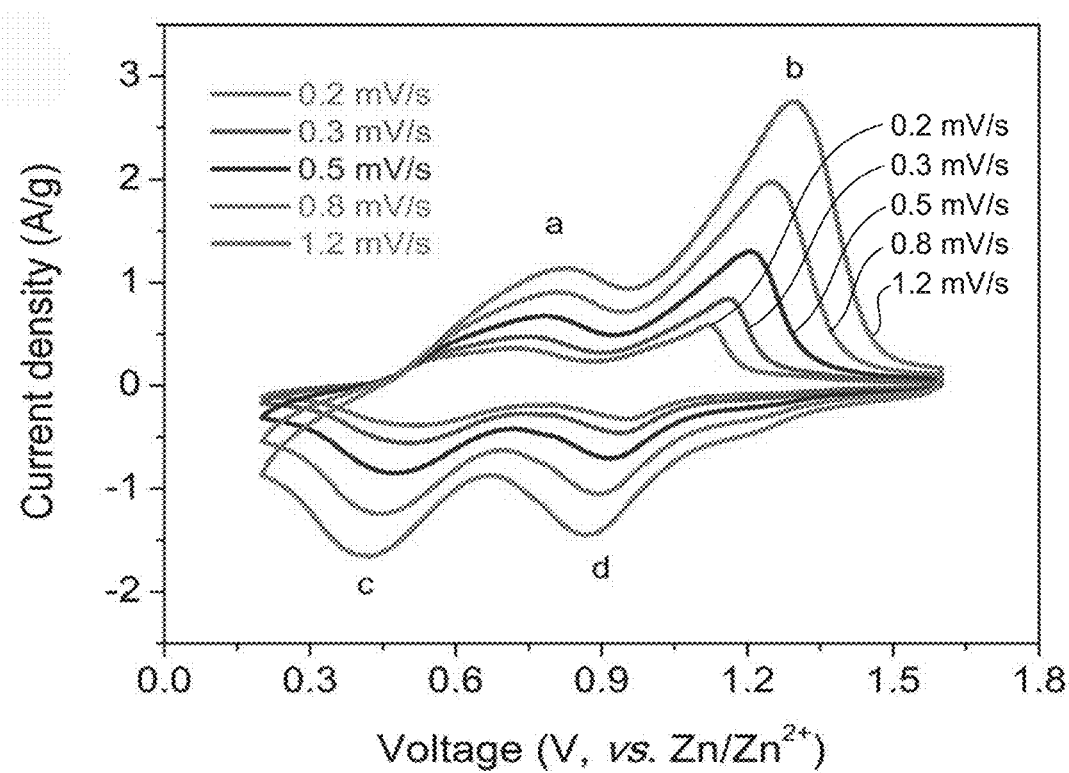
FIG. 3C is a graph of current vs. voltage of MnVOH collected at various sweep rates in accordance with embodiments of the present technology.
Figure 3D:
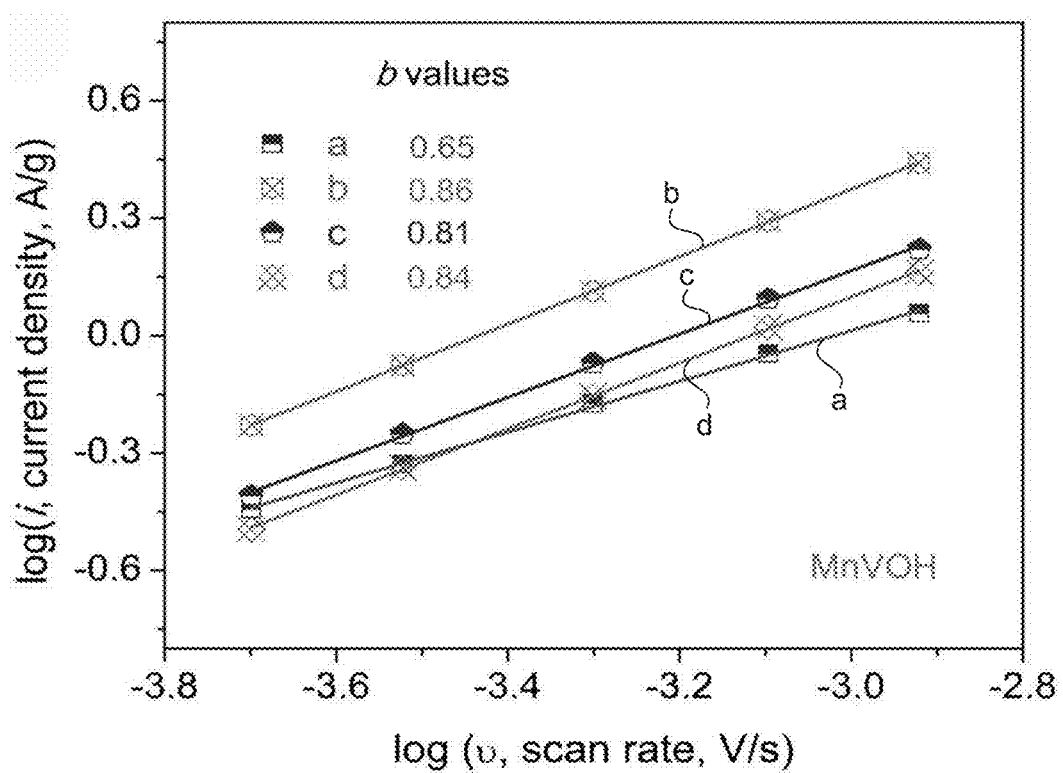
FIG. 3D is a graph illustrating the relationship between peak currents and sweep rates for MnVO in accordance with embodiments of the present technology.
Figure 17:
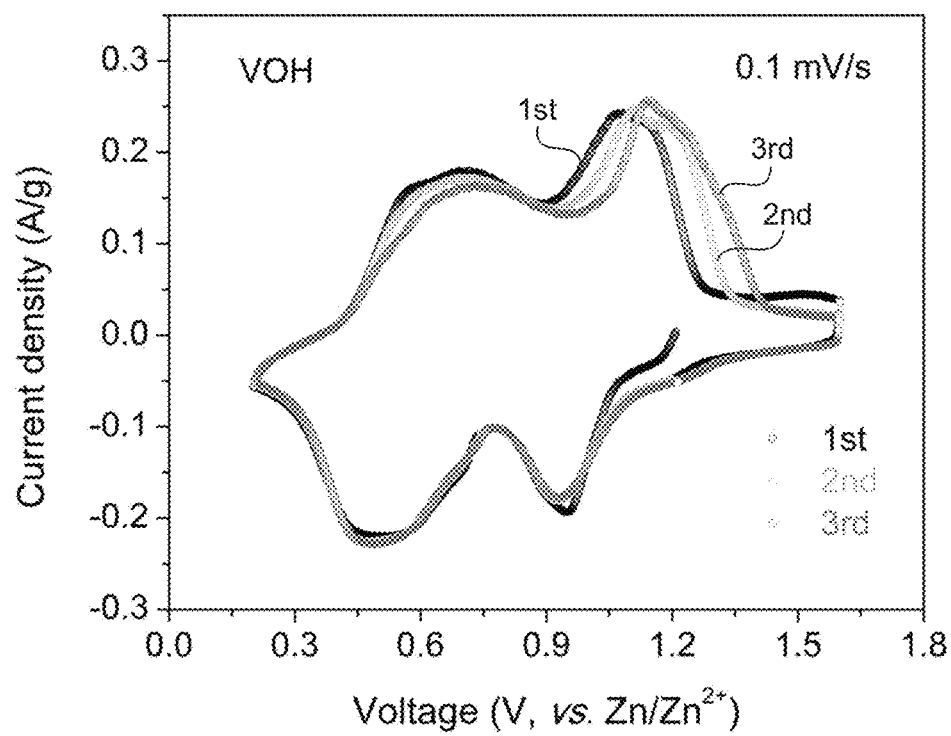
FIG. 17 is a graph of the current vs. voltage curves of VOH in accordance with embodiments of the present technology.
Figure 18A:
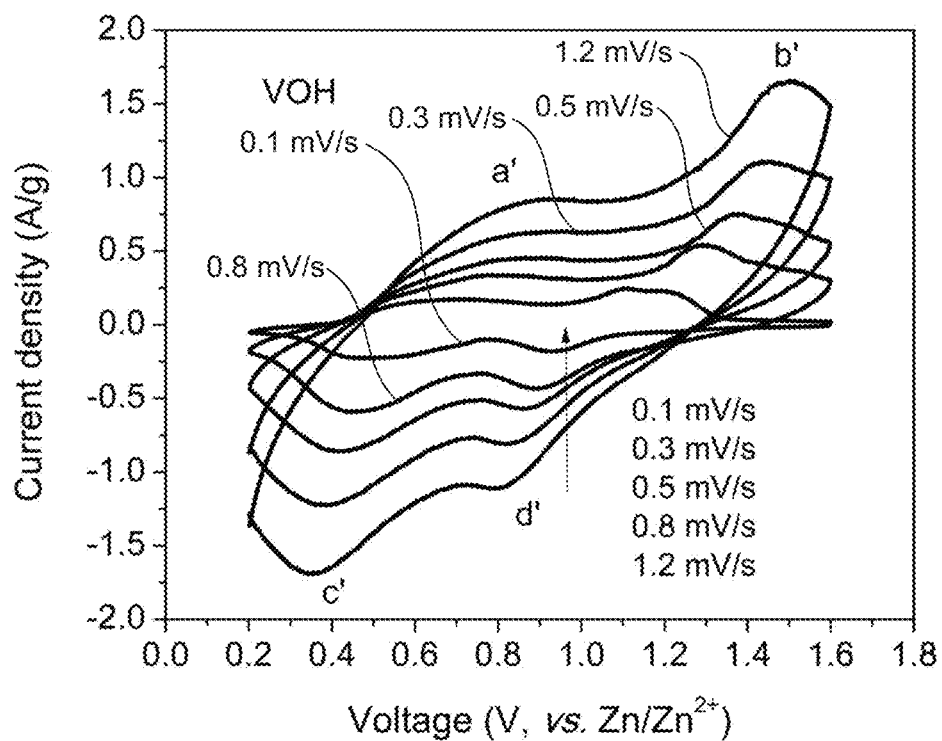
FIG. 18 is a graph of the current vs. voltage curves of VOH collected at various rates in accordance with embodiments of the present technology.
Figure 18B:
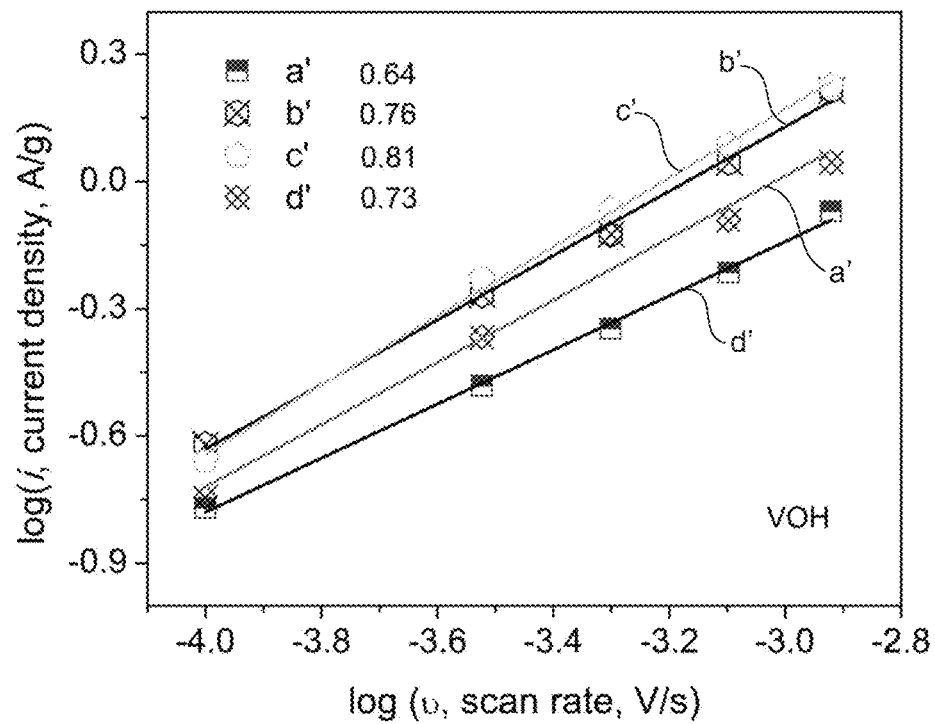

Redox reaction in MnVOH was analyzed by the CV test and two pairs of peaks are shown in FIG. 3A, the peak pair resided at higher voltage (1 V) is related to redox pair of $V^{5+}/V^{4+}$ and the transition of $V^{4+}/V^{3+}$ pair appears around 0.5 V. The overlapped CV curves in the first three cycles reflect a reversible reaction of MnVOH cathode in the aqueous Zn-ion battery. An interesting phenomenon is that the first discharge peak around 1 V shifts to a higher voltage in the subsequent cycles, possibly attributed to the local chemical surroundings change after Zn ion insertion. However, VOH has deviating peaks in the first three cycles and the discharge peaks shifts to lower voltage upon cycling (FIG. 17.) FIG. 3B compares the CV curves of both cathodes collected at 0.1 mV/s and smaller voltage differentiations in redox pairs of MnVOH as listed in Table 1, meaning MnVOH cathode has a smaller polarization and better reactive kinetics in the electrochemical processes. To analyze the reaction kinetics, various sweeping rates of CV curves were collected as shown in FIG. 3C and cathodic peaks shift toward higher voltages and anodic peaks move back to lower voltages with the increasing sweeping rates owing to the polarizations, especially phase transition happening in the electrode. Peak currents (i) and sweep rates (v) obey a power-law relationship that is described by $$i=av^b, \quad (1)$$

where a and b are variables. b value of 1 indicates surface capacitance dominated charge storage and 0.5 is indicative of a mass diffusion-controlled charge storage. The b values of peaks a-d in MnVOH are 0.65, 0.86, 0.81 and 0.84 (FIG. 3D), whereas the values of peaks a'-d' from VOH are 0.65, 0.76, 0.81 and 0.73 (FIG. 18). These suggest both samples have the considerable kinetics and the electrochemical reactions are limited by ion diffusion and capacitor-like behavior partially contributes to the charge storage.

TABLE 1

The redox pairs and voltage differentiation in both cathode materials

| Samples ID | Redox pairs (V) | Differentiation (V) |
|---|---|---|
| VOH | 1.15/0.93 | 0.23 |
|  | 0.69/0.48 | 0.21 |
| MnVOH | 1.01/0.98 | 0.03 |
|  | 0.61/0.52 | 0.09 |

Figure 4A:
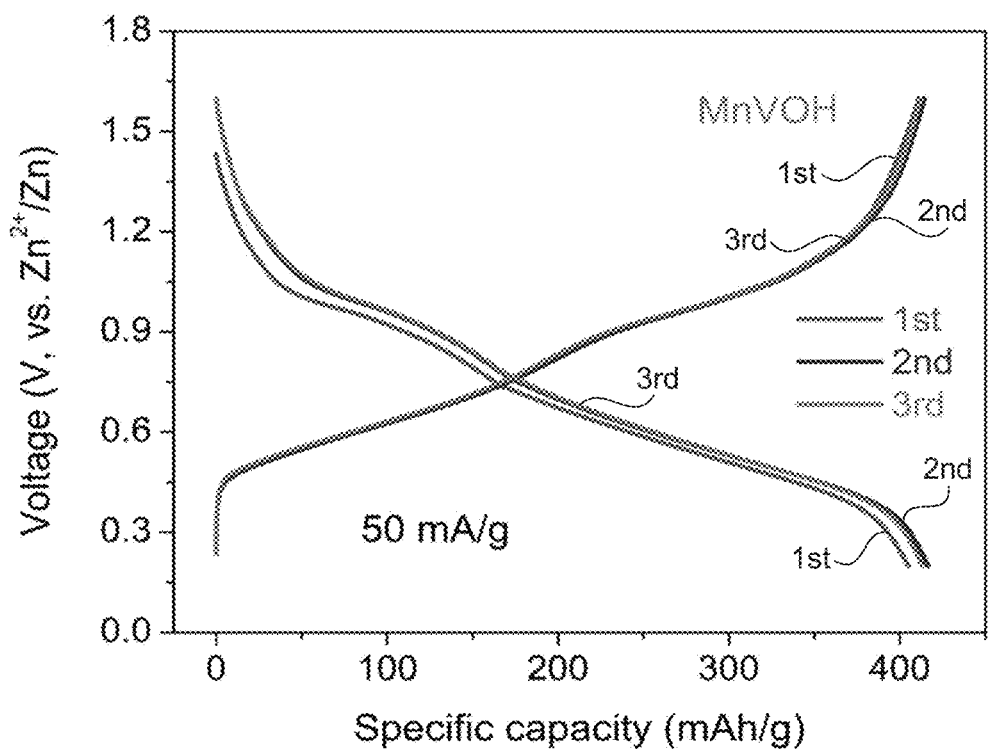
FIG. 4A is a graph illustrating the voltage profiles of MnVOH at 50 mA/g in accordance with embodiments of the present technology.

Voltage profiles of MnVOH is shown in FIG. 4A and the delivered specific capacity is 415 mAh/g at a current density of 50 mA/g, which is higher than that of other vanadium-based cathodes, such as Li intercalated $V_2O_5 \cdot nH_2O$, $Na_2V_6O_{16} \cdot 3H_2O$, $H_2V_3O_8$, $VO_2$, $LiV_3O_8$, or $Mg_xV_2O_5 \cdot nH_2O$. The sloping curves agree with the board redox peaks in CV test, and the increased voltage and overlapped curves in the subsequent cycles suggests the highly reactive reversibility. In the rate capability tests (FIG. 4B), MnVOH electrode with a mass loading of 3-4 $mg/cm^2$ delivers an initial specific capacity of 380 mAh/g at a current density of 0.5 A/g, and VOH has a capacity of 287 mAh/g. The difference is that VOH presents a capacity increase to 326 mAh/g after the first five cycles, but MnVOH displays a relatively stable capacity at 371 mAh/g. With current density increasing from 1, 2, 4 to 8 A/g, MnVOH delivers the specific capacities of 347, 310, 268 and 214 mAh/g, respectively, and VOH exhibits the capacities of 280, 237, 179 and 124 mAh/g at the corresponding conditions. The capacity retention in MnVOH is 56% that is higher than that of 38% in VOH at 8 A/g compared with their capacities at 0.5 A/g, it is also more superior in comparison with $VO_2$ and $Mg_xV_2O_5 \cdot nH_2O$ (Table 2).

TABLE 2

Comparison of the cathodes for Zn-ion batteries

| Cathode | Voltage window | Specific capacity/ Rate performance | Cycling performance |
|---|---|---|---|
| $MnO_2$ | 1.0-1.8 V | 285 mAh/g at 103 mA/g | 92% over 5,000 cycles at 1.5 A/g |
| $V_2O_5$ | 0.4-1.4 V | 224 mAh $g^{-1}$ at 100 mA/g | 121 mAh $g^{-1}$ maintained over 400 cycles at 1 A/g |

TABLE 2-continued

Comparison of the cathodes for Zn-ion batteries

| Cathode | Voltage window | Specific capacity/ Rate performance | Cycling performance |
|---|---|---|---|
| $Na_{0.33}V_2O_5$ | 0.2-1.6 V | 367 mAh/g at 100 mA/g | 93% capacity retention over 1,000 cycles at 1 A/g |
| $Na_2V_6O_{16}$ $1.63H_2O$ | 0.2-1.6 V | 352 mAh/g at 50 mA/g | 90% capacity retention over 6,000 cycles at 5 A/g |
| $Zn_{0.25}V_2O_5$ | 0.5-1.4 V | 282 mAh/g at 200 mA/g | 81% capacity retention after 1,000 cycles at 2.4 A/g |
| $VO_2(B)$ | 0.3-1.5 V | 357 mAh/g at 100 mA/g | 91.2% capacity retention after 300 cycles at 0.1 A/g |
| CuHCF | 0.2-1.2 V | 56 mAh/g at 20 mA/g | 77% capacity retention after 20 cycles at 0.02 A/g |
| ZnHCF | 0.8-2.0 V | 65 mAh/g at 60 mA/g | 76% capacity retention after 100 cycles at 0.3 A/g |
| $Mg_xV_2O_5 \cdot nH_2O$ | 0.1-1.8 V | 353 mAh/g at 50 mA/g | 97% capacity retention after 2,000 cycles at 5 A/g |
| MnVOH | 0.2-1.6 V | 415 mAh/g at 50 mA/g | 96% capacity retention after 2,000 cycles at 4 A/g |

Figure 4B:
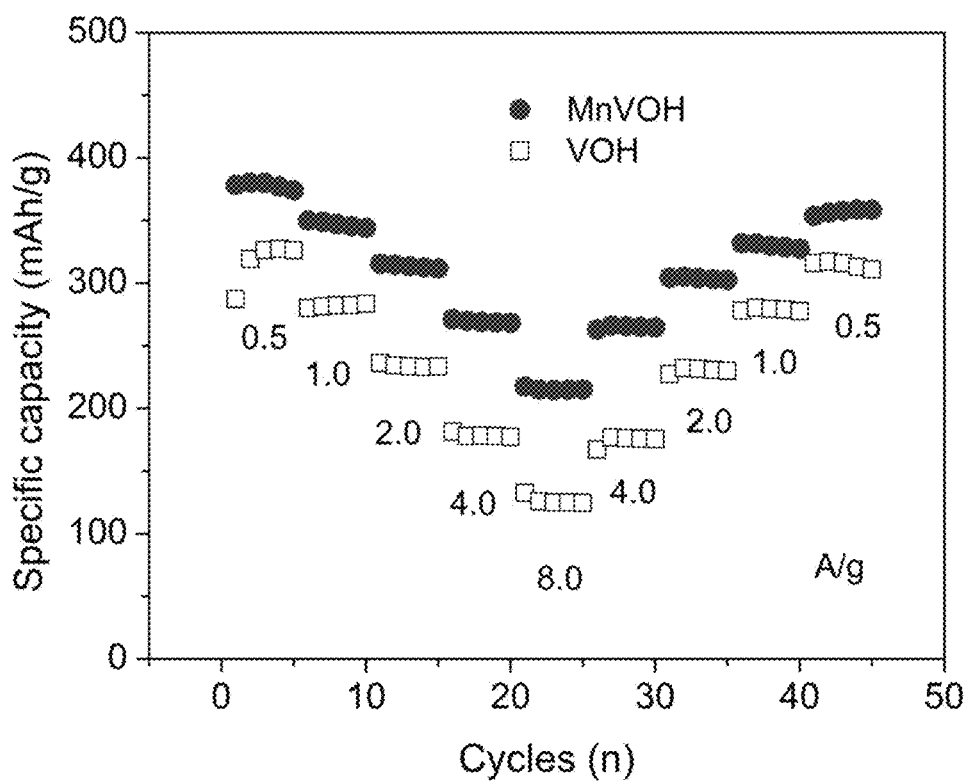
FIG. 4B is a graph illustrating the rate capability of MnVOH and VOH in accordance with embodiments of the present technology.
Figure 4C:
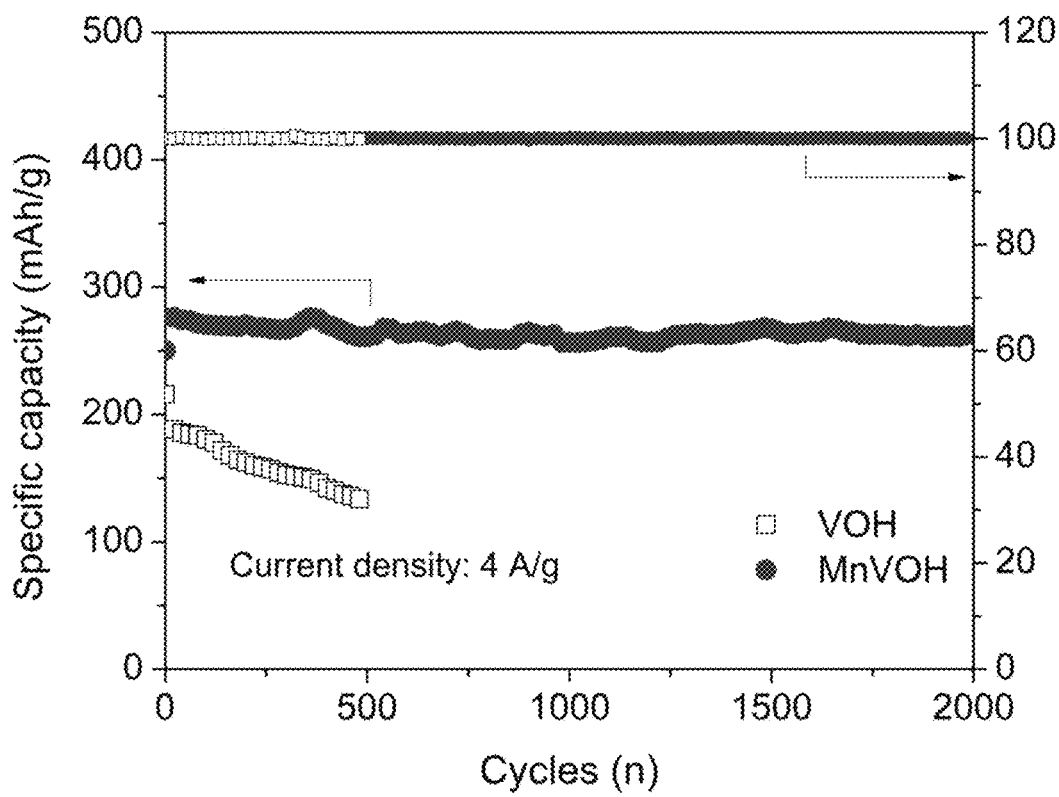
FIG. 4C is a graph illustrating the cycling stability of MnVOH and VOH as cathodes in the aqueous Zn-ion battery in accordance with embodiments of the present technology.
Figure 4D:
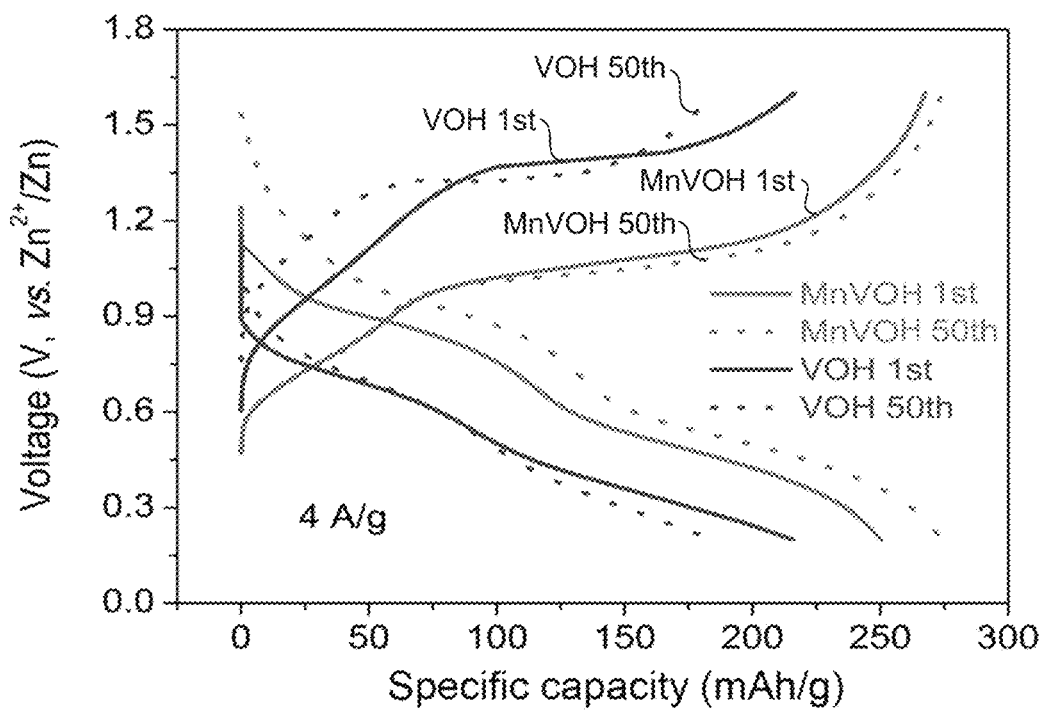
FIG. 4D is a graph illustrating the voltage profiles of MnVOH and VOH at the $1^{st}$ and $50^{th}$ cycles collected at 4 A/g in accordance with embodiments of the present technology.
Figure 4E:
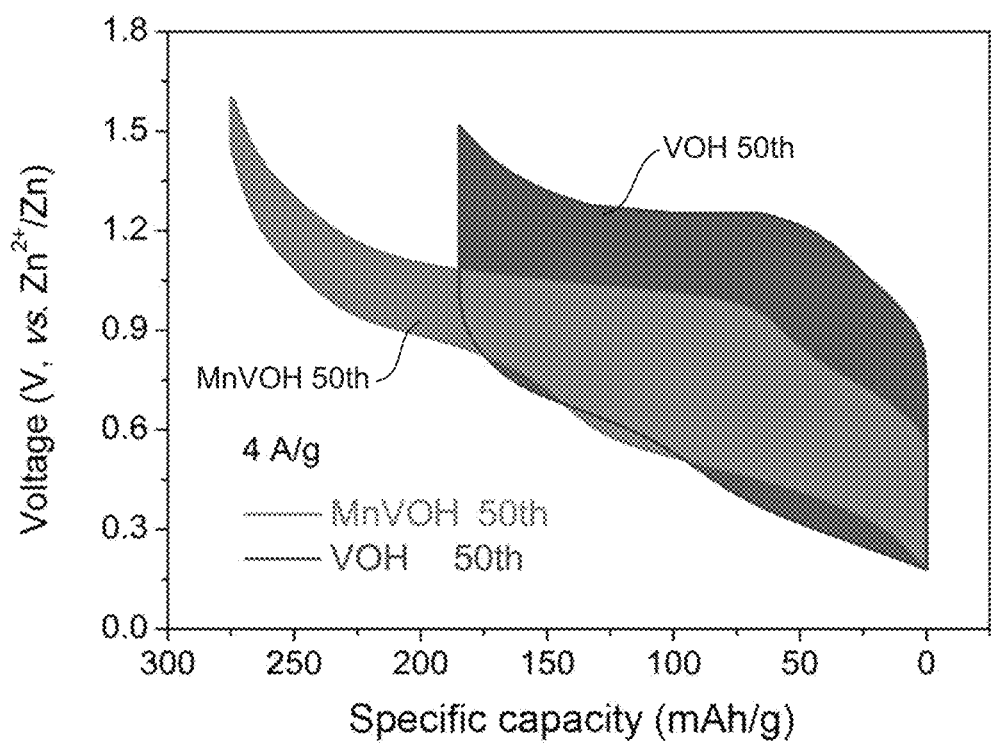
FIG. 4E is a graph illustrating the voltage hysteresis of MnVOH and VOH collected at 4 A/g in the $50^{th}$ cycle in accordance with embodiments of the present technology.
Figure 4F:
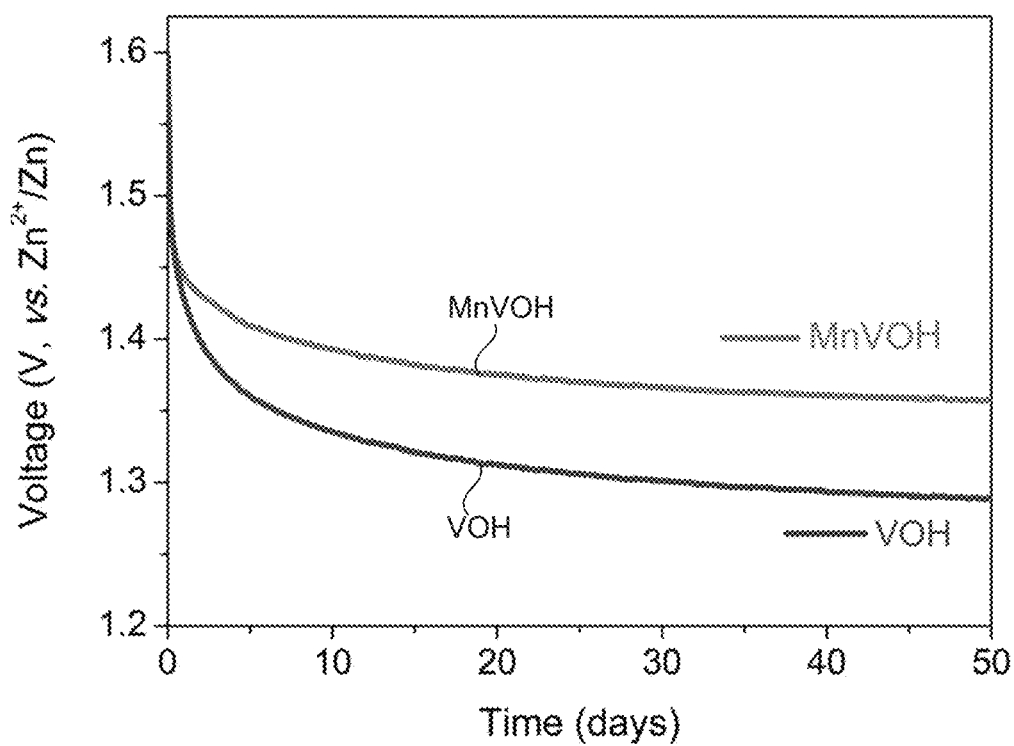
FIG. 4F is a graph illustrating the open circuit voltage degradations of MnVOH and VOH in batteries on the shelf in accordance with embodiments of the present technology.
Figure 19:
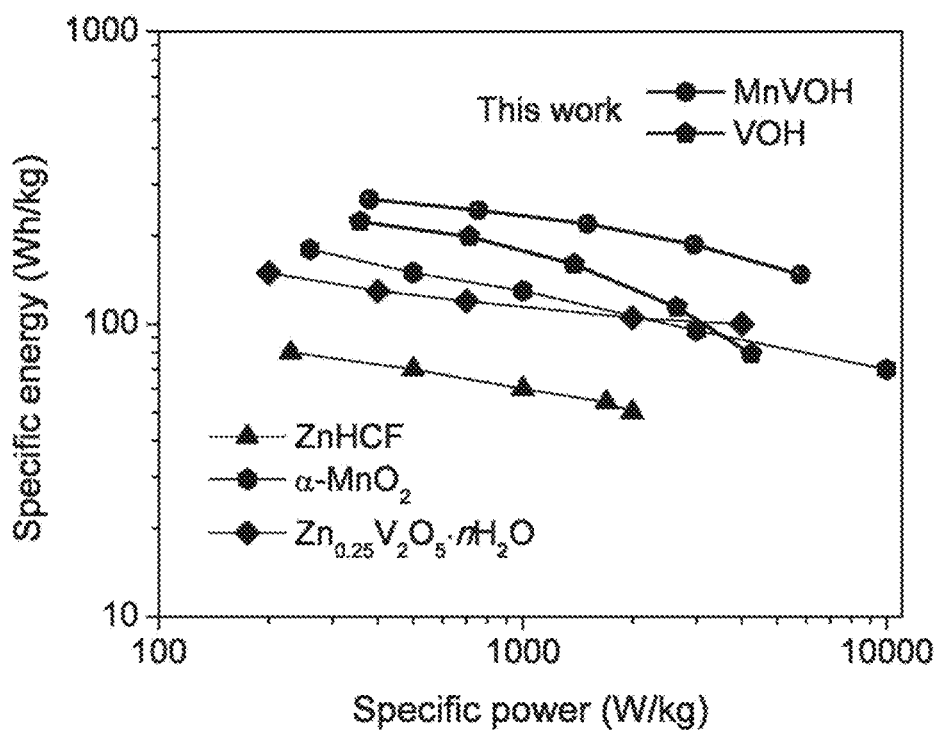
FIG. 19 is a Ragone plot of the Zn-ion batteries with various cathodes in accordance with embodiments of the present technology.
Figure 20:
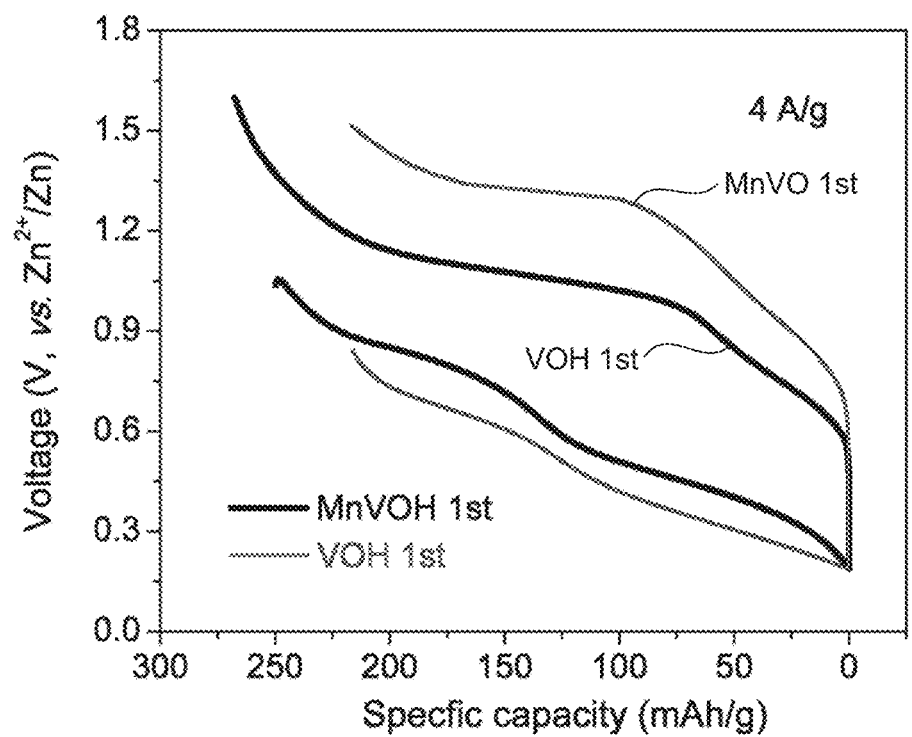
FIG. 20 is a graph of the voltage profile of MnVOH and VOH at a current density of 4 A/g in accordance with embodiments of the present technology.

When the current densities decrease back to 0.5 A/g from 8 A/g, the capacities recover to the initial values, suggesting a stable crystal structure and great electrochemical reversibility. During the high current cycling tests (FIG. 4C), MnVOH presents excellent stability after a slight capacity increase owing to the electrolyte penetration and electrochemical activation in the first several cycles. The stable specific capacity is around 260 mAh/g that closes to the result from rate test at the same current density of 4 A/g. However, the specific capacity of VOH decreases rapidly and capacity retention is 66% over 500 cycles, which is lower than 96% capacity retention over 2,000 cycles in MnVOH. The capacity retention of MnVOH is also higher than that of $Zn_{0.25}V_2O_5 \cdot nH_2O$ (80% over 1,000 at 2.4 A/g) and $LiV_2(PO_4)_3$ cathode (~75% over 4,000 cycles at 1.5 A/g). The maximum energy and power densities of MnVOH are 267 Wh/kg and 5,791 W/kg, respectively, which are higher than 224 Wh/kg and 4,244 W/kg of VOH as shown in Ragone plot (FIG. 19). Voltage hysteresis collected at 4 A/g exhibit the remarkable differences between the two, but this essential indicator for evaluating the practical possibility is ignored in the current reports on zinc ion batteries. As shown in FIG. 4D, MnVOH, at the initial cycle(s), delivers a higher specific capacity of 251 mA/g with a mid-value voltage of 0.61 V, which are higher than the specific capacity of 216 mAh/g and 0.47 V in VOH. At the $50^{th}$ cycles, the specific capacity of MnVOH has a slight increase to 275 mAh/g and an increased mid-value voltage of 0.67 V. However, VOH presents a decrease on specific capacity to 92 mAh/g with a slight increased mid-value voltage of 0.51 V. More importantly, energy efficiency (EE), defined by the ratio of discharge and charge energy densities in a battery performance to evaluate the practicability, is 70% calculated in the 50th cycle of MnVOH and its initial EE is 59%. The hysteresis area encompassed by the charging and discharging curves in FIG. 4E reflects the energy loss in one cycle. The larger area means lower EE and higher energy loss in the battery. For VOH, it has an initial EE of 40% (FIG. 20) and maintains at 41% in the $50^{th}$ cycle, meaning an energy loss reaches up to ~60%. Voltage degradations (FIG. 4F) on the shelf, another practical parameter to evaluate batteries' self-discharge, were also monitored after the fully charging process at a current density of 50 mA/g. Open circuit voltage of MnVOH battery maintains at 1.36 V (85% of the cutoff voltage) after 50 days, but VOH degrades to 1.29 V, suggesting a less self-discharge reaction happens in MnVOH.

Generally, the voltage degradation on the shelf comes from the charge redistribution and reverse ion transport between two electrodes. The better electrochemical performances in MnVOH can be attributed to the introduced Mn (II) that combined with water to expand the interlayer spacing for benefiting the ion diffusion to enhance the rate capability and decrease the polarizations at a high current density. Mn (II) cation carries positive charge that would form chemical interaction with terminal oxygen from $[VO_n]$ layers to stabilize the crystal structure, which guarantees the structural stability under the fast Zn ion insertion and extraction and decrease the ion self-diffusion to restrain the degradation on open circuit voltage when batteries are on the shelf with a long time. In addition, $V^{4+}$ induced by Mn (II) is positive effect for the improved electrochemical performance owing its larger ionic radius and one electron in the 3d orbital, which lead to a more expanded lattice spacing and enhanced electrical conductivity to catalyze the phase transition.

Figure 5A:
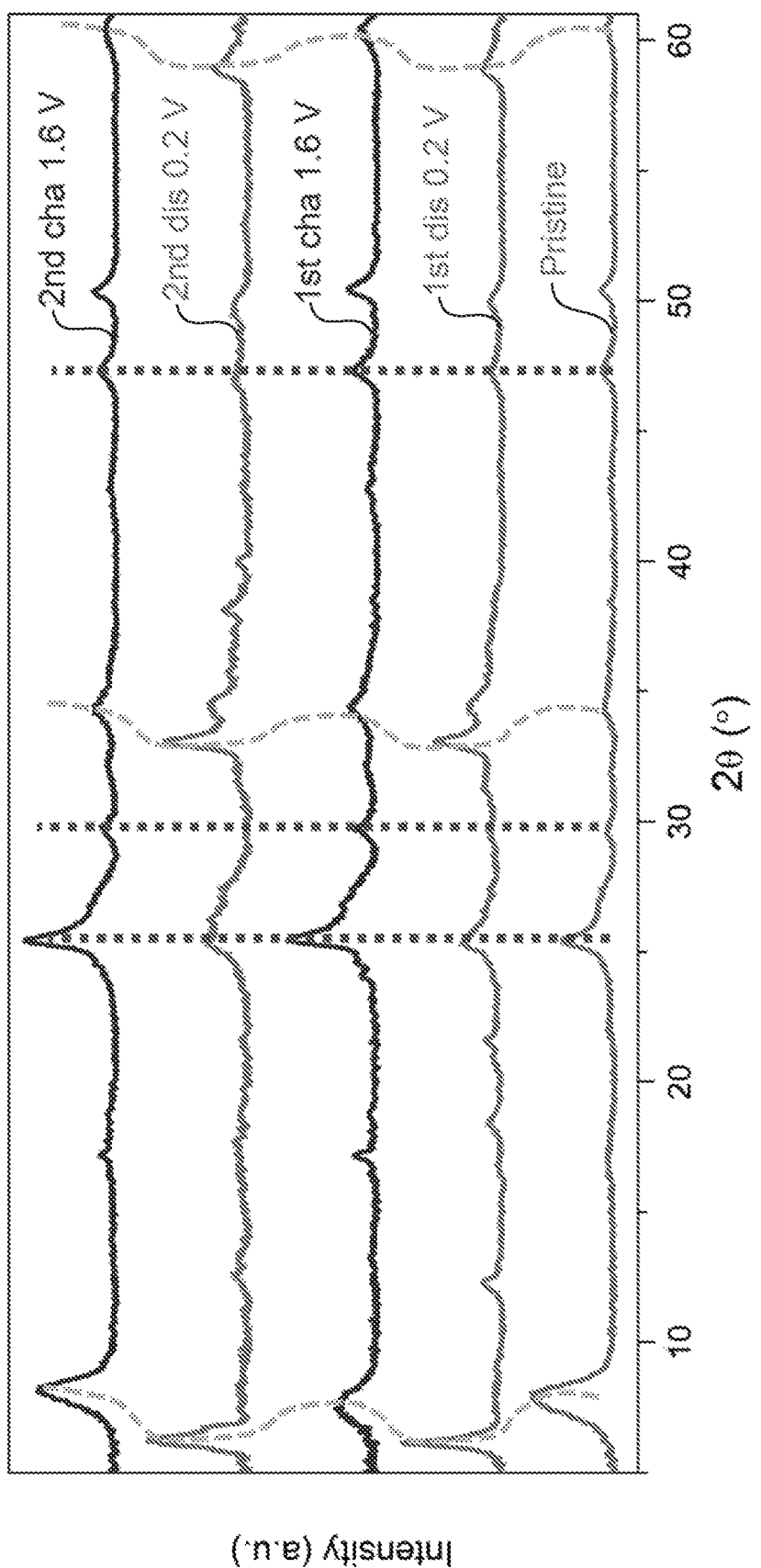
FIG. 5A is a graph illustrating the ex-situ XRD patterns of MnVOH at fully discharged and charged states in accordance with embodiments of the present technology.
Figure 5B:
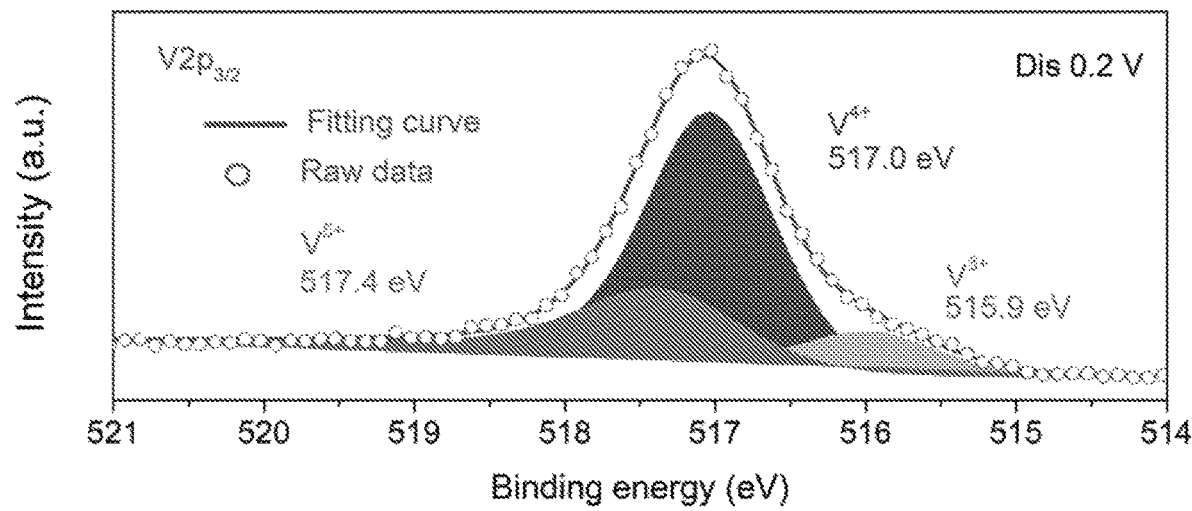
FIG. 5B is a graph illustrating the XPS spectra of $V2p_{3/2}$ at the fully discharged state in accordance with embodiments of the present technology.
Figure 5C:
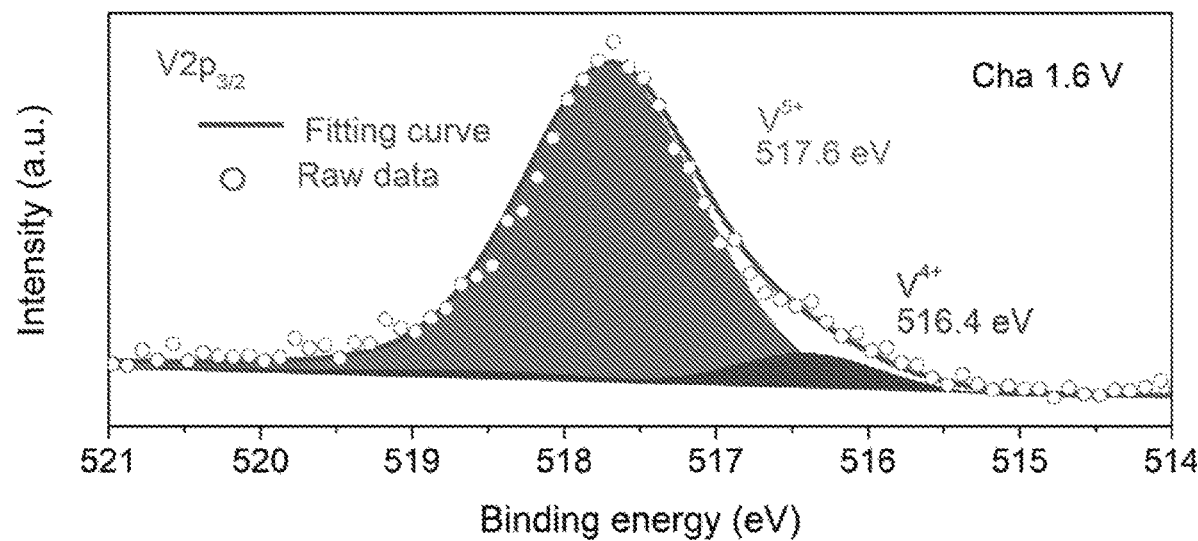
FIG. 5C is a graph illustrating the XPS spectra of $V2p_{3/2}$ at the fully charged state in accordance with embodiments of the present technology.

To confirm the charge storage mechanism, the phase transitions in the electrochemical processes were detected by ex-situ XRD and the patterns are shown in FIG. 5A. The pristine electrode was fully discharged to 0.2 V, the strongest peak at 6.8° moves to a lower angle of 6.2° meaning the interlayer spacing expanded to 14.1 Å from 12.9 Å. Zn ion has an ionic diameter of 0.88 Å in a six-coordination, but the size of hydrated $Zn^{2+}$ with six water molecules is around 2.1 Å, suggesting Zn ions are desolvated before intercalating. In the fully charged state, the peak at the lowest angle goes back to around the starting position, meaning a highly reversible reaction. The peaks around 35° and 62° present the similar tracks. Several weak peaks appear and vanish reversibly in the charging or discharging process, suggesting the reversible phases form in the reactive processes. Most of V cations reduce from 5+ to 4+ and 3+ when MnVOH cathode is discharged to 0.2 V from the pristine as presented in $H_2V_3O_8$. FIG. 5B shows the peak at 517.0 eV corresponding to $V^{4+}$ and 515.9 eV to 3+. The characteristic peak about $V^{5+}$ can be found owing to the incomplete reaction because the delivered specific capacity of 416 mAh/g at 50 mA/g (FIG. 4A) is lower than the theoretical capacity of 598 mAh/g based on the chemical valence of $V^{5+}$ fully reduces to $V^{3+}$ in the reaction. At the fully charged state, V cations are oxidized to 5+ with a small amount of 4+ as found in the pristine state. It is worth noting that the peak position of $V^{5+}$ shifts from 517.4 to 517.6 eV after the full charge (FIG. 5C).

Figure 5D:
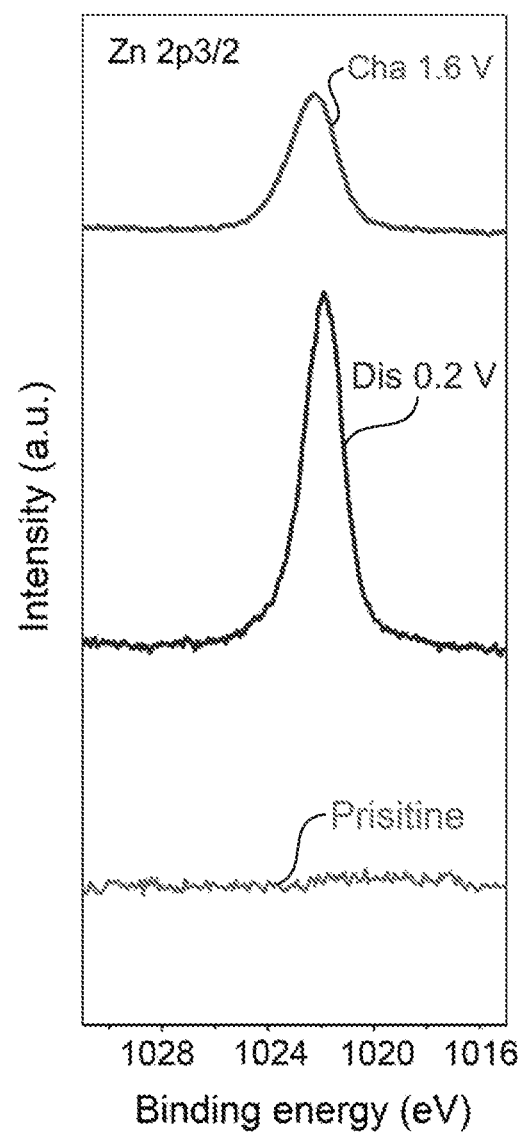
FIG. 5D is a graph illustrating the evolution of Zn 2p3/2 spectra in accordance with embodiments of the present technology.
Figure 5E:
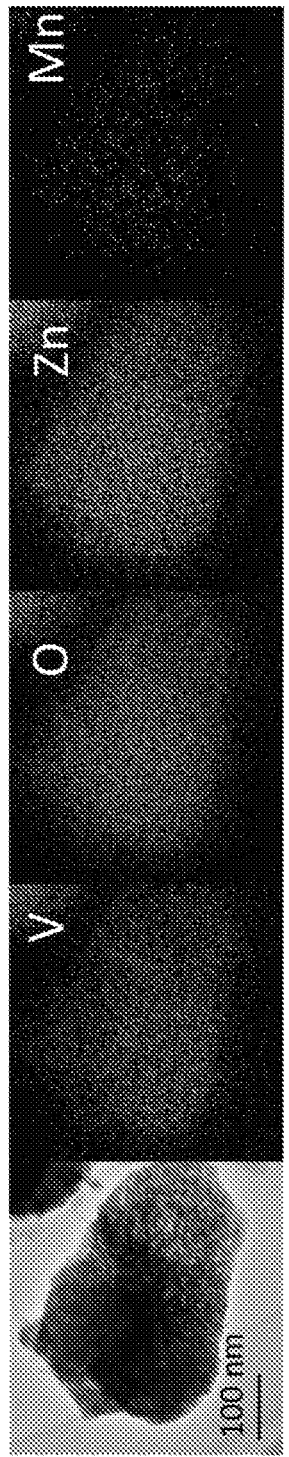
FIG. 5E is a TEM image and EDS mapping of the fully discharged state in accordance with embodiments of the present technology.
Figure 5F:
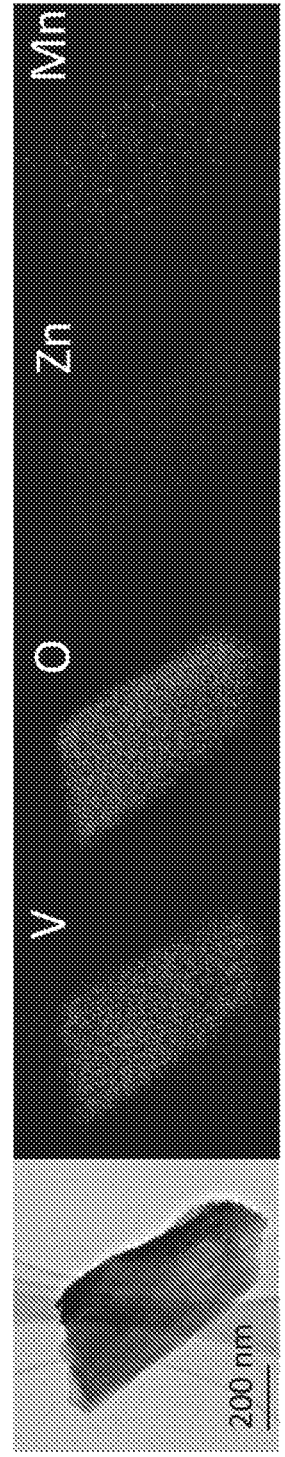
FIG. 5F is a TEM image and EDS mapping of the fully charged state in accordance with embodiments of the present technology.
Figure 21A:
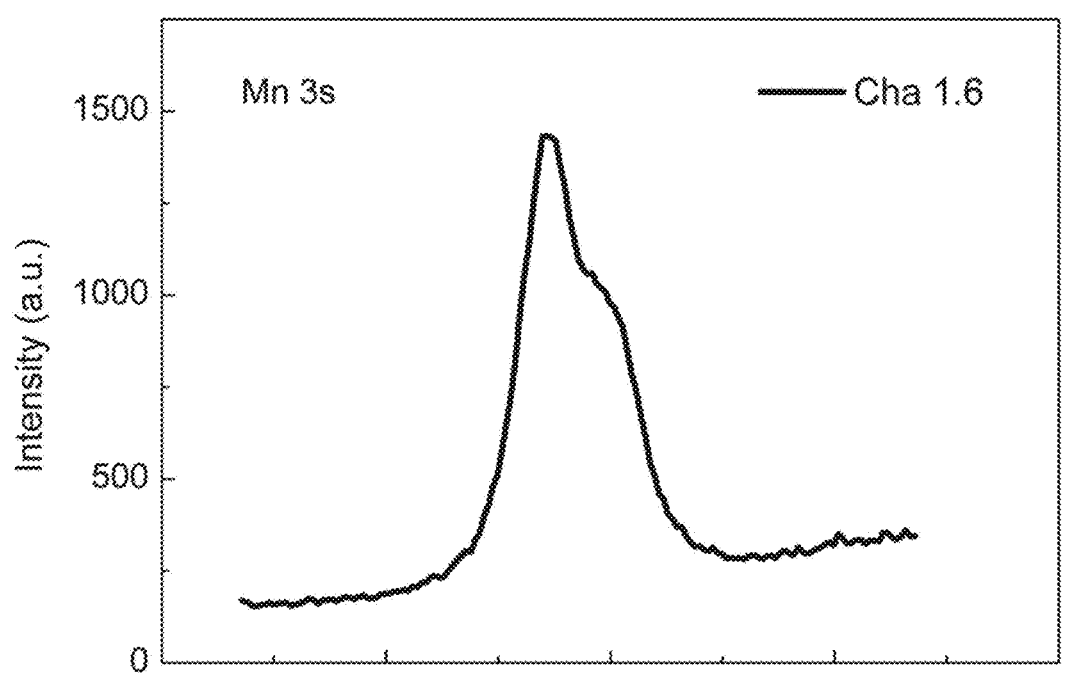
FIG. 21 is a graph of the XPS spectra Mn3s at fully charged and discharged states in accordance with embodiments of the present technology.
Figure 21B:
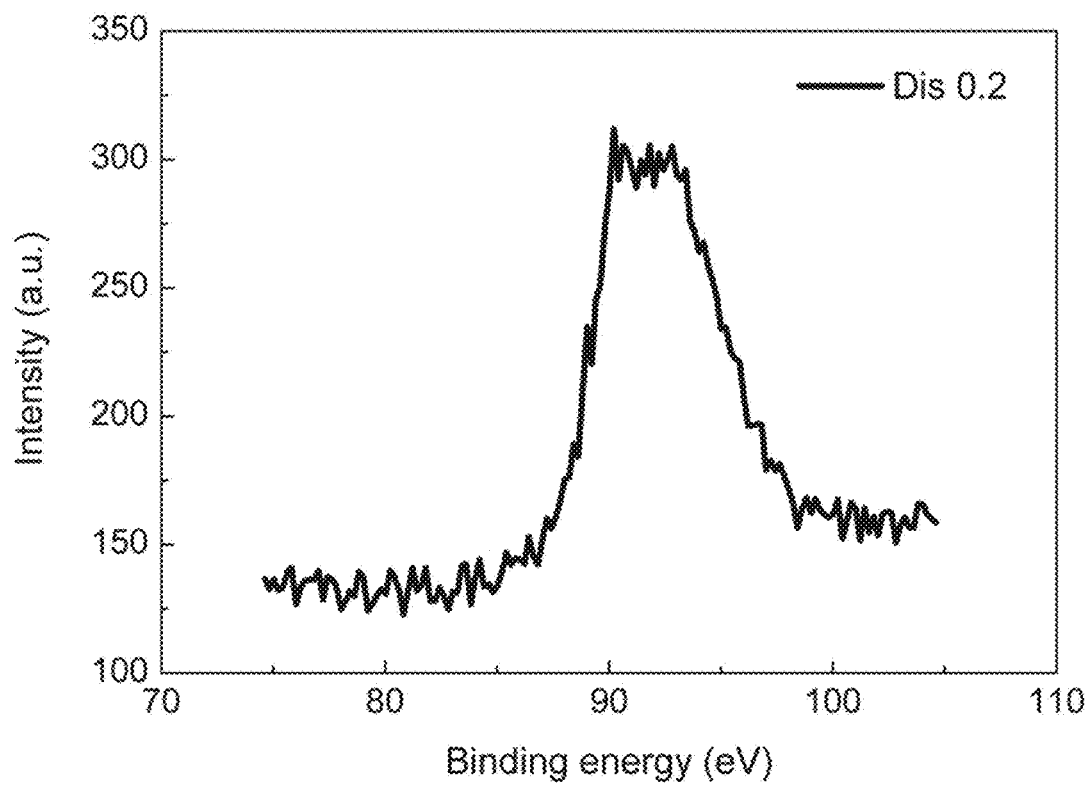
Figure 22A:
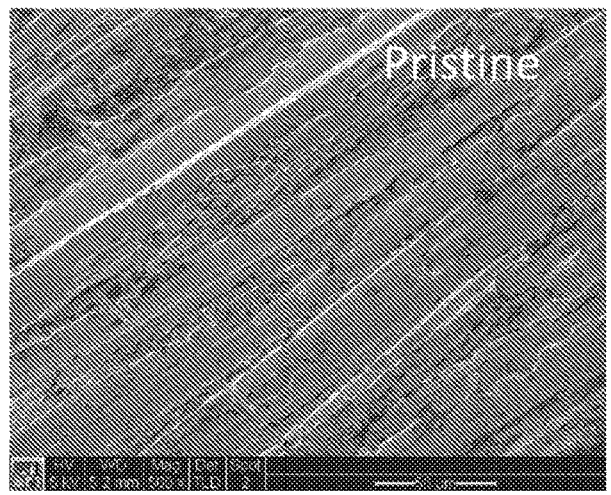
FIG. 22A is an SEM image of a Zn anode in the pristine state in accordance with embodiments of the present technology.
Figure 22B:
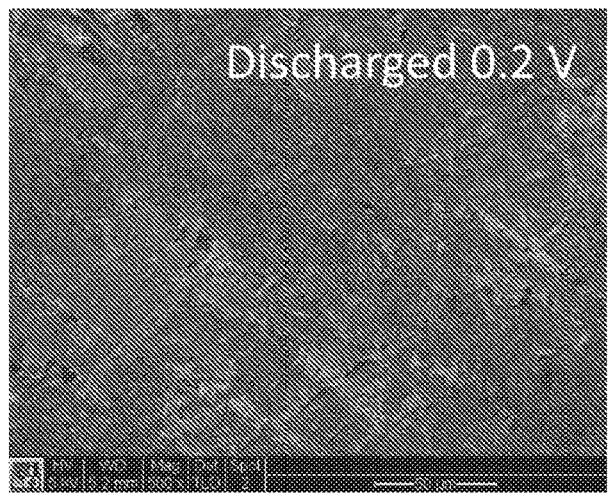
FIG. 22B is an SEM image of a Zn anode in the fully discharged state in accordance with embodiments of the present technology.
Figure 22C:
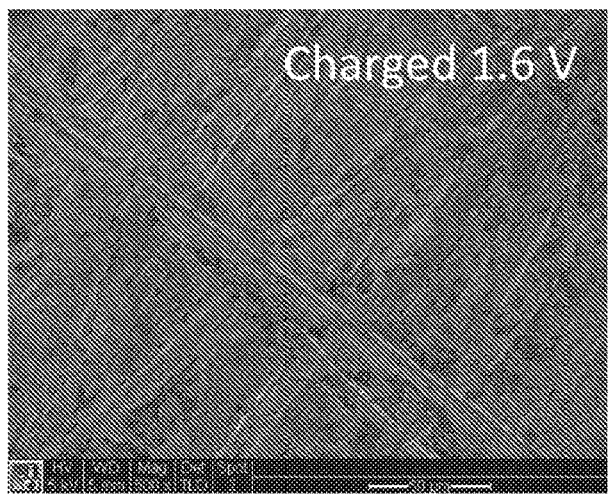
FIG. 22C is an SEM image of a Zn anode in the fully charged state in accordance with embodiments of the present technology.

In general, electron binding energy is defined as the extent of the attraction between cations and electrons through electromagnetic force in a respective atom, ion, molecule or solid, and determined by the electrostatic force of nuclei and screening effect from neighboring electrons, the formation of chemical bonds causes electron redistribution in atoms or ions and further leads to a change on binding energy. The binding energy of $V^{5+}$ shifts to a higher energy state, on one hand, can be attributed to the amount of $V^{4+}$ from 18.9% to 10.4% calculated by the area ratio in the simulated XPS results. The amount of $V^{4+}$ decreases and results in a weaker attraction from the nuclei of $V^{4+}$ to the electrons in $V^{5+}$ as observed in hydrogenated $V_2O_5$. The amount of $V^{4+}$ decrease also explains the capacity increase in the first two cycles as observed in FIG. 4A. The trapped $Zn^{2+}$ (FIG. 5D) is another possible reason because it impairs the electron-withdrawing effect of oxygen from the V cation, the reduced ionic diameter in $V^{5+}$ in comparison with that of $V^{4+}$ means the nucleus has an enhanced interaction on the electrons. The charging specific capacity is higher than the discharging one, which indicates the lower valence V cations are oxidized to 5+ in the first cycle (FIG. 4A) as observed in FIG. 5C. A part of the detected $Zn^{2+}$ in the fully charged state may also come from the surface adsorbed or lattice trapped $Zn^{2+}$. Mn (II) was detected by XPS in both fully discharged and charged states (FIG. 21), meaning Mn (II) stays intact in the host crystal. Besides, the oxidation of Mn (II) would occur only at voltages above 1.62 V, thus Mn (II) would not participate redox reactions in the working voltages of MnVOH. EDS mapping in FIG. 5E and FIG. 5F shows the element signals at fully discharged and charged states, Zn presents a strong and weak signal after discharging and charging in MnVOH cathode, and the reversible stripping/plating reaction simultaneously proceeds on Zn metal anode as observed by SEM (FIG. 22), which means Zn-ion intercalation/deintercalation reversibly happened in the electrochemical processes. The detected Mn in both states implies it stays stable as a pillar in the crystal lattice. The recovered phases and chemical valence of constituent elements in the electrochemical processes demonstrate a reversible intercalation reaction for MnVOH with the redox pairs from the V cations.

Figure 6A:
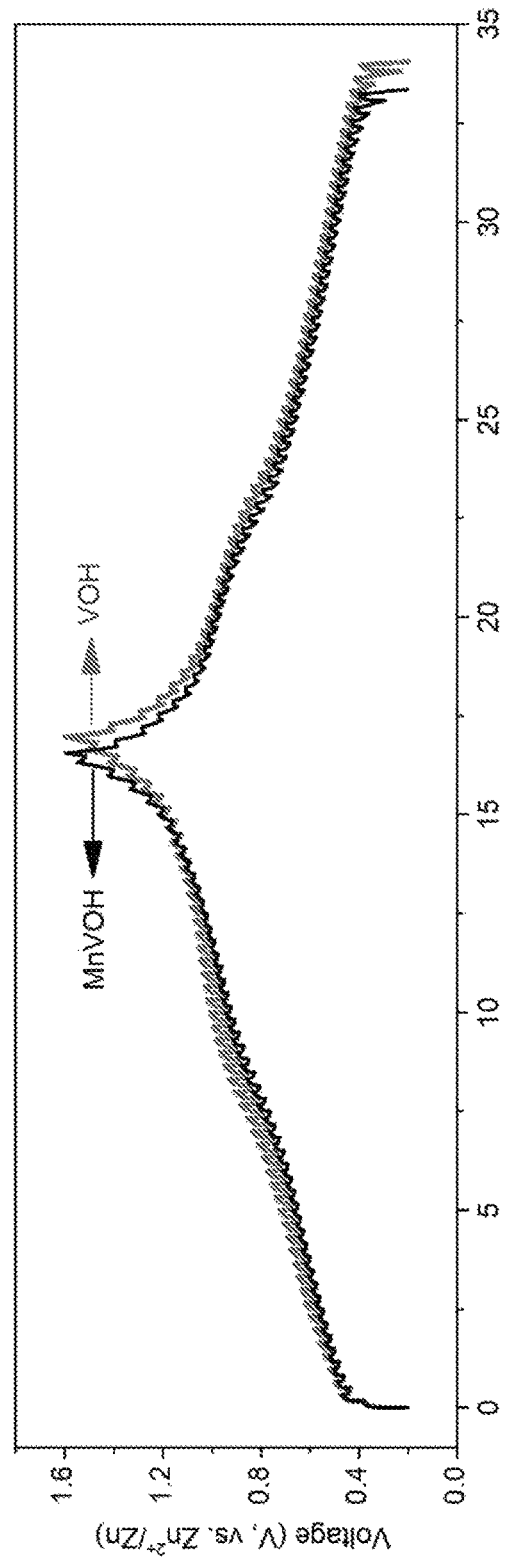
FIG. 6A is a GIIT plot of voltage versus time collected at a current density of 50 mAh/g for MnVOH and VOH in accordance with embodiments of the present technology.
Figure 6B:
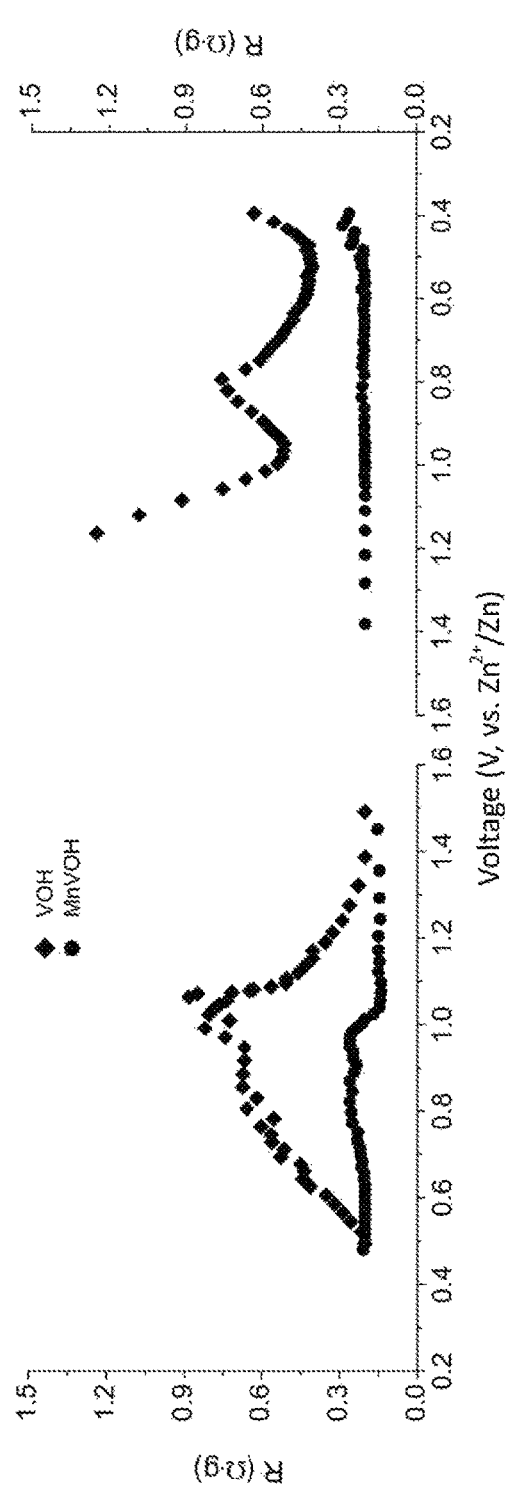
FIG. 6B is a graph of the reactive resistances during the charging and discharging process for MnVOH and VOH in accordance with embodiments of the present technology.
Figure 6C:
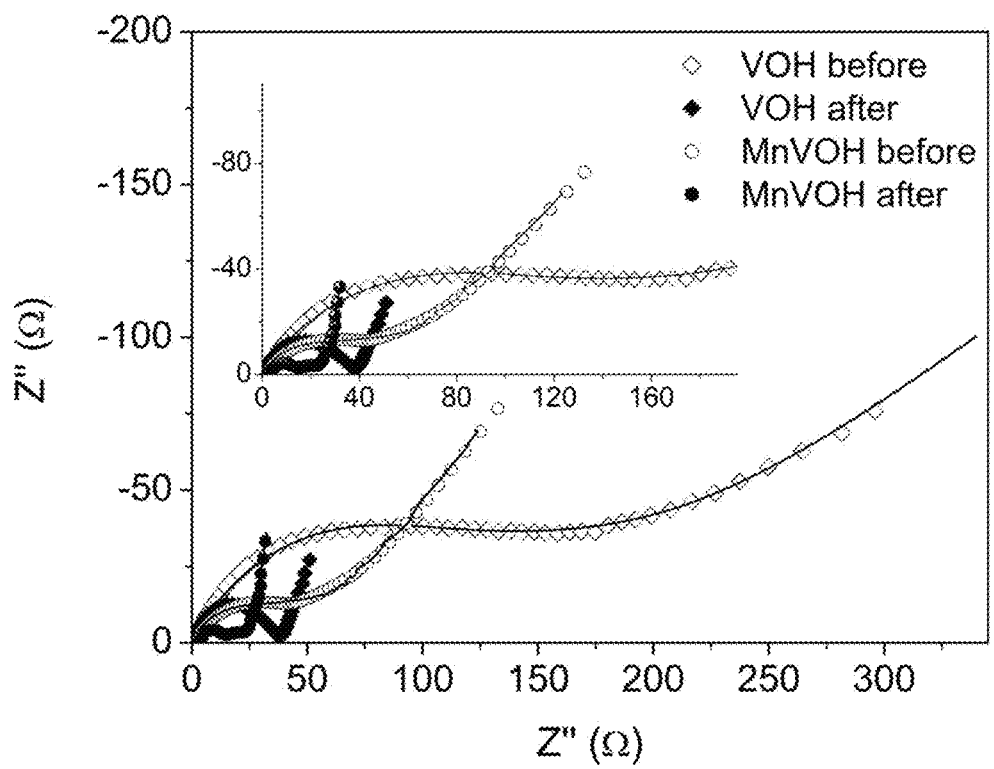
FIG. 6C is a graph of the EIS spectra of VOH and MnVOH in accordance with embodiments of the present technology.
Figure 6D:
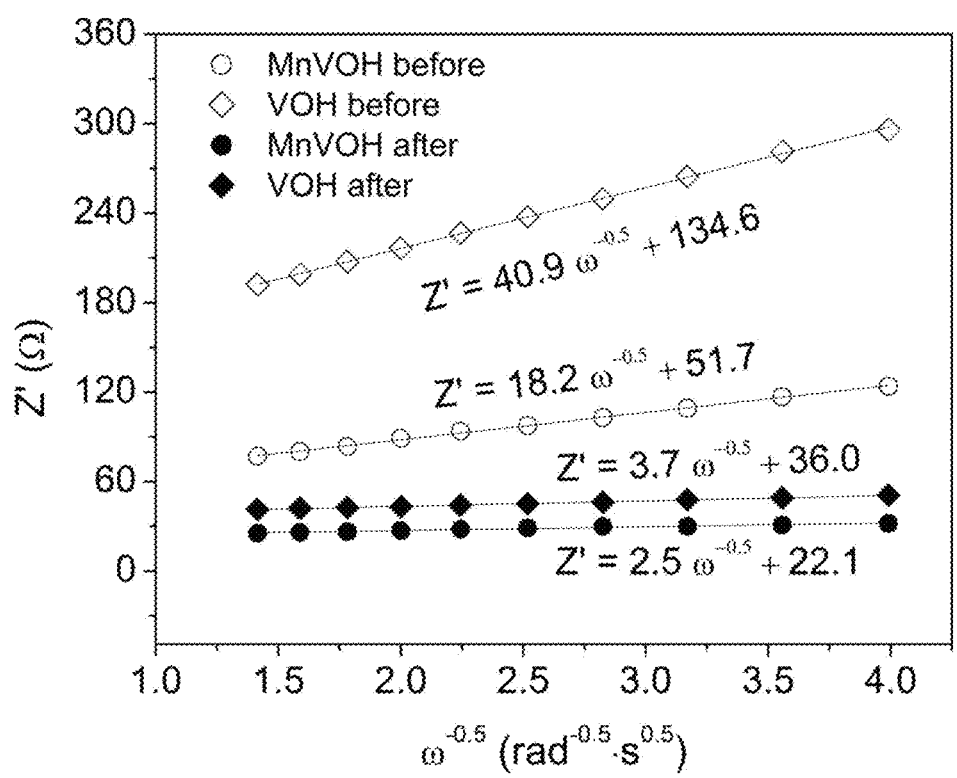
FIG. 6D is a graph illustrating the relationship between real part of impedance and low frequencies for MnVOH and VOH in accordance with embodiments of the present technology.

To discern the reasons of the disparity on the electrochemical performance of both samples, GITT plots were collected at a current density of 50 mA/g as shown in FIG. 6A. The relaxation rest after charging and discharging causes the zigzag voltage profiles and the voltage recovery is used to evaluate the ion diffusion and the IR drop can be transform to internal reactive resistance (RR). The RRs are calculated using IR drop with the applied current density and the resistances at different steps are show in FIG. 6B. For MnVOH, the RRs are lower than 0.3 Ω·g in the whole process, even though a resistance bump appears around 1.0 V in the charging process. However, the RRs of VOH present an increase at the charging process and reach the maximum of 0.9 Ω·g around 1.0 V and then go down. In the discharging process, the RRs of MnVOH maintain stable, but two concaves appear at 0.5 and 1.0 V in VOH. It is interesting that the positions of the bumps or concaves are identical to the redox peaks observed in CVs (FIG. 3B), implying a radical difference on charge transfer in both samples. From the point of crystal structures, charge transfer in VOH prefers along the ab plane owing to the $[VO_n]$ polyhedra connecting to each other through edge- or point-sharing, but no points or edge contact between the interlayers along the c-axis. In MnVOH, Mn (II) ions reside into and connect [VO] interlayers so that the charge transfer is 3-dimensional and the charges from redox reaction can be transferred easily. EIS spectra (FIG. 6C) compare the impedances of batteries before cycle and at the fully charged states and Table 3 lists their charge transfer resistances (CTRs). EIS spectra consist of semi-circle at high-frequency region corresponding to charge transfer resistance and a linear tail at low-frequency relating to ion diffusion. MnVOH presents a CTR of 63Ω at the initial state and the CTR decreases to 24Ω after 3 cycles, while CTRs of VOH are 177 and 38Ω before and after cycling. The decrease of CRTs after cycling might be attributed to the activation of materials and a small amount of trapped $Zn^{2+}$ connected the $[VO_n]$ interlayers to provide more charge transfer pathways. The relationship between low-frequencies and real part of impedance (FIG. 6D) can be used to calculate the Zn-ion diffusion coefficient. For example, Zn-ion diffusion coefficients of MnVOH and VOH electrodes can be calculated from the low-frequency plots of EIS spectra based on the following equations $$Z'=R_s+R_f+R_{ct}+\sigma_w\omega^{-0.5}, \quad (2)$$

$$D_{Li+}=R^2T^2/2A^2n^4F^4C^2\sigma_w^2, \quad (3)$$

where ω, A, n, F, C, R, and T stands for the angular frequency, electrode area (0.875 cm²), reactive electron number per chemical formula (4), Faraday's constant (96,500 C mol⁻¹), the molar concentration of Zn ions (3.0×10⁻³ mol cm⁻³), gas constant (8.314 J mol⁻¹ K⁻¹), and the testing temperature (298 K), respectively. σw is the linear slopes from the relationship between frequencies and real part of impedance (FIG. 6D). MnVOH has a higher $D_{Zn2+}$ of 3.22×10⁻¹² than that of 1.46×10⁻¹² cm²/s in VOH after the material activation. The lower RRs and CRTs and higher $D_{Zn2+}$ in MnVOH guarantee the fast redox reaction and stable crystal structure supported by pillar Mn (II) endows the excellent cycling stability at high current density of 4 A/g as shown in FIG. 4B.

TABLE 3

The charge transfer resistances and ion diffusion coefficients from the EIS tests

| Samples ID | Label | $R_{ct}$ (Ω) | $D_{Zn2+}$ (cm²/s) |
| --- | --- | --- | --- |
| VOH | Before cycling | 177 | 1.20 × 10⁻¹⁴ |
|  | After 3 cycles | 38 | 1.46 × 10⁻¹² |
| MnVOH | Before cycling | 63 | 6.07 × 10⁻¹⁴ |
|  | After 3 cycles | 24 | 3.22 × 10⁻¹² |

Figure 7A:
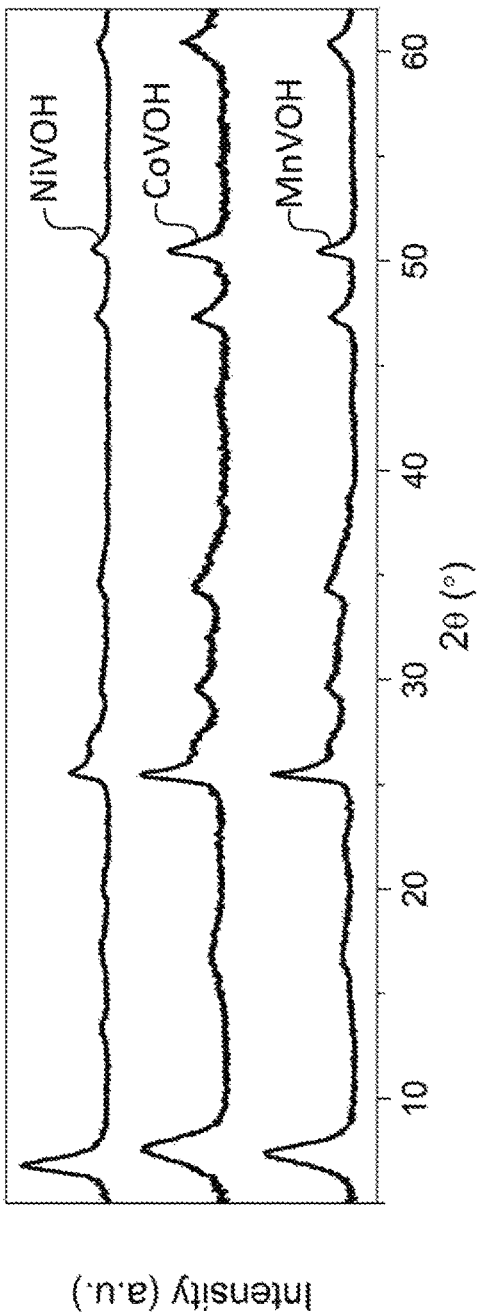
FIG. 7A is a graph of the XRD patters of NiVOH, CoVOH, and MnVOH in accordance with embodiments of the present technology.
Figure 7B:
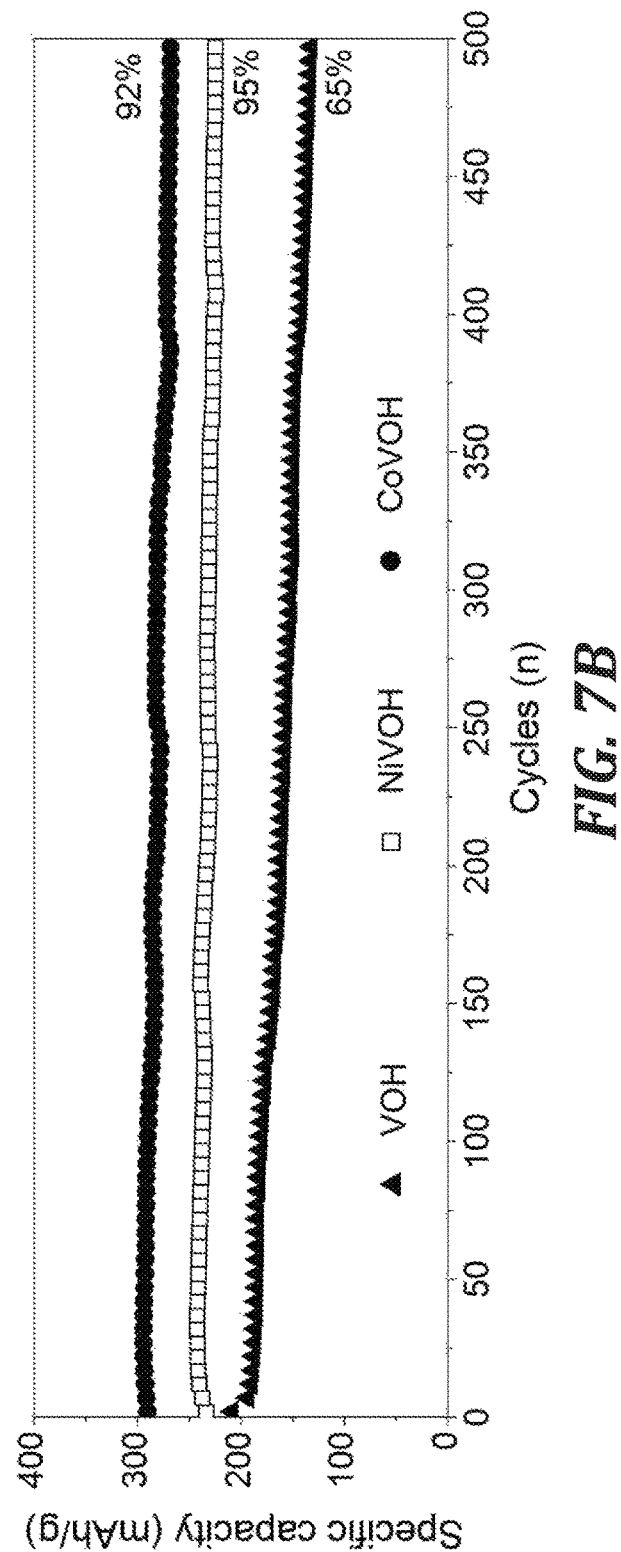
FIG. 7B is a graph of the rate capability of VOH, CoVOH, and NiVOH in accordance with embodiments of the present technology.
Figure 7C:
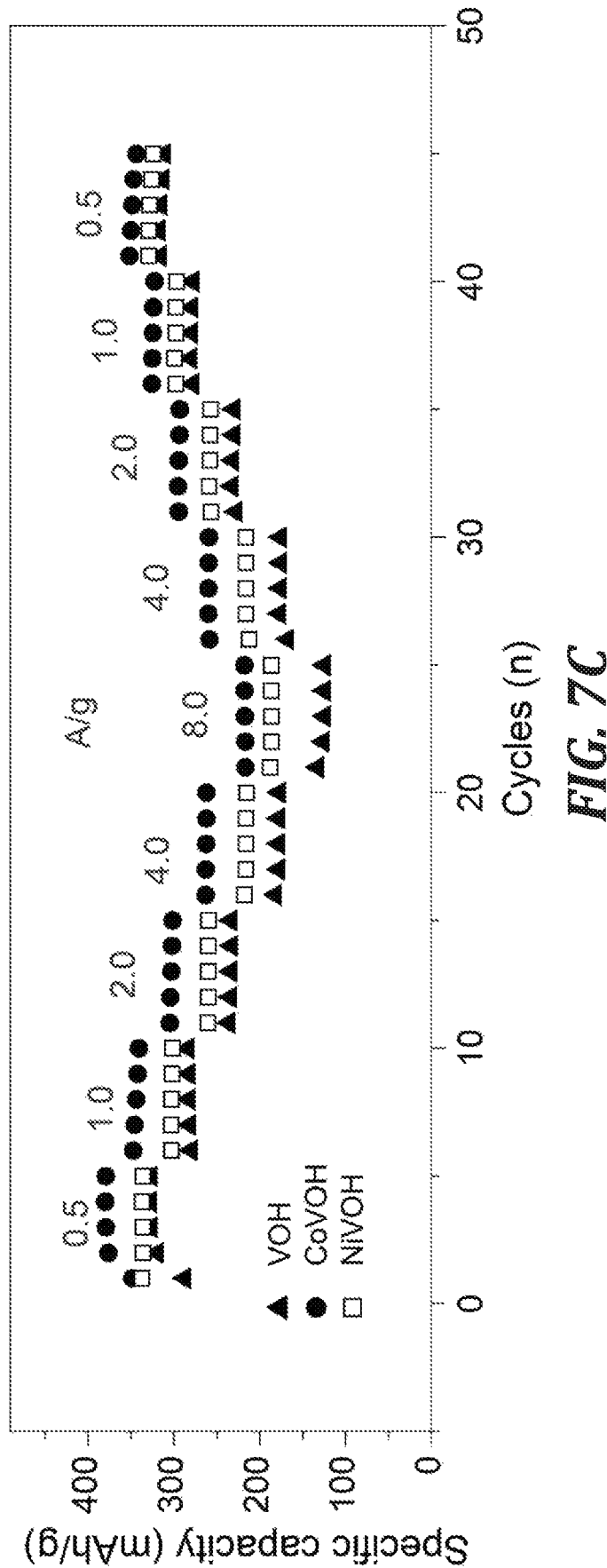
FIG. 7C is a graph of the cycling stability of VOH, CoVOH, and NiVOH in accordance with embodiments of the present technology.

As described herein, Mn (II) expanded VOH achieves the structural stability and reduces reactive polarization during the repeated charge/discharge process. Other transition metal cations such as nickel and cobalt sulfates can also be used as the raw materials to replace manganese sulfate in the synthesis processes to obtain the stabilized samples. The resulting powders exhibit similar XRD patterns as shown in FIG. 7A, suggesting three samples have the similar crystal structures with MnVOH as characterized and analyzed above. The comparison on rate capability and cycling stability are shown in FIGS. 7A, 7B, 7C. Ni (II) vanadate (NiVO) and Co (II) vanadate (CoVO) deliver enhanced rate capability and display the excellent cycling stability at 4 A/g and high capacity retentions of 92% and 95%, respectively. Those are higher than 65% of VOH or ~80 of $Zn_{0.25}V_2O_5 \cdot nH_2O$ or ~90% of $Na_2V_6O_{16} \cdot 1.63H_2O$ in the reported, demonstrating the TMCs introduction can effectively improve the Zn-ion storage performance in hydrated vanadate. The disparities on electrochemical performances of different TMCs vanadate might be attributed to the ionic size of TMCs. Consequently, TMCs introduction in hydrated vanadate is a general and effective strategy to improve the electrochemical performances for various multivalent ions storage.

Expanding the interplanar spacing of hydrated vanadate by introduction of Mn (II) ions makes the cathode more thermally and structurally stable. Chemically inserted Mn (II) ions connect [VO$_n$] layers by chemical bonds, work as pillars making the robust structure, and induce the formation of V$^{4+}$ ions resulting in expanded lattice spacing, which facilitates fast ion diffusion (3.22×10$^{-12}$ cm$^2$/s) and enhances the electrical conductivity. MnVOH cathode possesses a large storage capacity (260 mAh/g) at a higher discharge current density (4 A/g) than that of VOH. MnVOH also demonstrates a capacity retention of 96% over 2,000 cycles at 4 A/g compared to 65% of VOH over 500 cycles. Chemically inserted Mn (II) ions improved reversibility by reducing the voltage polarization, resulting in an energy efficiency of 70% in MnVOH cathode battery, much higher than 40% for VOH at 4 A/g and with an open circuit voltage of MnVOH battery retained at 1.36 V (85% of the cutoff voltage) after 50 days on the shelf. Divalent transition metal cations, such as Co and Ni, exhibit the same structures and stable cycling performance, suggesting that expanded VOH by introduction of TMCs is an effective and universal approach to improve or design high-performance cathode materials for aqueous Zn-ion and other multivalent ions batteries.

Figure 8A:
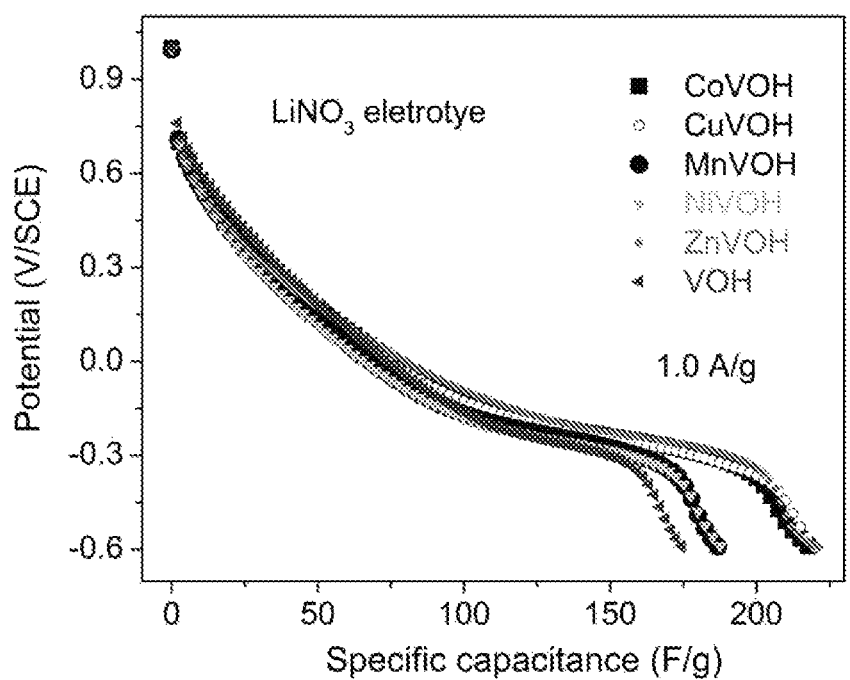
FIG. 8A is a graph of the voltage discharge profiles of select transition metal stabilized VOH electrodes in aqueous Li-ion capacitors in accordance with embodiments of the present technology.
Figure 8B:
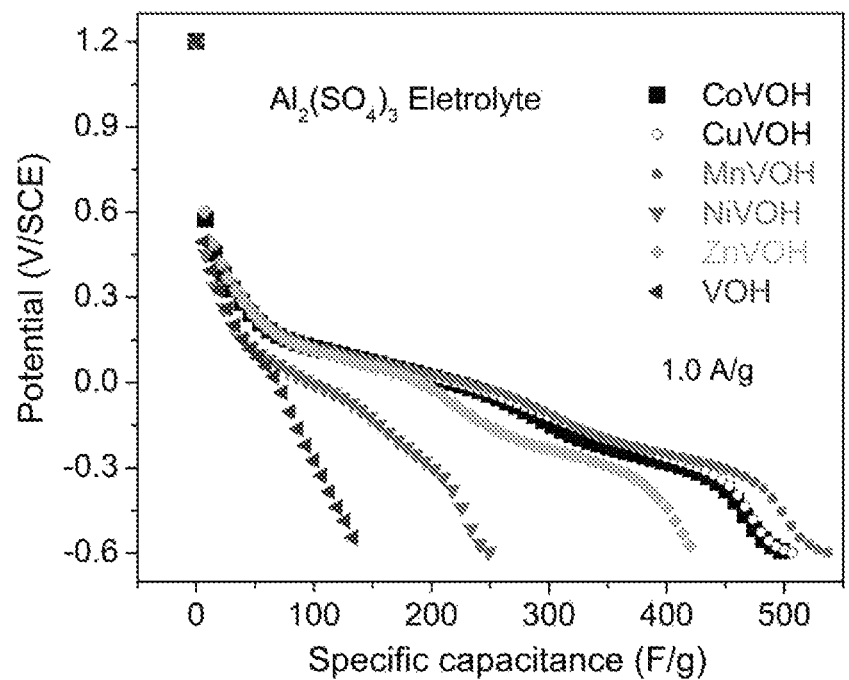
FIG. 8B is a graph illustrating the voltage discharge profiles of select transition metal stabilized VOH electrodes in aqueous Li-ion capacitors in accordance with embodiments of the present technology.
Figure 9A:
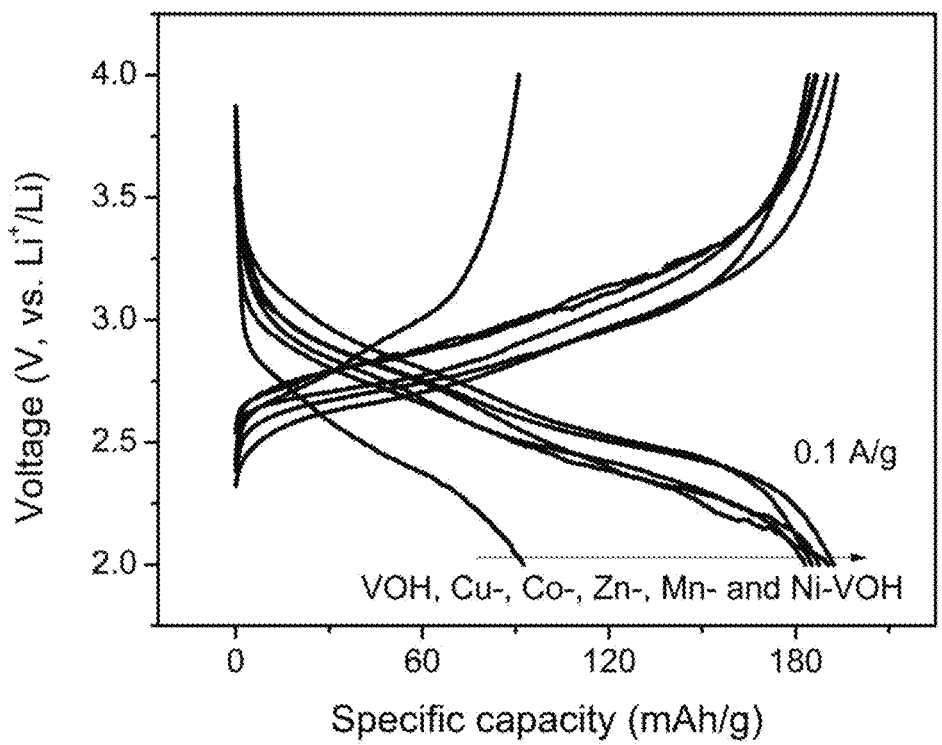
FIG. 9A is a graph illustrating the voltage profiles of transition metal stabilized VOH cathodes in Li-ion batteries in accordance with embodiments of the present technology.
Figure 9B:
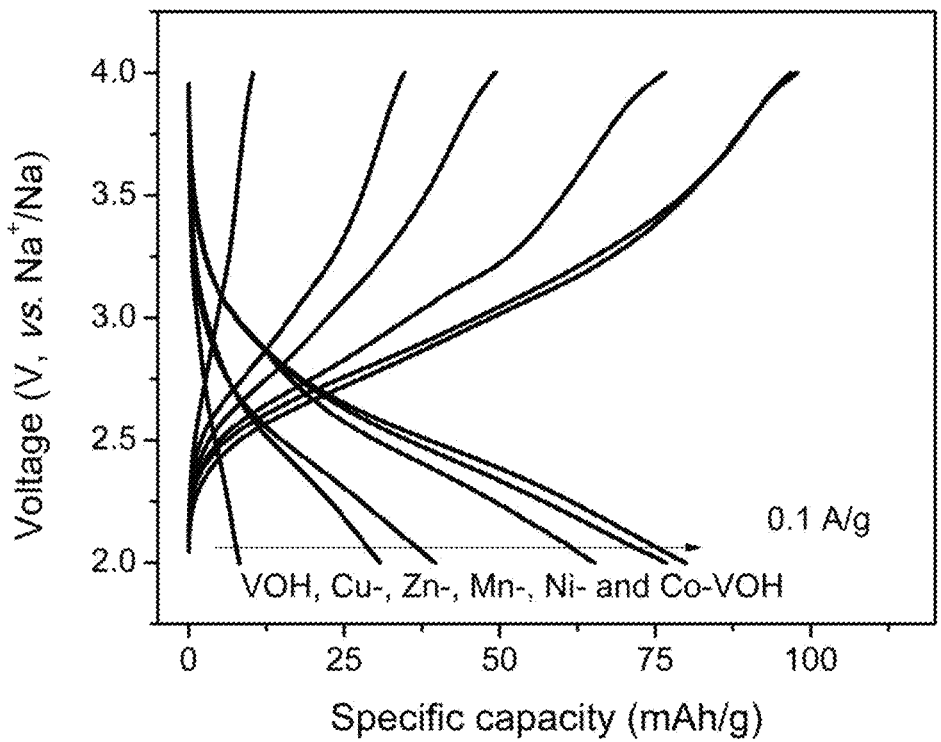
FIG. 9B is a graph illustrating the voltage profiles of transition metal stabilized VOH cathode in Na-ion batteries in accordance with embodiments of the present technology.

As discussed above, transition metal stabilized VOH (TMVOs) can be used in a number of settings. For example, TMVOs can be used as electrode materials for aqueous Li- and Al-ion capacitors. The voltage profiles of various TMVOs in Li- and Al-ion capacitors are shown in FIGS. 8A and 8B, respectively. In aqueous Li-ion capacitors, 1 M LiNO$_3$ water-based solution was used as the electrolyte and the saturated calomel electrode (SCE) was used as reference electrode and platinum foil was used as the counter electrode. TMVOs can deliver a specific capacity as high as 220 F/g at 1.0 A/g that is higher than 175 F/g of VOH. In aqueous Al-ion capacitors, 1 M Al$_2$(SO$_4$)$_3$ was used as the electrolyte, the counter and reference electrodes are same as used in Li-ion capacitors. The highest specific capacity reaches 540 F/g at 1.0 A/g, it is higher than 140 F/g of VOH. These cathode materials can also be used in nonaqueous Li- and Na-ion batteries. The voltage profiles of the various TMVOs in nonaqueous Li- and Na-ion batteries are shown in FIGS. 9A and 9B. Li and Na metals were used as anodes in the testing Li- and Na-ion batteries, respectively.

Figure 10:
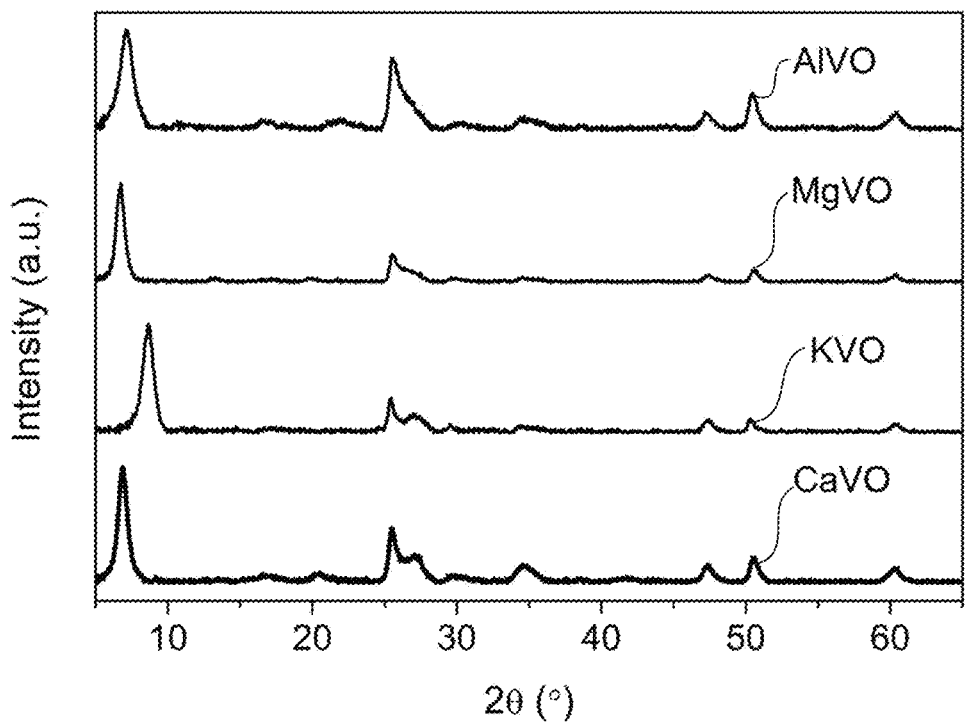
FIG. 10 is a graph illustrating the XRD patterns of Al (III), Mg (II), K (I) and Ca (II) stabilized VOH in accordance with embodiments of the present technology.
Figure 11:
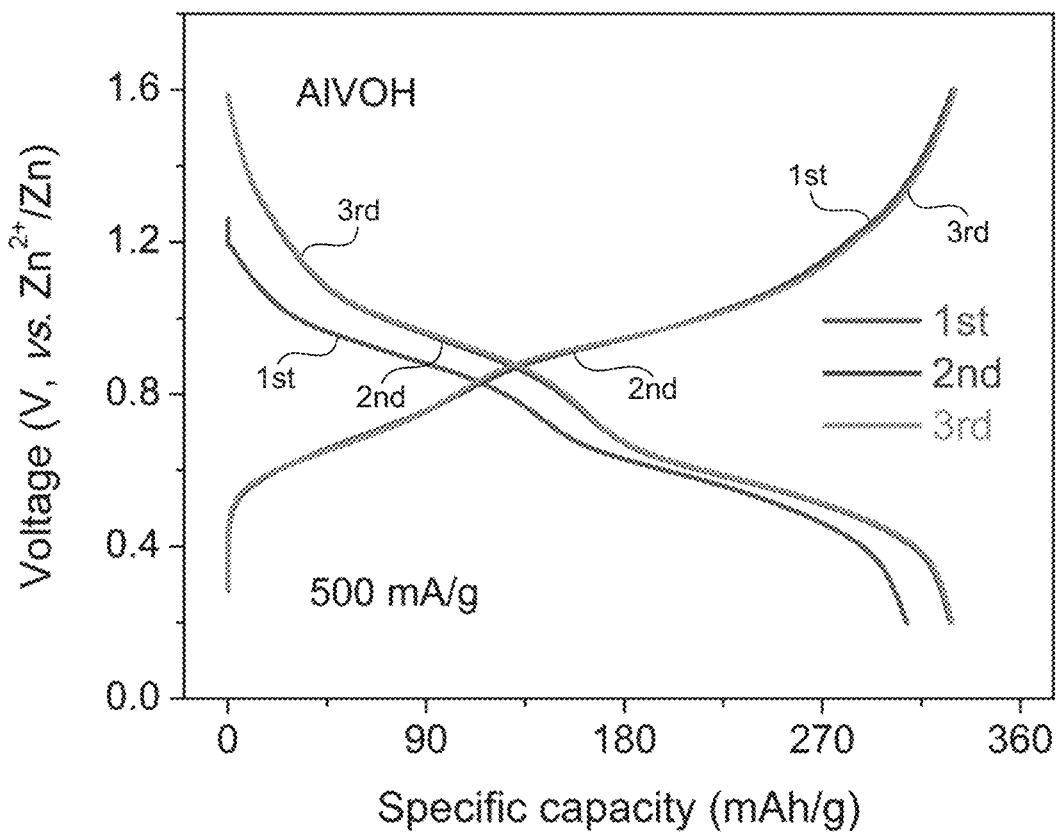
FIG. 11 is a graph illustrating the voltage profiles of an AlVOH cathode in an aqueous Zn-ion battery in accordance with embodiments of the present technology.
Figure 12:
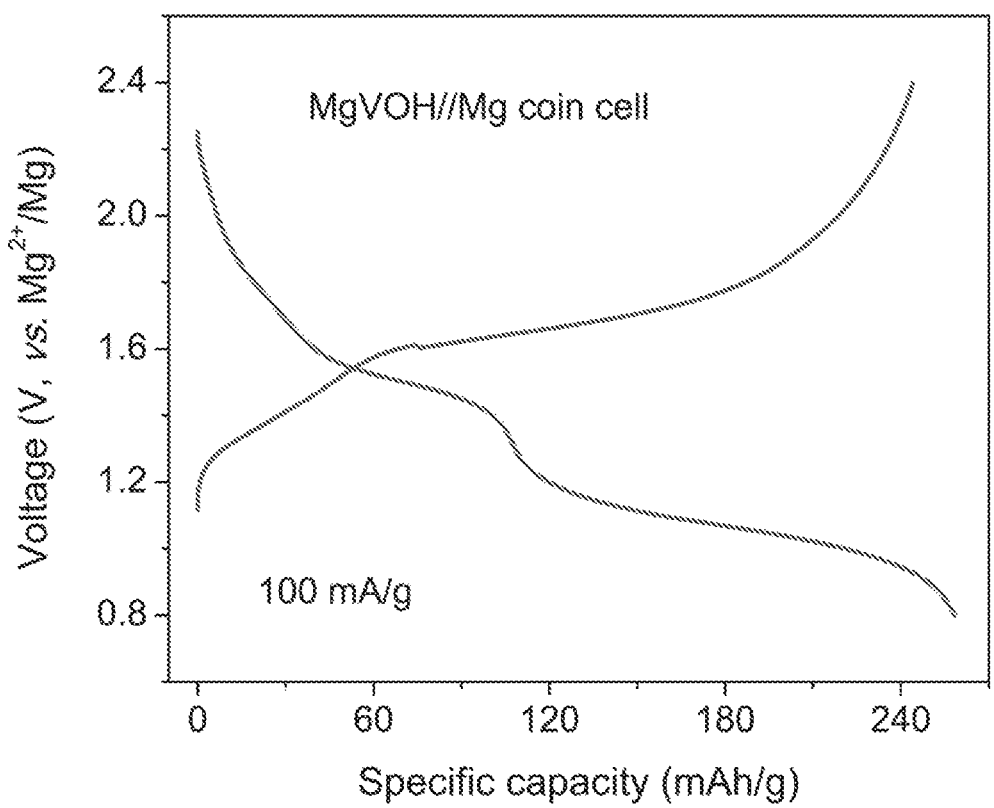
FIG. 12 is a graph illustrating the voltage profiles of a MgVOH cathode in an aqueous Mg-ion battery in accordance with embodiments of the present technology.

Non-transition metal ions, such as Al (III), Mg (II), K (I) and Ca (II), can also be used to create stabilized VOH. Al (III), Mg (II), K (I) and Ca (II) stabilized VOH can be synthesized by the same procedures as in TMVOs synthesis. XRD patterns in FIG. 10 show the similar results as observed in TMVOs materials, meaning there are likely similar crystal structures in the samples. Moreover, AlVOH delivers a specific capacity of 340 mAh/g at the current density of 500 mA/g (FIG. 11). MgVOH displays a promising application in aqueous Mg-ion batteries in which metallic Mg foil was used as the anode and 4M Mg(TFSI)$_2$ solution was used as the electrolyte. For example, it can deliver a specific capacity of 260 mAh/g at a current density of 100 mA/g (FIG. 12).

Example 2. Preparation and Testing of Additional Cation-Expanded Hydrated Vanadates A series of cation-expanded hydrated vanadates were prepared through similar methods as disclosed in Example 1 regarding MnVOH. The synthesis of the hydrated vanadates simply substituted sulfates having the desired cation instead of manganese sulfate (as used in Example 1). The vanadate hydrates were characterized using similar techniques to those disclosed in Example 1, including XRD and voltage profiling to determine specific capacity. The tested vanadate hydrates and a summary of their synthesis and characterization are presented below in Table 4 and the related summaries and FIGURES below.

TABLE 4

Comparison on vanadate hydrates as Zn-ion cathodes.

| Cation | Performance | Synthesis | Phases | Testing Conditions |
|---|---|---|---|---|
| Ca$^{2+}$ | 355 mAh/g at 0.5 A/g | Same procedure as used for MnVOH, in Example 1 just with different sulfates. | Similar XRD patterns to MnVOH (see FIGS. 23A, 24A, and 25A as examples) | Same conditions including the voltage window and battery assembly as MnVOH in Example 1. |
| Mg$^{2+}$ | 410 mAh/g at 0.5 A/g | | | |
| K$^+$ | 410 mAh/g at 0.5 A/g | | | |
| Al$^{3+}$ | 380 mAh/g at 0.05 A/g | | | |
| Mn$^{2+}$ | 415 mAh/g at 0.5 A/g | | | |
| Fe$^{2+}$ | 260 mAh/g at 0.5 A/g | | | |
| Co$^{2+}$ | 380 mAh/g at 0.5 A/g | | | |
| Ni$^{2+}$ | 337 mAh/g at 0.5 A/g | | | |
| Cu$^{2+}$ | 379 mAh/g at 0.5 A/g | | | |
| Zn$^{2+}$ | 360 mAh/g at 0.5 A/g | | | |

Figure 23A:
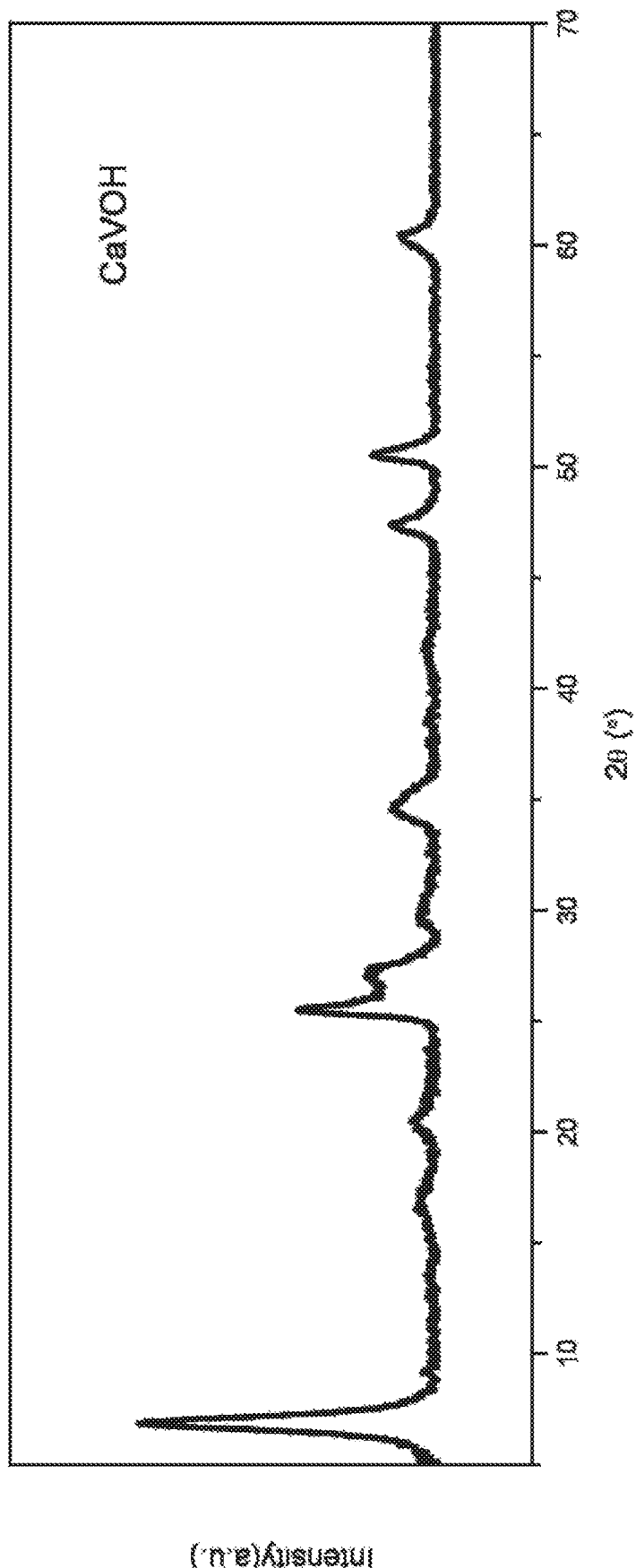
FIG. 23A is an XRD pattern of CaVOH.
Figure 23B:
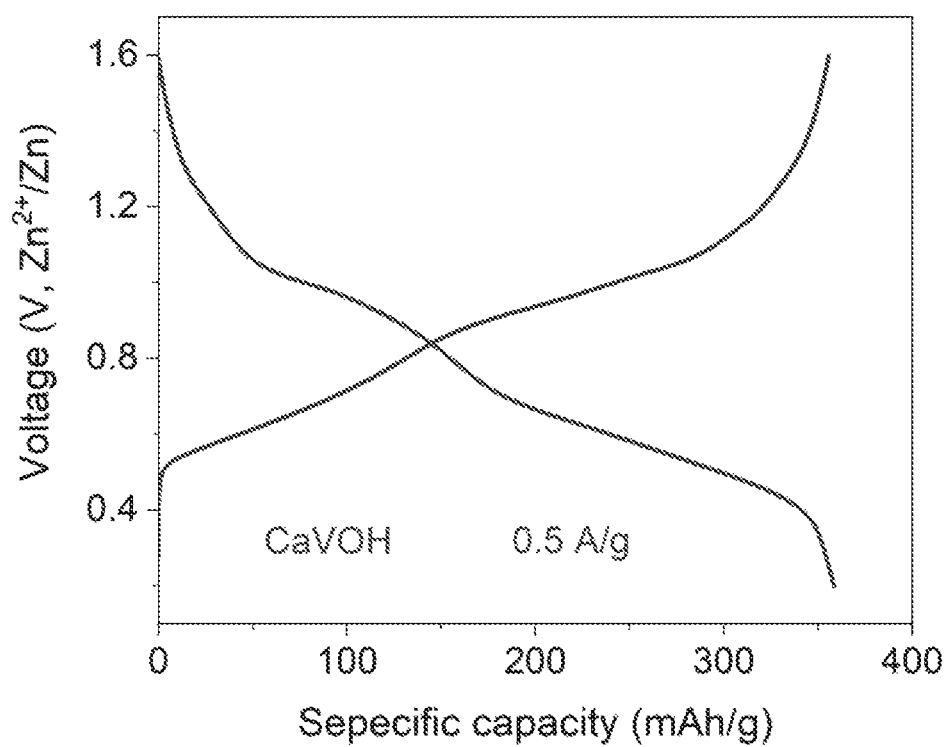
FIG. 23B is a voltage profile of CaVOH at 0.5 A/g current density.
Figure 24A:
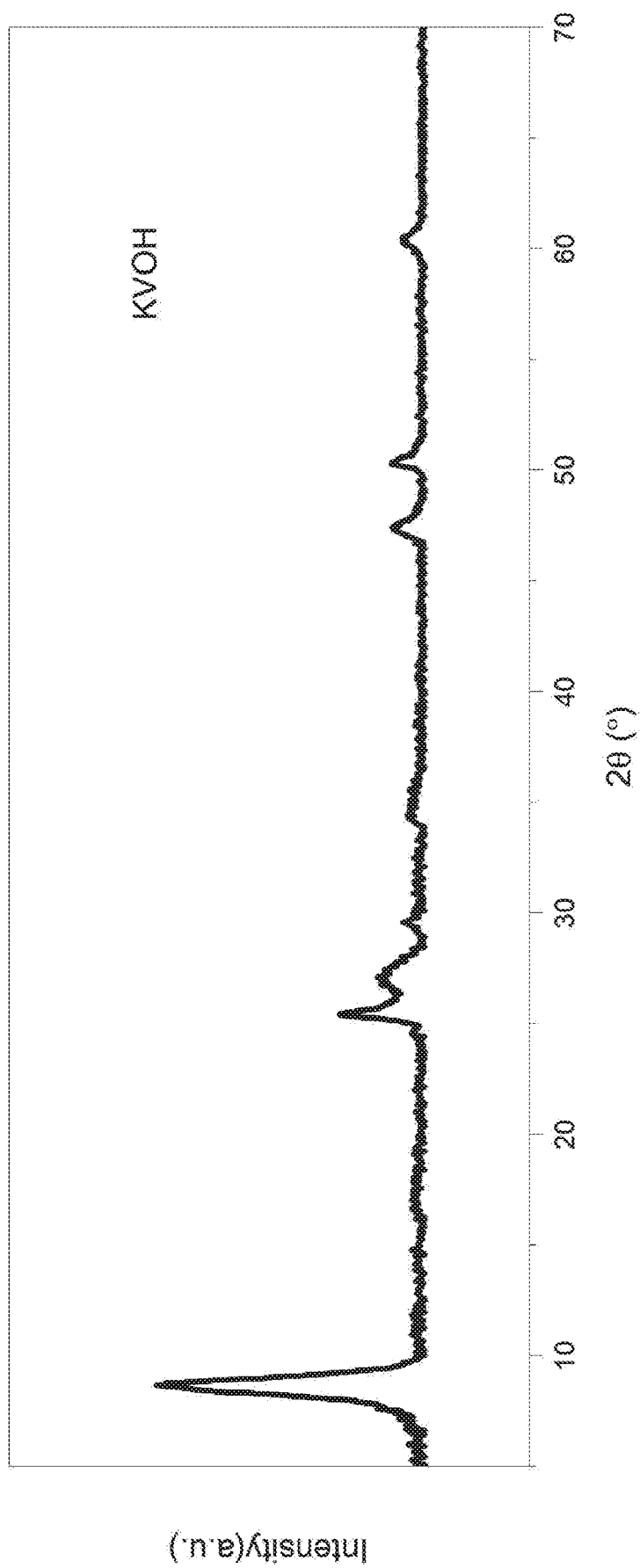
FIG. 24A is an XRD pattern of KVOH.
Figure 24B:
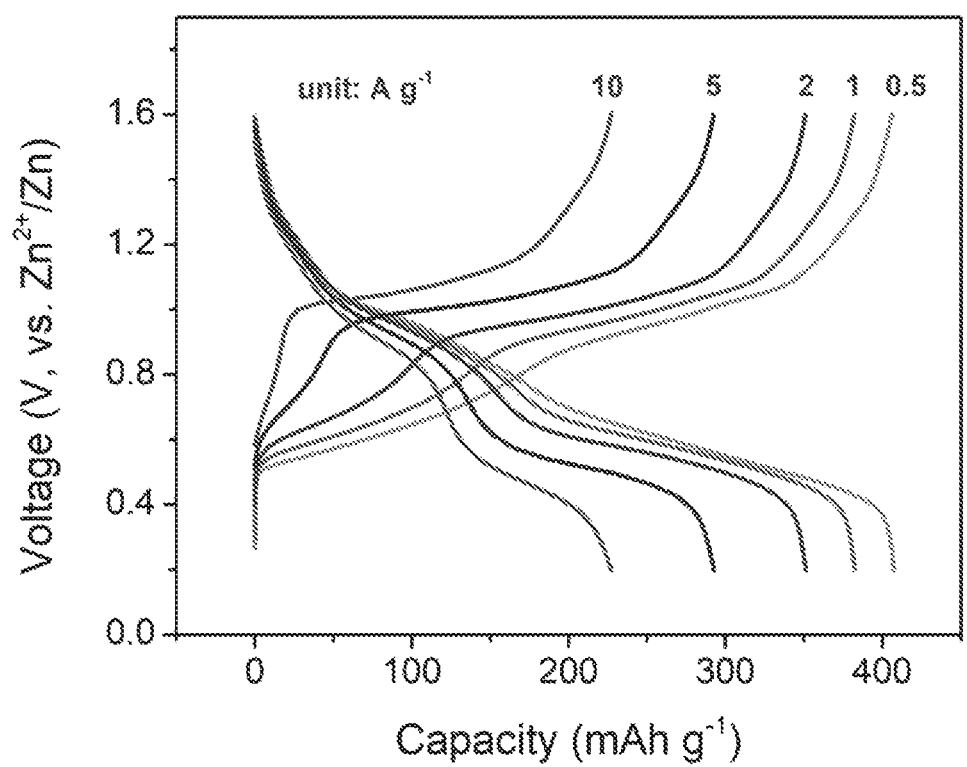
FIG. 24B is a voltage profile of KVOH across a range of current densities.
Figure 25A:
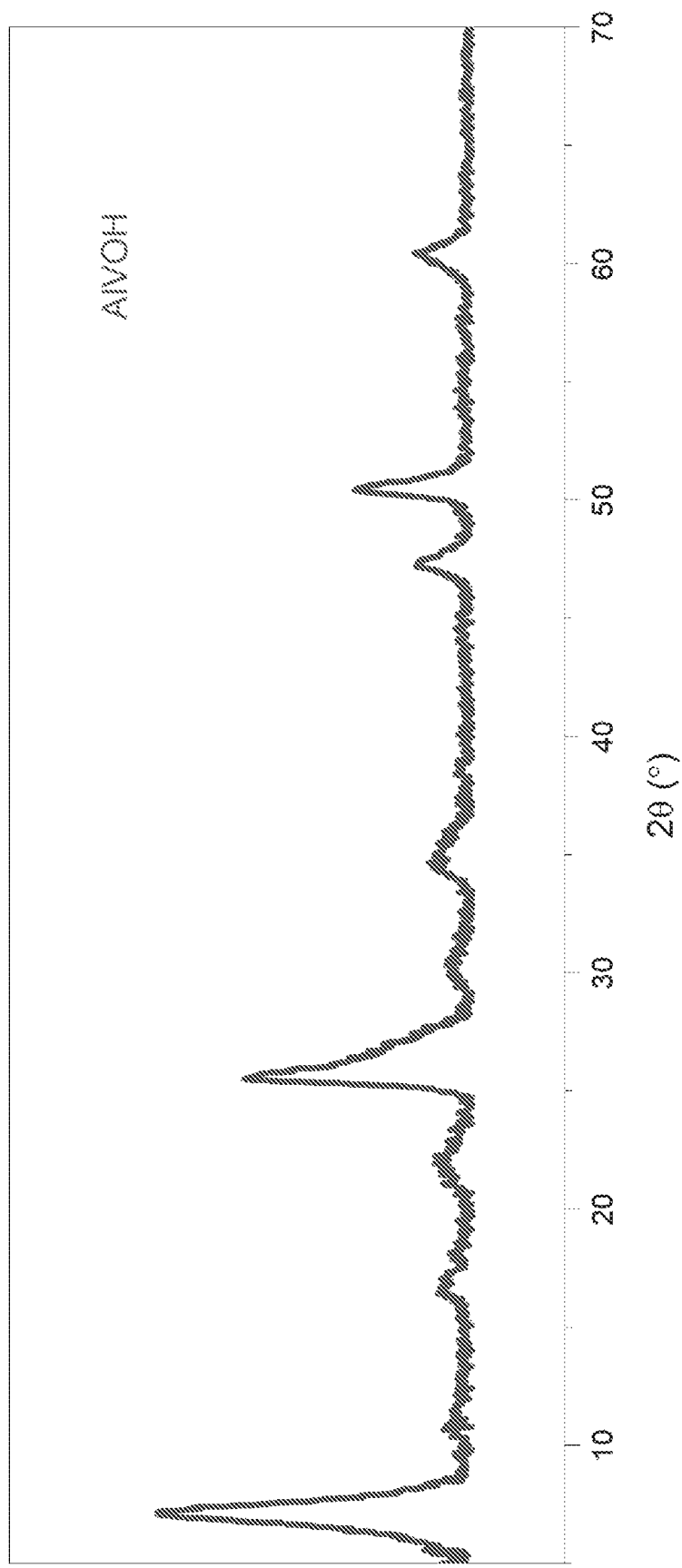
FIG. 25A is an XRD pattern of AlVOH.

CaVOH Cathode Tested in an Aqueous Zn-Ion Battery.
  Synthesis: the same procedure as used for MnVOH in Example 1, just replace the MnSO4 with CaSO4.
  Phase: FIG. 23A is an XRD pattern of CaVOH.
  Performance: 355 mAh/g at 0.5 A/g.
  FIG. 23B is a voltage profile of CaVOH at 0.5 A/g current density.
KVOH Cathode Tested for an Aqueous Zn-Ion Battery.
  Synthesis: the same procedure as used for MnVOH in Example 1, just replace the MnSO4 with K2SO4.
  Phase: FIG. 24A is an XRD pattern of KVOH.
  Performance: 410 mAh/g at 0.5 A/g.
  FIG. 24B is a voltage profile of KVOH across a range of current densities.
AlVOH Cathode Tested for an Aqueous Zn-Ion Battery.
  Synthesis: the same procedure and similar receipt as used for MnVOH in Example 1, just replace the MnSO4 with Al2(SO4)3.
  Phase: FIG. 25A is an XRD pattern of AlVOH.
  Performance: 380 mAh/g at 0.05 A/g.
  FIG. 25B is a voltage profile of AlVOH at 50 mA/g current density.

In these examples tests, the electrode has a mass loading exceeding 4 mg/cm$^2$ or 1.6 mAh/cm$^2$. It can be increased to 12 mg/cm² or 4.8 mAh/cm² or greater, particularly if needed to meet the current commercial requirements in Li-ion technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. As used herein, the term "about" indicates that the referenced value can be modified plus or minus 5% and still fall within the disclosed embodiment.

The above detailed description of embodiments of the present technology is not intended to be exhaustive or to limit the present technology to the precise form disclosed above. While specific embodiments of, and examples for, the present technology are described above for illustrative purposes, various equivalent modifications are possible within the scope of the present technology, as those skilled in the relevant art will recognize. The teachings of the present technology provided herein can be applied to other systems, not necessarily the system described above. The elements and acts of the various embodiments described above can be combined to provide further embodiments. All of the above patents and applications and other references, including any that may be listed in accompanying filing papers, are incorporated herein by reference. Aspects of the present technology can be modified, if necessary, to employ the systems, functions, and concepts of the various references described above to provide yet further embodiments of the present technology.

These and other changes can be made to the present technology in light of the above Detailed Description. While the above description details certain embodiments of the present technology and describes the best mode contemplated, no matter how detailed the above appears in text, the present technology can be practiced in many ways. Details of the system may vary considerably in its implementation details, while still being encompassed by the present technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific embodiments disclosed in the specification, unless the above Detailed Description section explicitly defines such terms. Accordingly, the actual scope of the present technology encompasses not only the disclosed embodiments, but also all equivalent ways of practicing or implementing the present technology.

While illustrative embodiments have been illustrated and described, it will be appreciated that various changes can be made therein without departing from the spirit and scope of the invention.

The embodiments of the invention in which an exclusive property or privilege is claimed are defined as follows:

1. A composition comprising a cationically stabilized vanadate hydrate having the chemical formula $M_xV_2O_5 \cdot nH_2O$, wherein M is a cation and having a structure defined by layers of vanadium oxide separated by the cation and water, which provide spacing and stabilization between the layers, wherein the cationically stabilized vanadate hydrate has a greater interplanar spacing when compared to a vanadate hydrate formed by the same method but without the cation, and wherein the interplanar spacing is about 12.9 Å.

2. The composition of claim 1, wherein the cationically stabilized vanadate hydrate is present predominantly in a single phase.

3. The composition of claim 1, wherein the cationically stabilized vanadate hydrate is structurally and thermally more stable when compared to a vanadate hydrate formed by the same method but without the cation.

4. The composition of claim 1, wherein the cationic stabilization results from an inclusion of a cation of optimal ionic radius selected from the group of manganese, chromium, titanium, scandium, iron, copper, nickel, cobalt, zinc, yttrium, zirconium, niobium, cadmium, aluminum, magnesium, potassium, calcium, sodium, and combinations thereof.

5. The composition of claim 1, wherein the cationic stabilization results from an inclusion of a cation selected from the group of calcium, magnesium, potassium, aluminum, manganese, iron, cobalt, nickel, copper, zinc, and combinations thereof.

6. The composition of claim 1, wherein M is a Mn (II) cation.

7. The composition of claim 1, wherein the cation is bonded to the vanadium oxide.

8. An electrode comprising a composition according to claim 1.

9. The electrode of claim 8, wherein the electrode is configured for use in a battery.

10. The electrode of claim 9, wherein the battery is multivalent-ion battery.

11. The electrode of claim 10, wherein the battery is an aqueous zinc-ion battery.

12. The electrode of claim 8, wherein the specific capacity is 250 mAh/g at a current density of 0.5 A/g or greater.

13. The electrode of claim 8, wherein the electrode is configured for use in a supercapacitor.

14. An aqueous battery comprising a cathode, the cathode comprising:
a cationically stabilized vanadate hydrate having a structure defined by layers of vanadium oxide separated by a cation and water, which provide spacing and stabilization between the layers,
wherein the cathode comprises the chemical formula $M_xV_2O_5 \cdot nH_2O$, wherein M is Mn (II),
wherein the specific capacity is 400 mAh/g at a current density of 0.05 A/g or greater, and
wherein the battery has a capacity retention of 80% or greater.

15. The aqueous battery of claim 14, wherein the aqueous battery is multivalent-ion battery.

16. The aqueous battery of claim 15, wherein the battery is an aqueous zinc-ion battery.

17. The aqueous battery of claim 14, wherein the battery has a shelf life of 50 days or greater.

18. The aqueous battery of claim 14, wherein the battery has an energy efficiency of 70% or greater.

* * * * *